United States Patent [19]

Yamada et al.

[11] Patent Number: 5,732,146
[45] Date of Patent: Mar. 24, 1998

[54] SCENE CHANGE DETECTING METHOD FOR VIDEO AND MOVIE

[75] Inventors: Shin Yamada; Katsuhiro Kanamori, both of Kawasaki; Toshikazu Fujioka, Tokyo, all of Japan

[73] Assignee: Matsushita Electric Industrial Co., Ltd., Osaka, Japan

[21] Appl. No.: 424,016

[22] Filed: Apr. 18, 1995

[30] Foreign Application Priority Data

Apr. 18, 1994 [JP] Japan ................................. 6-078326

[51] Int. Cl.$^6$ .................................................. G06K 9/00
[52] U.S. Cl. ........................... 382/107; 348/19; 348/700; 382/218
[58] Field of Search ....................... 395/154; 364/514 A; 348/13, 700, 701, 702; 382/100, 107, 219, 266, 199

[56] References Cited

U.S. PATENT DOCUMENTS

| | | | |
|---|---|---|---|
| 5,394,249 | 2/1995 | Shimoda et al. | 358/335 |
| 5,487,172 | 1/1996 | Hyatt | 395/800 |
| 5,493,345 | 2/1996 | Ishikawa et al. | 348/700 |
| 5,521,841 | 5/1996 | Arman et al. | 364/514 A |
| 5,537,528 | 7/1996 | Takahashi et al. | 395/154 |
| 5,550,965 | 8/1996 | Gabbe et al. | 395/154 |
| 5,563,963 | 10/1996 | Kaplan et al. | 382/266 |
| 5,565,920 | 10/1996 | Lee et al. | 348/398 |
| 5,576,950 | 11/1996 | Tonomura et al. | 364/514 A |

FOREIGN PATENT DOCUMENTS 5-37853  2/1993  Japan .

OTHER PUBLICATIONS

Automatic partitioning of full–motion video. 1993, Inst. of Sys. Sci., Univ. of Singapore, Heng Mui Keng et al, 19 pages.

A study on the cut detection using common colors in corresponding regions of video frames. 1993, Shin Yamada et al, 6 pages.

*Primary Examiner*—Yon J. Couso
*Assistant Examiner*—Jayanti K. Patel
*Attorney, Agent, or Firm*—Lowe, Price, LeBlanc & Becker

[57] ABSTRACT

A scene change point detecting method which detects a scene change point by successively processing time series frame images I1, I2, I3, - - - sampled in this order from a processed video. The method includes at least one of the following four scene-change-point detecting methods: a first scene-change-point detecting method for detecting a video cut; a second scene-change-point detecting method for detecting a scene change similar to dissolve by processing a feature quantity to be calculated based on an edge intensity of each frame image; a third scene-change-point detecting method for detecting a scene change similar to wipe based on an intensity-changed pixel region representing a set of pixels whose brightness changes more than a predetermined threshold between a specific frame image In and an immediately preceding frame image In-1; and a fourth scene-change-point detecting method for detecting a scene change similar to page-translate or a scene change resulting from camera movement based on an intensity-changed pixel area representing a ratio of the number of pixels involved in the intensity-changed pixel region to the total number of pixels constituting a corresponding frame image.

60 Claims, 20 Drawing Sheets

CORRESPONDING PARTIAL REGIONS

SCENE CHANGE DETECTING METHOD FOR VIDEO AND MOVIE

BACKGROUND OF THE INVENTION

1. Field of the Invention

This invention relates to a video browsing method or a video editing method or the like which is capable of detecting a head of each content recorded in a video or a movie, and more particularly to a scene change point detecting method for detecting a transition point of a video tape or video disk where the content of video is changed.

2. Related Art

Recently, many researches using computers have been enthusiastically conducted on the study of a method for facilitating various operations for video, such as retrieval (search), editing, video image processing, browsing. One example among them is a video browsing method or a video editing method which enables users to automatically search a head of each image sequence which presents continuous action which appears to be from a single operation of the camera. To exercise these techniques, it is mandatorily necessary to discriminate frame images in accordance with their content. Thus, the development of a technology for detecting a change point of video content (hereinafter, referred to as "scene change") is very important.

One of aspects of scene changes is a video cut which represents a specific point where video content is completely $$S(n-1)-S(n) > \theta_{cut}$$

$$S(n+1)-S(n) > \theta_{cut}$$

where $\theta_{cut}$ is a predetermined threshold.

If the above two formulas are simultaneously established, it is judged that there is a video cut between the frame images $I_{n-1}$ and $I_n$. That is, when the similarity $S(N)$ of the frame image causes a variation as shown in FIG. 27, it is considered that a video cut exists immediately before the frame image $I_n$.

However, there was a problem that the above-described conventional method may fail to detect scene changes resulting from special editing effects, such as dissolve (i.e. a technology of superimposing one picture shot upon another, so that one scene disappears while another gradually appears), wipe (i.e. a technology of replacing a former scene by a latter scene from one end to the other end like a wiping motion), or gradual and continuous scene changes derived from camera movements such as panning and zooming.

FIGS. 28A and 28B show a typical scene change brought by the wipe, which was difficult to detect by the above-described conventional method. FIG. 28A shows variation of time series frame images during the wipe, while FIG. 28B shows variation of the similarity $S(N)$. A portion subjected to the scene change resulting from the wide is a section sandwiched between the frame images $I_{n-4}$ and $I_n$. The value of the similarity $S(N)$ is 0.75 in this scene change region, which is smaller than changed within a short time equivalent to one frame which is approximately 1/30 second. The inventors of this invention have already proposed the common color ratio method (Yamada, Fujioka, Kanamori, and Matsushima, "A study on the cut detection using common colors in corresponding regions of video frames", ITE Technical Report, September 1993, Vol. 17, No. 55, pp. 1–6)

According to this common color ratio method, each frame image of a processed video is dissected into a plurality of partial regions, and a video cut is detected using a feature quantity calculated based on a histogram of colors in each partial region. FIG. 26 shows an example of a frame image $I_N$ divided into 16 partial regions $R(j,n)$, where $j=$, - - - ,16 and $n$ is a frame number.

Procedure of the common color ratio method will be simply explained with reference to the example of FIG. 26. First of all, similarity between corresponding partial regions $R(j,n-1)$ and $R(j,n)$ of consecutive frame images $I_{n-1}$ and $I_n$ are obtained by comparing them using common portions of color histograms. Subsequently, a similarity $S(n)$ between two frame images $I_{n-1}$ and $I_n$ is obtained by averaging a total of 16 similarities each representing a similarity of corresponding partial regions. In many cases, the similarity of frame images across the video cut becomes smaller than that of frame images within the same scene. Thus, it is checked whether the following formulas are established. that of the frame images $S(n-4)$ and $S(n+1)$ which are out of the scene change section. In this manner, the scene change resulting from the wipe brings a series of reduced similarities $S(N)$ over two or more frames. This change is quite different from that of FIG. 27; accordingly, the scene change by the wipe may not be detected by the conventional method.

Furthermore, the conventional method is disadvantageous in that false detections may frequently arise if frame images cause discontinuous changes in the transitional part of scene change resulting from the editing effects. FIG. 29 shows one example of the discontinuous scene change, wherein the next scene causes rotation accompanied with change of size.

SUMMARY OF THE INVENTION

Accordingly, in view of above-described problems encountered in the prior art, a principal object of the present invention is to provide a scene change point detecting method capable of detecting all kinds of scene changes resulting from, for example, video cuts, editing effects and camera movements, thereby accurately estimating a head frame number of each scene (hereinafter, referred to as "scene change point").

In order to accomplish this and other related objects, a first aspect of the present invention provides a scene change point detecting method comprising steps of: sampling time series frame images $I_1$, $I_2$, $I_3$, - - - from a processed video; obtaining similarity between two consecutive frame images among the frame images sampled; comparing both the similarity and a difference between similarities of the frame images with predetermined thresholds, thereby detecting video cut.

More specifically, when $S(n-1)-S(n)$ and $S(n+1)-S(n)$ are simultaneously larger than a predetermined threshold $\theta_{cut}$, the method comprising steps of: checking whether or not the following formulas are established $$S(n) < \theta_{low},\ S(n-1) \geq \theta_{high}$$

where $S(n)$ is similarity between a specific frame image $I_n$ and an immediately preceding frame image $I_{n-1}$, while $\theta_{low}$ and $\theta_{high}$ are predetermined thresholds; and identifying the specific frame image $I_n$ as a scene-change-point frame image, when at least one of the two formulas is established.

The method further comprises steps of: dissecting each of the frame images into a plurality of partial regions; obtaining a histogram of colors in each partial region; finding constituent colors representing each partial region by checking whether frequency of each color exceeds a predetermined threshold $\theta_h$; finding common colors which are common part of constituent colors between corresponding partial regions of a specific frame image $I_n$ and an immediately preceding frame image $I_{n-1}$; calculating similarity between the corresponding partial regions using the common colors and constituent colors; and calculating similarity between the specific frame image $I_n$ and the immediately preceding frame image $I_{n-1}$ using the similarity between the corresponding partial regions.

The method further comprises steps of: normalizing an area of pixels including the common colors by an area of pixels including constituent colors in each of the corresponding partial regions, thereby obtaining two normalized values; and specifying a smaller one of the two normalized values as the similarity of the corresponding partial regions.

A second aspect of the present invention provides a scene change point detecting method comprising steps of: sampling time series frame images $I_1$, $I_2$, $I_3$, - - - from a processed video; obtaining an edge intensity factor which is a feature quantity to be calculated using edge intensity of each frame image; and finding a section where the edge intensity factor shows a predetermined large variation for a duration exceeding a predetermined time and also a section where the edge intensity factor shows a predetermined small variation for a duration exceeding a predetermined time, thereby detecting a scene change point representing a head frame number of a next scene.

More specifically, the second aspect of the present invention provides a scene change point detecting method which detects a scene change point by successively processing time series frame images $I_1$, $I_2$, $I_3$, - - - sampled in this order from a processed video, the method comprising steps of: obtaining an edge intensity factor $E(n)$ which is a feature quantity to be calculated using edge intensity; obtaining a change-rate $Erc(N)$ of the edge intensity factor $E(N)$ of a presently processed frame image $I_N$; specifying an image number N of the frame image $I_N$ as a dissolve feature point $nd1$, when an absolute value of the change-rate $Erc(N)$ continuously exceeds a predetermined threshold $\theta_{edge}$ over a predetermined number of preceding frame images; specifying the image number N of the frame image $I_N$ as an edge-intensity-extreme point $nd2$, when the frame image $I_N$ is involved in a section succeeding the dissolve feature point $nd1$ where the change-rate of the edge intensity factor $E(N)$ has a small absolute value; considering a frame image $I_{nd2}$ of the edge-intensity-extreme point $nd2$ as a head frame image of a next scene which is specified as a scene-change-point frame image, when the edge intensity factors $E(nd2)$, $E(nd2+1)$, $E(nd2+2)$, - - - of frame images succeeding the edge-intensity-extreme point $nd2$ do not increase; and specifying the frame image $I_N$ as a scene-change-point frame image, when the edge intensity factor $E(N)$ increases between the frame image $I_{nd2}$ of the edge-intensity-extreme point $nd2$ and the frame image $I_N$, and the frame image $I_N$ is included in the section where the change-rate of the edge intensity factor $E(N)$ has a small absolute value.

The method uses a change-rate of a smoothed edge intensity factor $E'(N)$ of the frame image $I_N$ as the change-rate $Erc(N)$ of the edge intensity factor $E(N)$, when $E'(1)$, $E'(2)$, - - - represent a row of smoothed values of edge intensity factors $E(1)$, $E(2)$, - - - smoothed in a direction of time.

The method substitutes the image number N of the frame image $I_N$ for a dissolve-judgement-start point $nd0$ which represents a start point of scene change, when a product of $Erc(N-1) \times Erc(N)$ is not larger than zero in a region succeeding the dissolve feature point $nd1$.

The edge intensity factor $E(N)$ is determined by obtaining a sum of edge intensities of respective pixels constituting each frame image.

A third aspect of the present invention provides a scene change point detecting method comprising steps of: sampling time series frame images $I_1$, $I_2$, $I_3$, - - - from a processed video; obtaining a set of pixels whose brightness changes more than a predetermined threshold $\theta_{w1}$ between the specific frame image and an immediately preceding frame image; specifying the set of pixels as an intensity-changed pixel region; and comparing an area of a sum-set of intensity-changed pixel regions of consecutive frame images with a threshold, thereby detecting a scene change point representing a head frame number of a next scene.

The method further comprises steps of: obtaining a sum-set $SR_{IC}$ of intensity-changed pixel regions $R_{ICnw1}$, - - - , $R_{IC_N}$ of frame images $I_{nw1}$ through $I_N$, by updating a wipe-start-candidate point $nw1$ which represents a starting point of scene change in such a manner that the number of pixels between the frame image $I_{nw1}$ of the wipe-start-candidate point $nw1$ and the frame image $I_N$ does not exceed the maximum value $nw_{max}$ of the number of pixels required for wipe; obtaining a replaced area SIDH which is a ratio of the number of pixels involved in the sum-set $SR_{IC}$ to the total number of pixels constituting a corresponding frame image; and considering the frame image $I_N$ as a head frame image of the next scene, when the replaced area SIDH exceeds a predetermined threshold $\theta_{sidh}$, thereby obtaining a scene-change-point frame image.

The method further comprises steps of: obtaining a variation by subtracting an intensity-changed pixel area $IDHa(N)$ of the frame image $I_N$ by an intensity-changed pixel area $IDHa(N-1)$ of an immediately preceding frame image $I_{N-1}$, where the intensity-changed pixel area represents a ratio of the number of pixels involved in the intensity-changed pixel region to the total number of pixels constituting a corresponding frame image; and specifying an image number $(N+1)$ of a frame image succeeding the frame image $I_N$ as the wipe-start-candidate point $nw1$, when an absolute value of the variation is not smaller than a predetermined threshold $\theta_{gap}$.

The method excludes an equi-velocity tracking portion where an object is tracked at substantially the same speed from detection of the scene change point.

The method further comprises steps of: obtaining an intensity-changed pixel area representing a ratio of the number of pixels involved in the intensity-changed pixel region to the total number of pixels constituting a corresponding frame image, and executing detection of the scene change point except for cases where the intensity-changed pixel area exceeds a predetermined threshold $\theta_{still}$ and substantially constant between an estimated scene-change-start point and an estimated scene-change-end point.

A fourth aspect of the present invention provides a scene change point detecting method comprising steps of: sampling time series frame images $I_1$, $I_2$, $I_3$, - - - from a processed video; obtaining an intensity-changed pixel region which represents a set of pixels whose brightness changes more than a predetermined threshold $\theta_{w1}$ between a specific frame image and an immediately preceding frame image; obtaining an intensity-changed pixel area which represents a ratio of the number of pixels involved in the intensity-changed pixel region to the total number of pixels constituting a corresponding frame image, and finding a section succeeding a page-translate-judgement-start point $no1$ where the intensity-changed pixel area decreases by an amount exceeding a predetermined threshold $\theta_{full}$, thereby detecting a scene change point representing a head frame number of a next scene.

The method considers that a frame image $I_{N-1}$ is a head frame image of the next scene when the following three judgements are simultaneously established: a first judgement being whether an intensity-changed pixel area IDHa(no1) of a frame image I$_{no1}$ representing the page-translate-judgement-start point no1 becomes a maximum value of intensity-changed pixel areas IDHa(no1) through IDHa(N) between the frame image I$_{no1}$ and a frame image I$_N$; a second judgement being whether an intensity-changed pixel area IDHa(N−1) of a frame image I$_{N−1}$ immediately preceding the frame image I$_N$ becomes a minimum value of intensity-changed pixel areas IDHa(no1) through IDHa(N) between the frame image I$_{no1}$ and the frame image I$_N$; and a third judgement being whether a value obtained by subtracting the intensity-changed pixel areas IDHa(no1) by the intensity-changed pixel area IDHa(N−1) exceeds a predetermined threshold θfull.

The method obtains a sectional maximum change area IDHmax (N) and a sectional minimum change area IDHmin (N) as maximum and minimum values of intensity-changed pixel areas IDHa(no1) through IDHa(N−1) between a frame image I$_{no1}$ of the page-translate-judgement-start point no1 and a frame image I$_{N−1}$ immediately preceding a frame image I$_N$, respectively, and an image number N of the frame image I$_N$ is substituted for the page-translate-judgement-start point no1, when an intensity-changed pixel area IDHa (N) of the frame image I$_N$ exceeds the sectional maximum change area IDHmax (N) or when a value obtained by subtracting the sectional minimum change area IDHmin (N) from the intensity-changed pixel area IDHa(N) of the frame image I$_N$ exceeds a predetermined threshold θups.

The method does not recognize the scene change point detected as an actual scene change point, when similarity between a head frame image I$_{np}$ of a present scene and a frame image I$_{npr}$ corresponding to the scene change point detected is less than a predetermined threshold θchange.

The method further comprises steps of: dissecting each of the frame images I$_{np}$ and I$_{npr}$ into a plurality of partial regions; obtaining a histogram of colors in each partial region; finding constituent colors representing each partial region by checking whether frequency of each color exceeds a predetermined threshold θh; finding common colors which are common part of constituent colors between corresponding partial regions of the two frame images I$_{np}$ and I$_{npr}$; calculating similarity between the corresponding partial regions using the common colors and constituent colors; and calculating similarity between the frame images I$_{np}$ and I$_{npr}$ using the similarity between the corresponding partial regions.

The method further comprises steps of: normalizing an area of pixels including the common colors by an area of pixels including constituent colors in each of the corresponding partial regions, thereby obtaining two normalized values; and specifying a smaller one of the two normalized values as the similarity of the corresponding partial regions.

The method recognizes the scene change point detected as an actual scene change point when variation of the intensity-changed pixel area is smaller than a predetermined value for a predetermined time after detection of the scene change point, otherwise the scene change point detected is not recognized as an actual scene change point.

The method replaces the intensity-changed pixel area by a smoothed intensity-changed pixel area which is smoothed in a direction of time.

The method replaces the intensity-changed pixel area by a feature quantity representing the total amount of movements on a screen.

A fifth aspect of the present invention provides a scene change point detecting method which detects a scene change point by successively processing time series frame images I1, I2, I3, - - - sampled in this order from a processed video, the method combining at least two of the following four scene-change-point detecting methods: a first scene-change-point detecting method which detects a video cut; a second scene-change-point detecting method which uses an edge intensity factor E(n) representing a feature quantity to be calculated using edge intensity of each frame image; a third scene-change-point detecting method which uses an intensity-changed pixel region RICn representing a set of pixels whose brightness changes more than a predetermined threshold θw1 between a specific frame image In and an immediately preceding frame image In−1; and a fourth scene-change-point detecting method which uses an intensity-changed pixel area IDHa(n) representing a ratio of the number of pixels involved in the intensity-changed pixel region RICn to the total number of pixels constituting a corresponding frame image.

The method obtains a scene change point ns by executing the first scene-change-point detecting method; and processes time series frame images Ins, Ins+1, Ins+2, - - - starting from the scene change point ns for obtaining a scene change point other than the video cut using at least one of the second, third and fourth scene-change-point detecting methods.

The method further comprises steps of: identifying a video cut as a scene change point when any video cut is detected by the first scene-change-point method after processing a frame image I$_N$; selecting a scene-change-point candidate npr by executing at least one of the second, third and fourth scene-change-point methods, when no video cut is detected by the first scene-change-point method; obtaining similarity between a head frame image I$_{np}$ of a present scene and a scene-change-point image candidate I$_{npr}$ of the scene-change-point candidate npr; considering the scene-change-point image candidate I$_{npr}$ as a head frame image of the next scene which is a frame image of the scene change point, when the similarity obtained is less than a predetermined threshold θchange.

The scene-change-point candidate npr is a scene change point having a largest frame number among a plurality of scene change points detected by executing at least one of the second, third and fourth scene-change-point methods.

The method executes at least two of the second, third and fourth scene-change-point detecting methods are executed; and it is checked whether a scene change point detected by a specific scene-change-point detecting method is involved in a transitional part of a scene change occurring immediately before another scene change point to be detected by another method other than the specific scene-change-point detecting method, thereby identifying the scene change point detected by the specific scene-change-point detecting method as a false scene change point.

The method further comprises steps of: specifying a dissolve feature point nd1 as a transitional point of a section where the edge intensity factor E(n) shows a large variation for a duration more than a predetermined time; specifying a dissolve end point as a point where a scene change involving the dissolve feature point nd1 is terminated; checking whether a scene change point nprw detected by the third scene-change-point detecting method or a scene change point npro detected by the fourth scene-change-point detecting method is located between the dissolve feature point nd1 and the dissolve end point; considering that the scene change point nprw or npro belongs to a transitional part of a scene change occurring immediately before a scene change point to be detected by the second scene-change-point detecting method; and identifying the scene change point nprw, npro as a false scene change point.

The method further comprises steps of: considering that the scene change point npr belongs to a transitional part of a scene change occurring immediately before a video change point to be detected by the fourth scene-change-point detecting method, when an intensity-changed pixel area IDHa(npr) of the scene change point npr exceeds an intensity-changed pixel area IDHa(npr+1) of an immediately succeeding image frame; identifying the scene change point npr as a false scene change point; and replacing the scene change point npr by a first local extreme point of the intensity-changed pixel area appearing after the scene change point npr.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
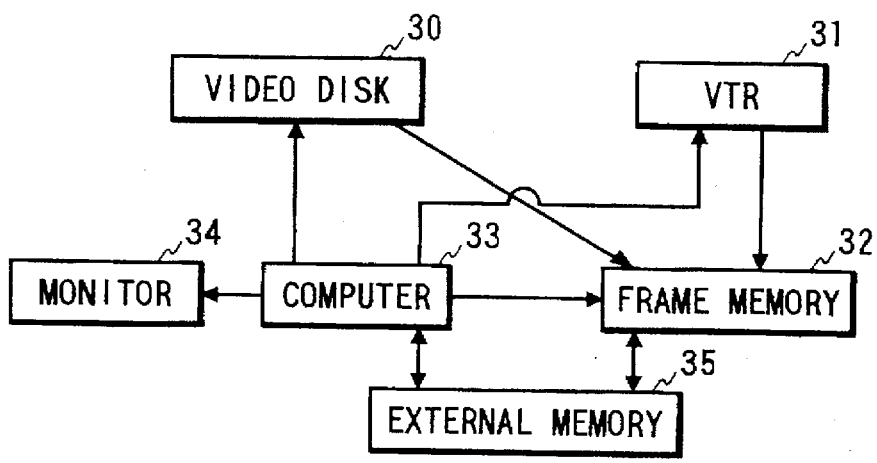
FIG. 1 is an overall schematic diagram showing an image browsing system for realizing a scene change point detecting method in accordance with a first embodiment of the present invention.

Preferred embodiments of the present invention will be explained in greater detail hereinafter, with reference to the accompanying drawings. Identical parts are denoted by identical reference numeral throughout views.

First Embodiment

In the following description, for the purpose of simplifying explanation, it is assumed that frame images to be processed are time series and arranged consecutively (or successively) with each other. That is, there is no frame images thinned out in the direction of time. If required to thin out some frame images, required number of frame images will be sampled at regular intervals in the direction of time, and image numbers 1,2,3, - - - will be suffixed to the sampled frame images in accordance with the sampling order. By the way, in the above-described "SUMMARY OF THE INVENTION", the third and fourth scene-change-point detecting methods of the present invention are explained in a general form using the above image numbers.

First of all, the principle of the first scene-change-point detecting method for detecting video cuts will be explained in accordance with the present invention.

Figure 26:
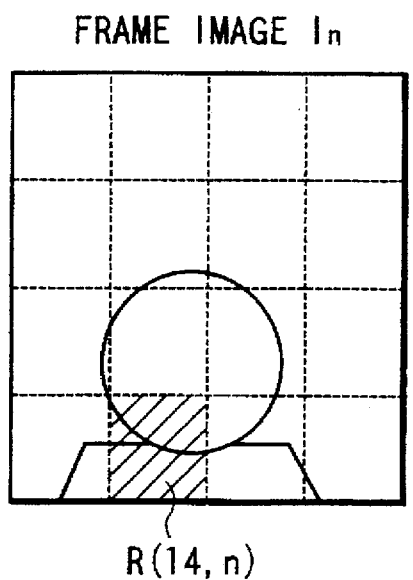
FIG. 26 is a conceptual view showing a partial region R(j,n), j=1 - - - 16, in accordance with a conventional method.
Figure 27:
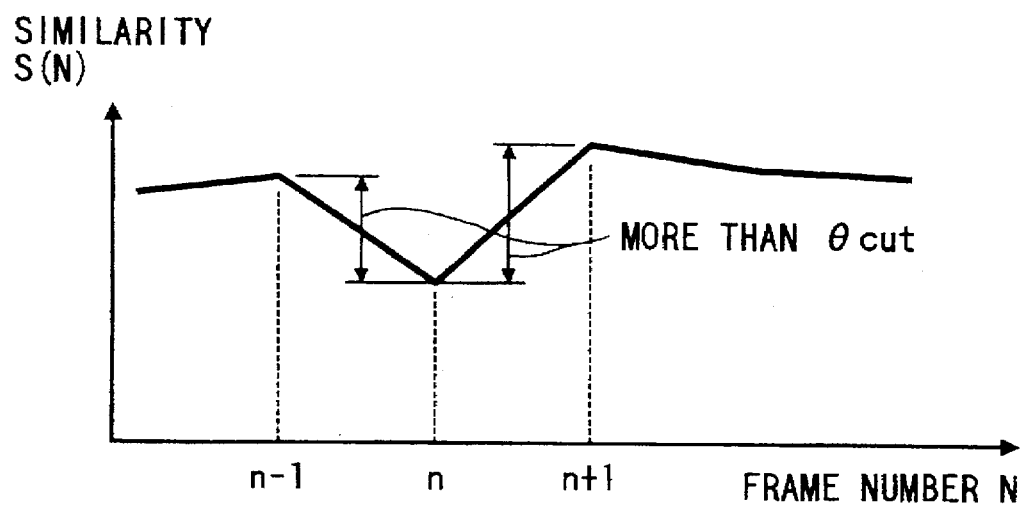
FIG. 27 is a graph showing judgement conditions for detecting a video cut in accordance with the conventional method.

In the same scene, camera movements such as zooming or object movements will make the objects shift, expand and contract on the screen. However, a shift distance or an enlargement ratio per frame time is small. Thus, the frame image $I_N$ is dissected into a plurality of partial regions R(j, N), where j=1,2, - - - ,k. FIG. 26 shows an example of 16 partial regions. Between two frame images $I_{N-1}$ and $I_N$ which are consecutive with each other and time series, if they are in the same scene, the histogram or color does not cause substantial change.

On the other hand, when any scene change occurs between the frame images $I_{N-1}$ and $I_N$, there is a certain possibility that a new color region may appear and occupy a large region or, on the contrary, a color previously occupying a large region may disappear due to change of objects on the screen in accordance with exchange between the corresponding partial regions of the frame images $I_{N-1}$ and $I_N$. Thus, it is preferable to use a specific parameter, if it decreases in accordance with an area of newly appearing or disappearing color between the corresponding partial regions, as similarity $Sp(j, I_{N-1}, I_N)$ of the corresponding partial regions. When the histogram of color does not vary in the corresponding partial regions, the similarity $Sp(j, I_{N-1}, I_N)$ approximates its maximum value.

An average of the similarity of the corresponding partial regions of the frame images $I_{N-1}$ and $I_N$ is specified as similarity S(N) of frame images.

$$S(N) = \frac{1}{k} \sum_{j=1}^{k} Sp(j, I_{N-1}, I_N) \qquad (1)$$

where k is the total number of partial regions.

If a video cut exists between the frame images $I_{N-1}$ and $I_N$, the frame image similarity S(N) defined by the formula 1 becomes smaller compared with its maximum value. On the contrary, the similarity S(N-1) of consecutive two time series frame images, if they are located immediately before the video cut, approximates the maximum value, since both frame images belong to the same scene.

On the other hand, even if frame images are involved in the same scene, the value of the above frame image similarity S(N) may be occasionally reduced due to flashing of light, high-speed camera movements, or high-speed movements of objects in front of the camera. However, in such cases, the similarity will take smaller values continuously for a time period more than two frames.

From the foregoing, the following are conditions provided to detect video cuts.

$$S(n-1)-S(n) > \theta_{cut} \qquad (2)$$

$$S(n+1)-S(n) > \theta_{cut} \qquad (3)$$

When the above inequalities are simultaneously established, it can be judged that the video cut exists between the frame images $I_{N-1}$ and $I_N$.

Figure 29:
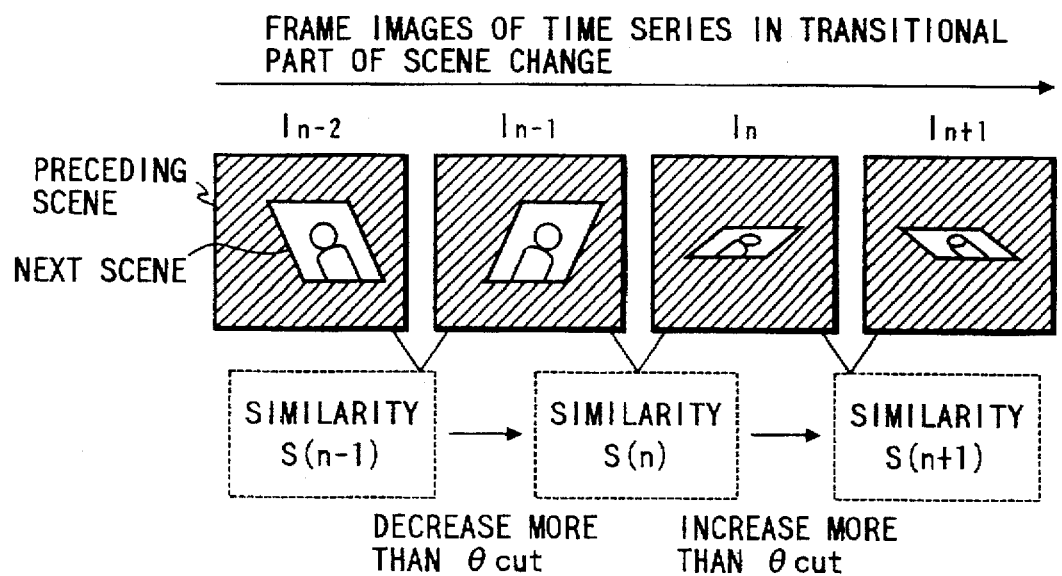
FIG. 29 is a conceptual view showing a scene change accompanied with discontinuous changes of frame images.

This method is not sensitive to the scene changes resulting from various editing effects. However, if there happen to be a discontinuous change between frame images during such scene changes, there will be the possibility that such a change may be erroneously detected as a video cut. For example, this kind of problem will be recognized in the scene change of FIG. 29 wherein the next scene causes rotation accompanied with change of size.

When the frame images In and In+1 are both involved in the transitional part of a scene change resulting from editing effects, these images cooperatively form a composite image including a part of the before-scene-change video and a part of after-scene-change video. Thus, the similarity S(n) between the above frame images In-1 and In becomes a large value compared with the similarity between the before-scene-change frame image and the after-scene-change frame image. Therefore, it is effective to provide a lower limit $\theta_{low}$ for avoiding the false or erroneous detections of scene changes resulting from editing effects.

$$S(n) < \theta_{low} \qquad (4)$$

Figure 2:
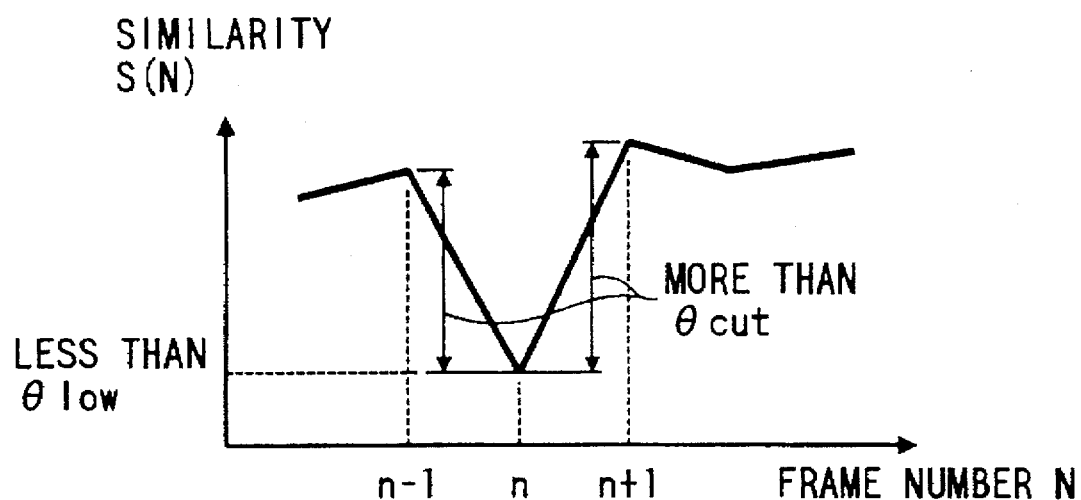
FIG. 2 is a graph showing judgement conditions for detecting a video cut in accordance with the first embodiment of the present invention.
Figure 3:
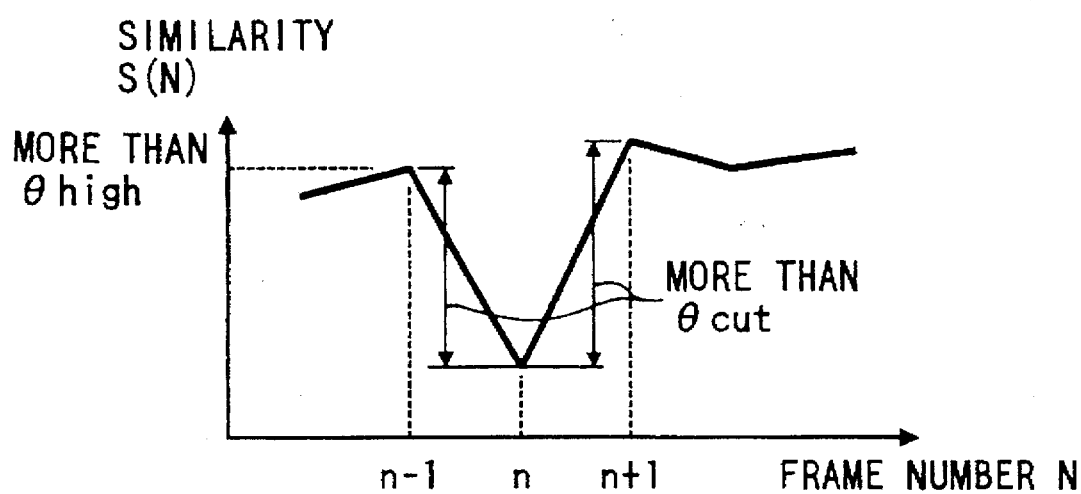
FIG. 3 is a graph showing judgement conditions for detecting a video cut in accordance with the first embodiment of the present invention.

Namely, to detect video cuts, it is checked whether the inequalities 2, 3 and 4 are simultaneously established as shown in FIG. 2. When all of inequalities 2, 3 and 4 are established, it is considered that an actual video cut is detected.

However, according to this method, there is the possibility that the inequality 4 may not be established when two frames across the video cut resemble each other. To eliminate such erroneous detection, it is assumed that there should be an appropriate upper limit $\theta_{high}$ with respect to the similarity, in view of the fact that the video causes drastic changes when the above inequalities 2 and 3 are both established in the transitional part of editing effects.

$$S(n-1) \geq \theta_{high} \qquad (5)$$

That is, to detect video cuts, it is checked whether the above inequalities 2, 3 and 5 are simultaneously established. When all of inequalities 2, 3 and 5 are established simultaneously, it is considered that an actual video cut is detected.

In other words, according to the present embodiment, it is required to check whether the following three video-cut requirements are simultaneously satisfied, to eliminate excessive or erroneous detections of scene changes resulting from editing effects which were the problems found in the method using the above inequalities 2 and 3 only.

Video-cut Requirement 1—To establish inequality 2

Video-cut Requirement 2—To establish inequality 3

Video-cut Requirement 3—To establish inequality 4 or 5

Thus, only when the above three requirements are simultaneously satisfied, it is judged that an actual video cut exists between the frame images In and In+1.

Next, the principle of the second scene-change-point detecting method for detecting scene changes resulting from the editing effects similar to the dissolve will be explained in accordance with the present invention.

Figure 4:
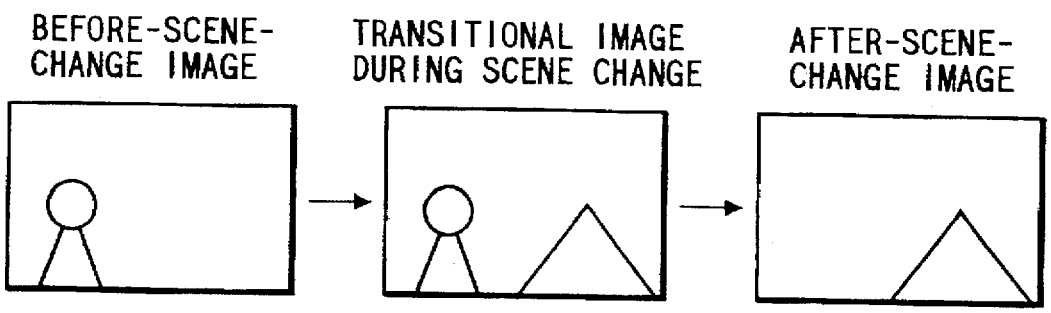
FIG. 4 is a view showing a typical scene change resulting from dissolve in accordance with the first embodiment of the present invention.

FIG. 4 shows an example of a scene change resulting from the dissolve. The dissolve is characterized in that a former scene image and a latter scene image are multiplied with their own gains, so as to form a composite image. The gain to be multiplied with the former scene image is gradually decreased with elapsing time, while the gain to be multiplied with the latter scene image is gradually increased.

Figure 5:
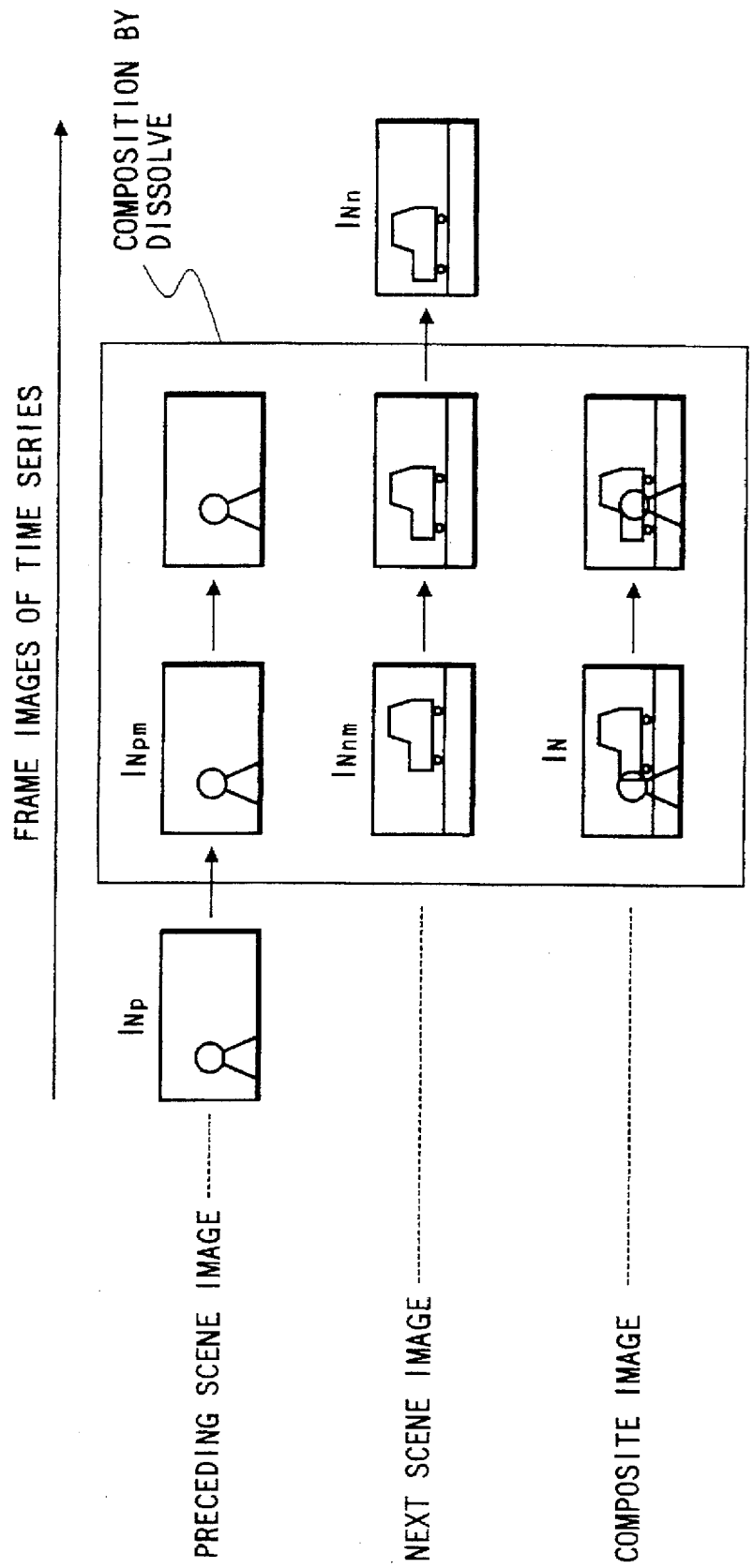
FIG. 5 is a conceptual view showing composition of images by the dissolve.

Thus, the image $I_N$, if it is in a transitional part of dissolve, is considered as a composite image consisting of two virtual images $I_{Nnm}$ and $I_{Npm}$, as shown in FIG. 5. The virtual image $I_{Npm}$ corresponds to an image obtained by adding the image $I_N$ located immediately before dissolve with movements of objects or camera of a preceding scene during a period from the frame time N to the frame time Np. The virtual image $I_{Nnm}$ corresponds to an image obtained by subtracting the image $I_{Nn}$ located immediately after the dissolve section by movements of objects or camera of the succeeding scene during a period from the frame time N to the frame time Nn. Let the brightness of jth pixel from the left on ith line of the frame image In be f(n,i,j). It is then assumed that the brightness f(N,i,j) of each pixel of the image $I_N$, if it belongs to the transitional part of the dissolve, is expressed by the following formula.

$$f(N,i,j) = f\{a \cdot Npm + (1-a) \cdot Nnm\}, i,j)$$
$$= a \cdot f(Npm,i,j) + (1-a) \cdot f(Nnm,i,j),$$
where $0 < a < 1$ In this case, a horizontal component $Eh(n,i,j)$ and a vertical component $Ev(n,i,j)$ of the edge of pixel $(i,j)$ of the frame image In can be obtained by adding or subtracting brightness of pixels surrounding the above pixel $(i,j)$. Therefore, the following relations are established.

$$Eh(N,i,j) = a \cdot Eh(Npm,i,j) + (1-a) \cdot Eh(Nnm,i,j) \quad (6a)$$

$$Ev(N,i,j) = a \cdot Ev(Npm,i,j) + (1-a) \cdot Ev(Nnm,i,j) \quad (6b)$$

The edge intensity factor $E(n)$ of the frame image In can be expressed by the following formula which represents a sum of edge intensities.

$$E(n) = \sum_i \sum_j \sqrt{\{Eh(n,i,j)^2 + Ev(n,i,j)^2\}} \quad (7)$$

Thus, the following relation is derived from formulas 6a, 6b and 7.

$$E(N) \leq a \times E(Npm) + (1-a) \times E(Nnm) \quad (8)$$

The edge causes shift movements in response to the object or camera movements. Hence; it is assumed that almost all of edges of the image $I_{Npm}$ within the dissolve section have corresponding edges in the image $I_{Np}$ located immediately before the dissolve section. Thus, it is considered that the following relation is established.

$$E(Np) = E(Npm) \quad (9)$$

In the same manner, it is considered that the following relation is established.

$$E(Nn) = E(Nnm) \quad (10)$$

From above formulas 8 to 10, the following relation is derived.

$$E(N) \leq a \times E(Np) + (1-a) \times E(Nn) \quad (11)$$

For detecting scene changes resulting from editing effects similar to the dissolve, the present method utilizes the fact that, during the dissolve, the edge intensity factor $E(N)$ shows a variation characterized by a downwardly protruding curve. It is then assumed that the change of the edge intensity factor during the dissolve can be classified into three fundamental patterns shown in FIGS. 6A to 6C. Let the frame number corresponding to the position where the dissolve starts be a dissolve-judgement-start point nd0. Similarly, let the frame number corresponding a transitional part where the absolute change-rate of $E(N)$ is large be a dissolve feature point nd1. Let the frame number corresponding to the head of a transitional part where the absolute change-rate of $E(N)$ is small be an edge-intensity-extreme point nd2. And, let the frame number corresponding to a portion where the dissolve terminates be a dissolve-end-candidate point nd3. Thus, scene changes can be detected by checking potential portions having large and small absolute values in the change-rate of $E(N)$, referring to the classification of FIGS. 6A–6C.

By the way, the later-described second embodiment detects scene changes by using only the dissolve feature point nd1 and the edge-intensity-extreme point nd2, while the fourth embodiment detects scene changes by using all of the dissolve-judgement-start point nd0, the dissolve feature point nd1, the edge-intensity-extreme point nd2 and the dissolve-end-candidate nd3.

Next, the principle of the third scene-change-point detecting method for detecting scene changes resulting from the editing effects similar to wipe will be explained in accordance with the present invention.

Figure 7:
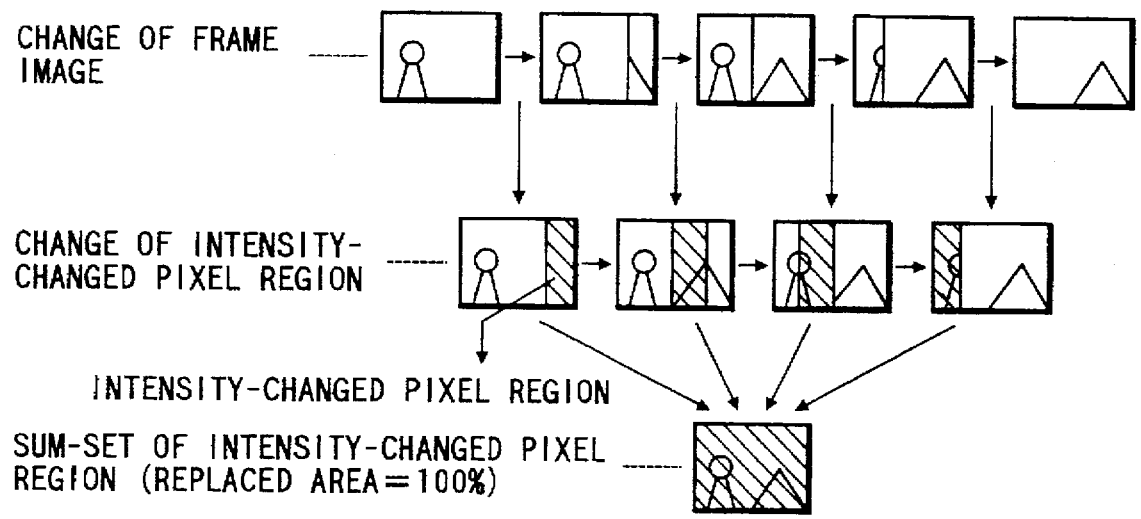
FIG. 7 is a conceptual view showing a sum-set of intensity-changed pixel areas of frame images during the wipe in accordance with the first embodiment of the present invention.
Figure 28A:
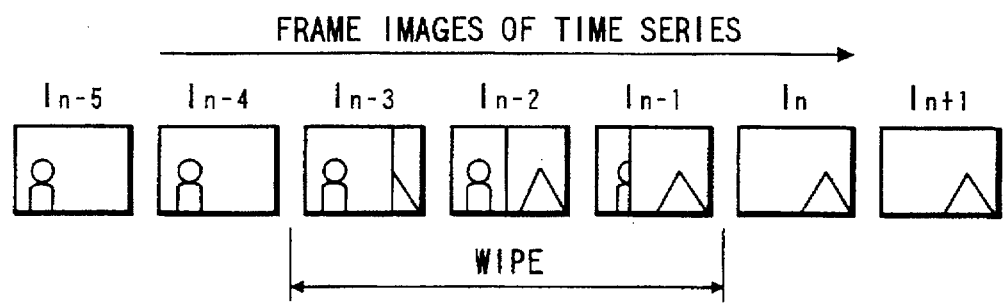
FIG. 28A is conceptual view showing variation of frame images during a scene change resulting from the wipe.
Figure 28B:
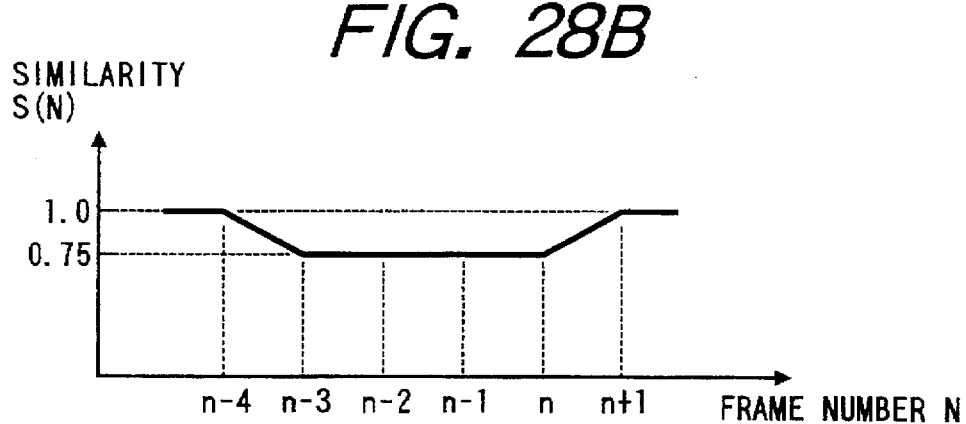
FIG. 28B is a graph showing variation of similarity S(N) during the scene change resulting from the wipe.

As shown in FIGS. 28A and 28B, each frame image during the wipe consists of a video region which is part of the preceding scene and another video region which is part of the next scene. The former is successively replaced by the latter. Each pixel involved in the replaced portion causes change of brightness. Thus, brightness difference is obtained between corresponding pixels located on the same position of the consecutive frame images $I_{N-1}$ and $I_N$. A set of pixels having an absolute value exceeding a predetermined threshold $\theta_{w1}$ in the above brightness difference is specified as an intensity-changed pixel region $RIC_N$. The intensity-changed pixel region of a frame image within the wipe region includes pixel regions replaced by wipe. The wipe ends when the video of the former scene is completely replaced by the video of the latter scene. Thus, a value obtained by dividing the number of pixels involved in the sum-set of intensity-changed pixel regions of plural frame images by the total number of pixels constituting the frame image is specified as a replaced area SIDH. As shown in FIG. 7, the replaced area SIDH of frame images during the wipe is 100%.

Figure 8:
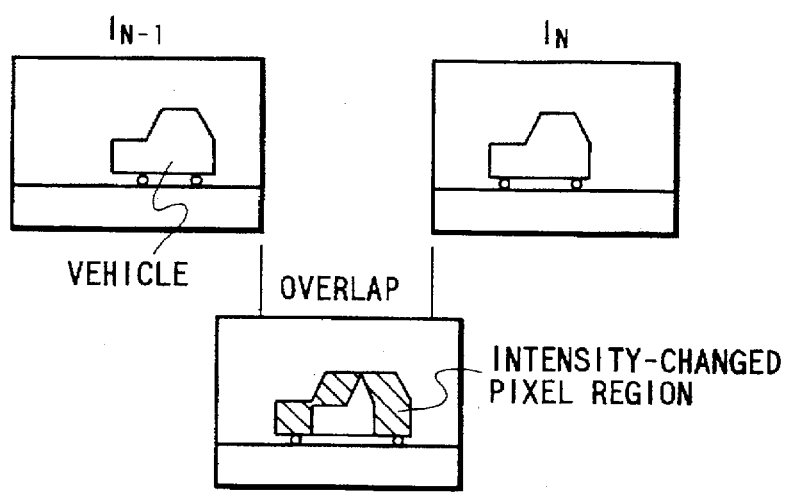
FIG. 8 is a conceptual view showing intensity-changed pixel areas caused by a mobile object in accordance with the first embodiment of the present invention.

As shown in FIG. 8, the intensity-changed pixel region $RIC_N$ between frame images $I_{N-1}$ and $I_N$ reflects the trace of a mobile object, such as a vehicle, on the screen. Furthermore, an object, even if it is stationary, may cause a trace on the screen in the event of camera movements such as zooming and panning. Accordingly, when a ratio (or shape) of the number of pixels involved in the intensity-changed pixel region $RIC_N$ to the total number of pixels constituting the frame image is specified as an intensity-changed pixel area $IDHa(N)$, it is considered that the intensity-changed pixel area $IDHa(N)$ reflects the total quantity of movements of the objects and camera.

When a sudden change occurs or a discontinuous movement happens on the screen, the intensity-changed pixel area $IDHa(N)$ is widely changed. Furthermore, in the case of discontinuous scene changes shown in FIG. 29 or video cuts, the intensity-changed pixel area promptly increases. However, during wipe, there is an upper limit $\theta_{gap}$ to be set as a threshold with respect to the change amount of the intensity-changed pixel area, since the change amount of an area to be replaced by the next scene is small for the wipe. Thus, it is assumed that any two frame images In-1 and In, when they are within wipe, do not satisfy the following requirement.

$$IDHa(n) - IDHa(n-1) > \theta_{gap} \quad (12)$$

In this method, let the maximum value of the number of frames required for wide be nwmax. Also, let an estimation value for the frame number just preceding the place where the wide starts be a wipe-start-candidate point nw1. Then, it is judged whether a frame image Inwjud succeeding the wipe-start-candidate point is identical with the frame image corresponding to the end of wide. Hereinafter, the description is based on the case where the wipe-start-candidate point nw1 is updated in accordance with a value of the frame image to be judged. Furthermore, the second embodiment is based on the case where frame images to be processed are time series. Thus, the reference adopted for the explanation is placed on the last frame, when seen in the direction of time, in the row of frame images used in the calculation of the intensity-changed pixel area. Hence, the above judged frame image is expressed as $I_{N-nconst+1}$.

First, when the frame number Np located immediately after video cut exists between the wipe-start-candidate point nw1 and the frame number nwjud of the above judged frame image, the wipe-start-candidate point nw1 is replaced by the frame number Np. As explained above, any frame images $I_{n-1}$ and $I_n$ do not satisfy the formula 12 when they are part of wipe. Thus, when frame number n satisfying the formula 12 exists between the wipe-start-candidate point nw1 and the frame number nwjud of the above judged frame image, the frame number (n+1) is specified as a wipe-start-candidate point. The frame number (n+1) corresponds to a frame image immediately after the intensity-changed pixel area abruptly increases. Furthermore, the maximum value of the number of frames required for the wipe is set beforehand. Thus, the wipe-start-candidate point nw1 is updated in such a manner that the number of frame images between the frame image $I_{nw1}$ of the wipe-start-candidate point nw1 and the above judged frame image $I_{nwjud}$ does not exceed the maximum value nwmax of the number of images required for the wipe.

Next, calculated are the number of pixels involved in the sum-set of the intensity-changed pixel regions RICnw1, - - - , RICnwjud between the frame image $I_{nw1}$ of the wipe-start-candidate point nw1 and the above judged frame image $I_{nwjud}$, and the replaced area SIDH which represents a ratio of the number of pixels involved in the sum-set of intensity-changed pixel regions of plural frame images to the total number of pixels constituting the frame image.

Furthermore, it is assumed that movements of objects and camera become steady immediately after completing scene changes, in order to eliminate excessive or erroneous detections of the transitional part of scene changes which widely changes the intensity-changed pixel area, thereby assuring the detection of scene changes resulting from the wipe. A part becoming steady is referred to as a steady-state section. The number of frame images involved in the steady-state section is designated as nconst. Then, it is checked whether the above replaced area SIDH is substantially 100% and also whether intensity-changed pixel areas IDHa(nwjud) through IDHa(nwjud+nconst−1) between the above judged frame images $I_{nwjud}$ and $I_{nwjud+nconst-1}$ are within a predetermined region. If both requirements are met, it is considered that the region ranging from the judged frame image $I_{nwjud}$ to $I_{wjud+nconst-1}$ is the steady-state section. And also, it is judged that the frame image $I_{wjud}$ is the frame image corresponding to the end of wipe.

Figure 9:
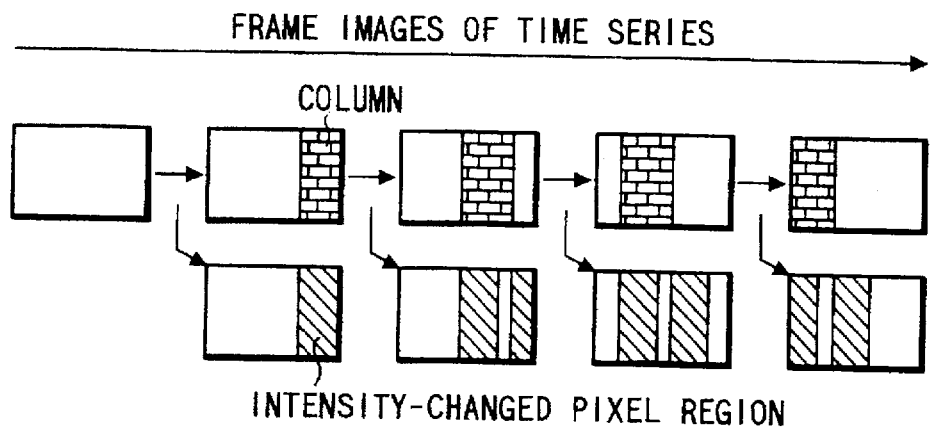
FIG. 9 is a conceptual view showing a shifting movement of a column resulting from panning in accordance with the first embodiment of the present invention.

However, the method of using both the replaced area SIDH and the intensity-changed pixel area IDHa(N) may erroneously detect panning as wipe. For example, as shown in FIG. 9, a column causes a shift movement as a result of panning effect, which will be possibly detected as wipe. Thus, a comparison is made between the head frame image of the present scene and the frame image $I_{nwjud}$ of the scene-change-point candidate. If a large similarity is shown, it is judged that both images belong to the same scene, thereby eliminating excessive and erroneous detections derived from panning or the like.

According to this method, there is the possibility that excessive or erroneous detections resulting from panning may increase in a scene where any object is tracked at the same velocity. As it is assumed that camera movements are steady immediately after the scene change, such an equi-velocity tracking section may be erroneously detected. Hence, there is provided a lower limit θstill, to check whether the intensity-changed pixel area is larger than θstill for a duration from the wipe-start-candidate point to the scene-change-point candidate, and also is substantially a constant value. If so, it is considered that an equi-velocity tracking is detected, thereby suppressing excessive or erroneous detection of panning.

Next, the principle of the fourth scene-change-point detecting method for detecting scene changes resulting from the editing effects similar to page-translate or comparable camera movements will be explained in accordance with the present invention.

Figure 10:
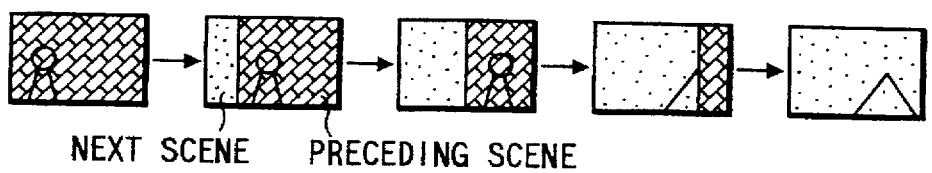
FIG. 10 is a conceptual view showing a scene change resulting from page-translate in accordance with the first embodiment of the present invention.
Figure 11:
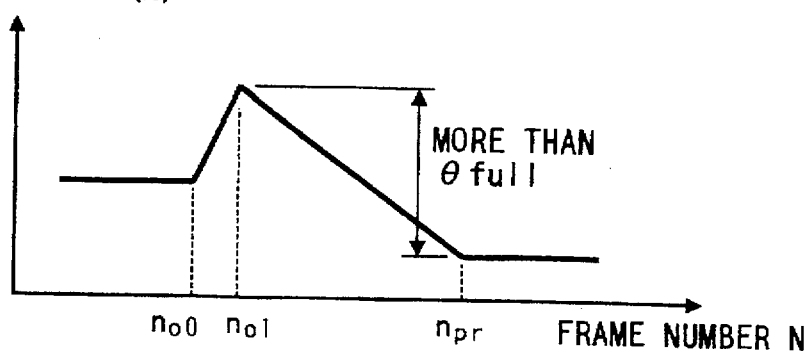
FIG. 11 is a graph showing variation of an intensity-changed area during the page-translate in accordance with the first embodiment of the present invention.

FIG. 10 shows an example of a scene change resulting from the page-translate. In page-translate, a preceding scene moves or shifts while the share of its area is continuously reduced on the screen. In such a case, the preceding scene is regarded as a mobile object. Occurrence of mobile object normally increases the intensity-changed pixel area IDHa (N). Accordingly, during the page-translate, the intensity-changed pixel area becomes large compared with the intensity-changed pixel area of the frame image of the next scene due to effects of movements of the preceding scene. Hence, let the frame number corresponding to start of the page-translate be no0. And, let the frame number corresponding to the end of the page-translate be npr. And, it is assumed that the intensity-changed pixel area IDHa(N) once increases but subsequently decreases largely as shown in FIG. 11. In FIG. 11, a page-translate-judgement-start point no1 represents a position where the intensity-changed pixel area IDHa(N) starts decreasing. Thus, the frame number npr representing the end of the page-translate can be obtained by detecting a portion where the intensity-changed pixel area decreases.

Furthermore, movements or expansion of objects may occur in response to high-speed movements such as high-speed panning, wherein the intensity-changed pixel area IDHa(N) will cause the change similar to the page-translate. Thus, the high-speed camera movements can be also detected by obtaining the portion where the intensity-changed pixel area decreases. Furthermore, there will be cases where the camera-movement-start point equivalent to no0 of FIG. 11 cannot be obtained, for example, when a scene just starts from an intermediate portion of a certain camera movement such as zooming or panning. This method can, however, detect the camera-movement-end point npr regardless of presence of the camera-movement-start point.

Hereinafter, the explanation is based on the case where a judgement is made as to whether the judged frame image $I_{nojud}$ selected from the frames succeeding the page-translate-judgement-start point no1 is a frame image corresponding to the end of scene change by updating the page-translate-judgement-start point no1. However, as described previously, the judged frame image corresponds to the head frame image $I_{N-const+1}$ of the steady-state section. Furthermore, in the first and second embodiments, smoothing of intensity-changed pixel areas is executed in the direction of time. This smoothing processing causes time delay equivalent to two frames. Thus, the above judged frame image $I_{nojud}$ is replaced by $I_{N-nconst-1}$.

First of all, maximum and minimum values of intensity-changed pixel areas IDHa(no1) through IDHa(nojud−1) are obtained between the frame image $I_{no1}$ of the page-translate-judgement-start point and the frame image $I_{nojud-1}$ located immediately before the above judged frame image. The obtained maximum and minimum values are specified as a sectional maximum change area IDHmax (nojud) and a sectional minimum change area IDHmin (nojud), respectively. Furthermore, to let the page-translate-judgement-start point no1 represent the frame number of the portion where the intensity-changed pixel area starts decreasing as shown in FIG. 11, the page-translate-judgement-start point no1 is replaced by the frame number nojud of the judged frame image when the following condition is established.

$$IDHa(n_{ojud}) > IDHmax(n_{ojud}) \qquad (13)$$

In turn, it is judged whether the following conditions are established.

$$IDHa(n_{o1}) - IDHa(n_{ojud}) > \theta full \qquad (14a)$$

$$IDHa(n_{ojud}) \leq IDHa(n_{ojud+1}) \qquad (14b)$$

When the above two formulas are satisfied simultaneously, it is considered that decrease of the intensity-changed pixel area is ceased at the above judged frame image. Thus, it is judged that the judged frame image Inojud meets with the frame image representing the end of scene.

The method using the above formulas 14a and 14b tends to excessively or erroneously detect the portion where the motion of objects is delayed during the discontinuous movement. However, such excessive or erroneous detections can be suppressed by introducing the calculation of similarity between the head frame image of the present scene and the frame image corresponding to the end of scene change, in the same manner as the method described in the principle of the third scene-change-point detecting method in accordance with the present invention.

Furthermore, to suppress excessive detections of transitional part of scene changes, it is possible to introduce the assumption of steady-state section in the same manner as the third scene-change-point detecting method of the present invention. In this case, instead of using the formula 14b, it is checked whether the intensity-changed pixel area IDH (nojud) through IDHa(nojud+nconst−1) of the steady-state section are within a predetermined region. Furthermore, when the detection of the portion where decrease of intensity-changed pixel area is ceased is required in addition to introduction of the assumption of the above steady-state section, it is checked whether the following conditions are established.

$$IDHa(n_{ojud}) \leq IDHa(nj), \quad n_{ojud} < nj \leq n_{ojud} + n_{const} - 1 \qquad (15)$$

Furthermore, it is assumed that the portion immediately after the end of scene change exists between no1 and npr as shown in FIG. 11, and the following formulas are established.

$$IDHa(n_{ojud}) \leq IDHa(n) + \theta_{ups}, \quad n_{o1} \leq n < n_{ojud} \leq n_{pr} \qquad (16)$$

Thus, it becomes possible to further suppress the excessive detections of the transitional part of the discontinuous movement which normally causes fluctuation of the intensity-changed pixel area. The formula 16 can be modified as follows.

$$IDHa(n_{ojud}) \leq IDHmin(n_{ojud}) + \theta_{ups}, \quad n_{o1} < n_{ojud} \leq n_{pr}$$

Hence, the present method checks whether the following condition is established.

$$IDHa(n_{ojud}) \leq IDHmin(n_{ojud}) + \theta_{ups} \qquad (17)$$

If the above formula is not established, it is considered that the above formula 16 is not established and, therefore, the frame number nojud of the above judged frame image is not included in the region between no1 and npr which corresponds to the portion immediately before the end of scene change. Thus, the page-translate-judgement-start point no1 is replaced by the frame number nojud of the judged frame image.

Figure 12:
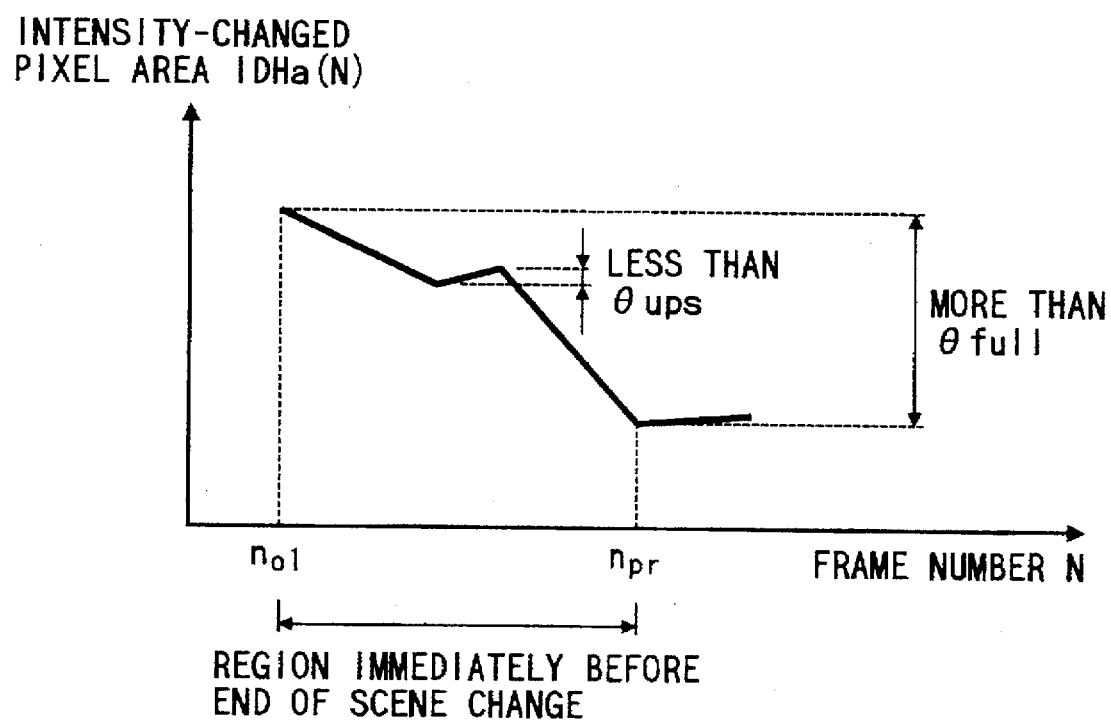
FIG. 12 is a graph showing gradual reduction of the intensity-changed area during the page-translate in accordance with the first embodiment of the present invention.

Hereinafter, the embodiments of the present invention will be explained in greater detail with reference to the accompanying drawings. Embodiments of the present invention realize the above-described principle methods, respectively. By the way, the embodiment relating to the fourth scene-change-point detecting method will not use the assumption that the intensity-changed pixel area gradually decreases in the region immediately before the end of scene change as shown in FIG. 12, although such an assumption is used in the foregoing explanation of the principle of this fourth scene-change-point detecting method.

FIG. 1 is an overall schematic diagram showing an image browsing system in accordance with one embodiment of the present invention. In FIG. 1, reference numerals 30 and 31 are input/output devices for processing images, where 30 denotes a video disk device while 31 denotes a VTR. Reference numeral 32 represents a frame memory which fetches frame images of the image signal entered from the video disk device 30 and the VTR 31. Reference numeral 33 represents a computer which sends control signals to the frame memory 32 to fetch frame images and then detects true transitions of video (i.e. scene changes) by processing the fetched frame images of time series. Reference numeral 34 represents a monitor which displays a list of frame images corresponding to the scene change points detected by the computer 33. Reference numeral 35 represents an external memory device which memorizes images of the scene change points detected by the computer 33 and their frame numbers.

Figure 13:
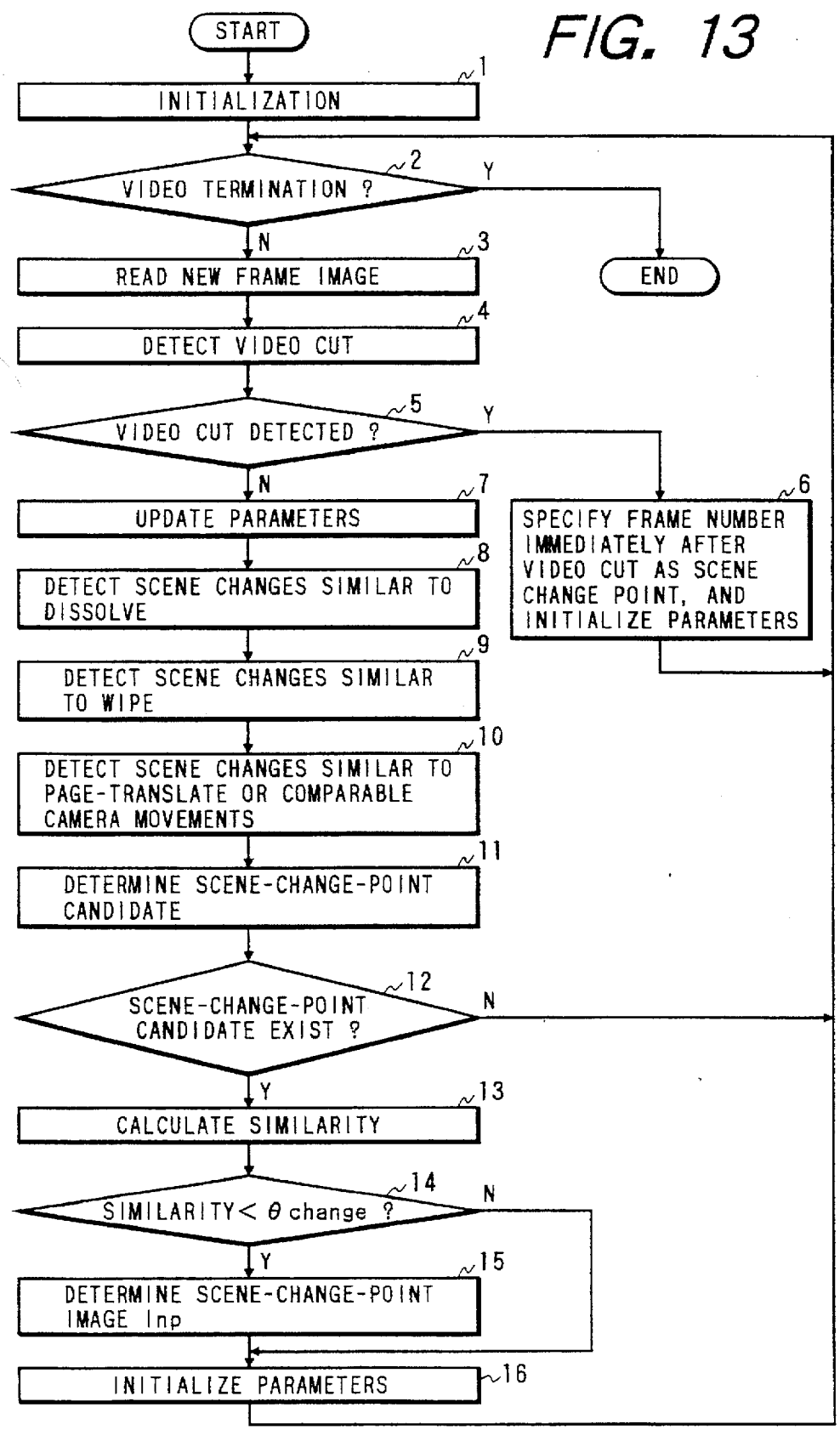
FIG. 13 is a flow chart showing a scene change point detecting procedure in accordance with the first embodiment of the present invention.

FIG. 13 shows a flow chart illustrating one example of a scene-change-point detecting procedure executed by the computer 33 of FIG. 1.

First of all, in an initialization processing 1 of the flow chart of FIG. 13, numerous parameters used in the scene-change-point detecting procedure are initialized. Also set in this step are various thresholds used in the scene-change point detecting procedure, such as a maximum value nwmax of the frame number required for wipe, a length nconst of the steady-state section of a head of scene, and a minimum value nedge of the frame number the edge intensity factor varies widely in the dissolve. Further, a frame image In, i.e. an object to be processed, is fetched from the frame memory 32 and is displayed on the monitor 34 by a reduced size as a head frame image Inp of an initial scene. Then, as feature quantities representing the frame image thus fetched, obtained are an edge intensity factor for detecting scene changes resulting from the editing effects such as dissolve, and constituent colors $CV_{j,n}$ in each partial region, where j=1, - - - ,k, and k is the total number of partial regions used for the video-cut detection. The initialization of parameters and calculation method of above-described feature quantities will be explained in more detail.

Of feature quantities used in this embodiment, the above-described edge intensity factor and constituent colors are calculated using one frame image. However, the intensity-changed pixel area and the frame image similarity are calculated based on a frame image one frame time before. The dissolve-judgement-start point nd0 is a parameter representing a search start point for detecting time variation of the above-described edge intensity factor; thus, the frame number np of the head frame image is used as an initial value for the dissolve-judgement-start point nd0. The wipe-startcandidate point nw1 and the page-translate-judgement-start point no1 are parameters representing a search start point for detecting time variation of the intensity-changed pixel area; thus, the frame number (np+1) of the specific frame first enabling the calculation of the intensity-changed pixel area is used as an initial value for the wipe-start-candidate point nw1 and the page-translate-judgement-start point no1. The dissolve feature point nd1 and the edge-intensity-extreme point nd2 are parameters to be set based on time variation of the edge intensity factor; thus, US (no value is set at this moment) is used as an initial value for the dissolve feature point nd1 and the edge-intensity-extreme point nd1.

Assuming that f(n,i,j) represents a brightness of a jth pixel from the left on an ith line of the frame image In, the above-described edge intensity factor E(n) is obtained in the following manner.

First, the brightness f(n,i,j) of each pixel is obtained, using a red component RR(n,i,j), a green component GG(n,i,j) and a blue component BB(n,i,j) of each pixel.

$$f(n,i,j)=0.299 \times RR(n,i,j)+0.587 \times GG(n,i,j)+0.114 \times BB(n,i,j) \quad (18)$$

Next, a horizontal component Eh(n,i,j) and a vertical component Ev(n,i,j) of the edge of each pixel are obtained by the formula of sobel filter.

$$\begin{aligned}Eh(n,i,j) = &\ f(n,i-1,j+1) - f(n,i-1,j-1) + \\ &\ 2 \times f(n,i,j+1) - 2 \times f(n,i,j-1) + \\ &\ f(n,i+1,j+1) - f(n,i+1,j-1) \end{aligned} \quad (19)$$

$$\begin{aligned}Ev(n,i,j) = &\ f(n,i-1,j-1) - f(n,i+1,j-1) + \\ &\ 2 \times f(n,i-1,j) - 2 \times f(n,i+1,j) + \\ &\ f(n,i-1,j+1) - f(n,i+1,j+1)\end{aligned} \quad (20)$$

Then, the edge intensity factor E(n) is calculated by entering these values into the formula 7.

Furthermore, the above-described constituent color $CV_{j,n}$ is obtained in the following manner. First, the frame image In is dissected into k partial regions R(j,n), where j=1 - - - k. Next, the histogram H(c,j,In) of a color c is obtained in each partial region. Then, the constituent color $CV_{j,n}$ is obtained based on a formula using a threshold $\theta h$ for removing noises.

$$CV_{j,n}=\{c|H(c, j, I_n) > \theta h\} \quad (21)$$

In this embodiment, the frame image is dissected into 16 partial regions as shown in FIG. 26. Regarding the color c, a total of 512 colors are used for exhibiting 8 gradations of red, green and blue components.

According to this embodiment, when the following condition is met, the obtained constituent color is neglected as noise and it is prohibited to consider that color c exists in the concerned partial region.

$$H(c, j, I_n) \leq \theta h$$

When the frame image is displayed on the monitor 34, it will be preferable to display the frame memory in addition to the frame image through communication with the video disk device 30 and the VTR 31 to read the frame number of the fetched frame memory. Hereinafter, a suffix n of the frame image to be processed is designated as the frame number of the image fetched from the frame memory 32.

Next, in a video termination judgement step 2 of the flow chart in FIG. 13, it is judged as to whether or not the presently processed video is terminated. When the video is already terminated, the procedure of the flow chart is completed. By the way, if all the frame images corresponding to the detected scene change points are memorized in the external memory device 35 at the end of the procedure, it becomes possible to take out the information relating to the scene change points to utilize them in the editing of video or the like. The similar effects will be obtained by memorizing the frame numbers, instead of the frame images, in the external memory device 35.

When the concerned video has not yet terminated, the flow proceeds to an image update step 3 of FIG. 13, wherein the next frame image In-1 succeeding the presently processed frame image is designated as a newly processed frame image In. The reproduction of the newly processed frame image In is made by sending control signals to the video disk deice 30 and the VTR 31. And, the frame image In is fetched from the frame memory 32. Furthermore, the scene-change-point candidate is replaced by US.

In a video-cut detection step 4 of FIG. 13, the frame image In is processed to judge as to whether the preceding frame image In-1 processed in the last processing is a frame image immediately after the video cut. Details of the video-cut detection 4 will be explained with reference to FIG. 14.

Figure 14:
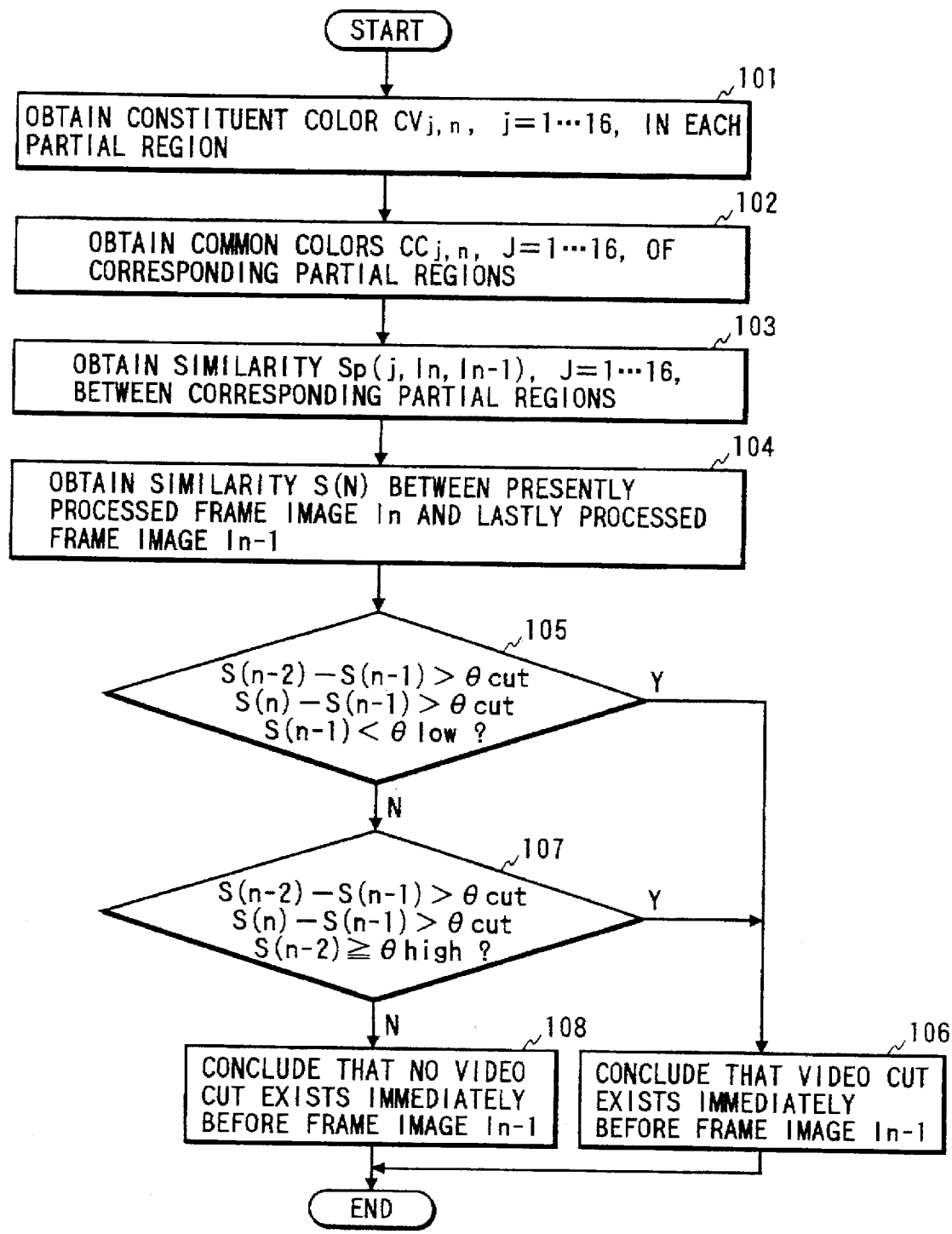
FIG. 14 is a flow chart showing a video-cut detecting procedure in accordance with the first embodiment of the present invention.

In a constituent color calculation step 101 of FIG. 14, a constituent color $CV_{j,n}$, where j=1, - - - 16 of each partial region of the frame image In is obtained using the formula 21.

Figure 15:
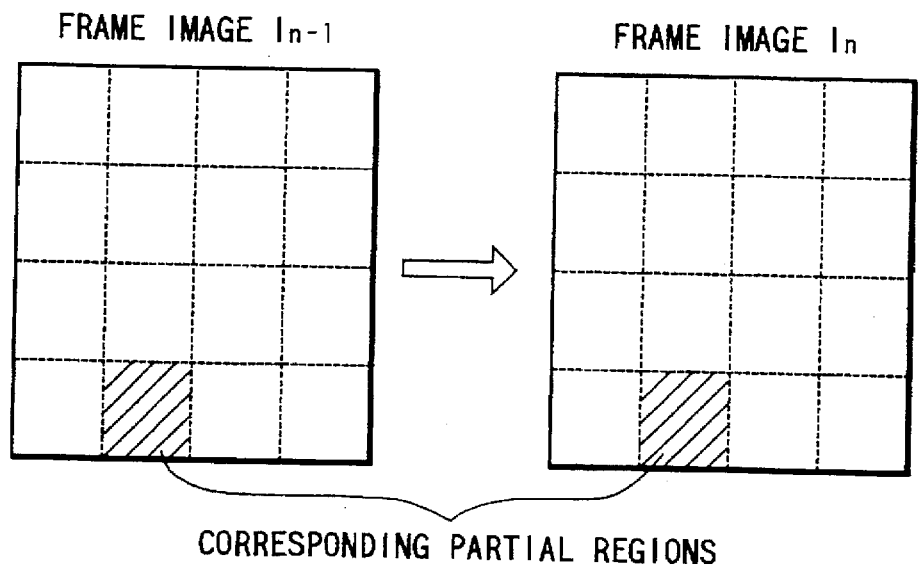
FIG. 15 is a conceptual view showing corresponding partial regions of frame images in accordance with the first embodiment of the present invention.

In a common color calculation step 102 of FIG. 14, partial regions located at the same position on the frame images In-1 and In as shown in FIG. 15 are identified as corresponding partial regions. The common colors $CC_{j,n}$, j=1 - - - 16, which are common part of constituent colors of the corresponding partial regions on the frame images In-1 and In, is calculated using the following formula.

$$CC_{j,n}=\{C|C \in CV_{j,n} \cap CV_{j,n-1}\} \quad (22)$$

In a partial region similarity calculation step 103 of FIG. 14, the similarity Sp(j, In-1, In) between the corresponding partial regions is calculated in the following manner.

An area of the region having the common colors in each of the corresponding partial regions R(j, Im), where m=n-1, n, is obtained as follows.

$$AC(j,n,Im) = \sum_{C \in CCj,n} H(c,j,Im) \quad (23)$$

Meanwhile, an area-of the region having the constituent color is obtained as follows.

$$AV(j,Im) = \sum_{C \in CVj,m} H(c,j,Im) \quad (24)$$

Using these values, the similarity Sp(j, In-1, In) between the corresponding partial regions is obtained as follows.

$$Sp(j,In-1,In) = \min \left( \frac{AC(j,n,In-1)}{AV(j,In-1)}, \frac{AC(j,n,In)}{AV(j,In)} \right) \quad (25)$$

The similarity Sp calculated based on the formula 25 has characteristics that its value decreases in accordance with an area of a newly appearing or disappearing color in the corresponding partial regions.

In the image similarity calculation step 104 of FIG. 14, a similarity S(n) between two consecutive frame images In-1 and In is obtained by taking an average of the similarity Sp(j, In-1, In), where j=1 - - - 16, calculated based on the formula 25.

In a first video-cut judgement step 105 of FIG. 14, a judgement is made as to whether the following formulas 2' to 4' corresponding to the formulas 2 to 4 using the predetermined thresholds $\theta$cut and $\theta$low are simultaneously satisfied. The formulas 2' to 4' are given as follows.

$$S(n-2)-S(n-1) > \theta_{cut} \qquad (2')$$

$$S(n)-S(n-1) > \theta_{cut} \qquad (3')$$

$$S(n-1) < \theta_{low} \qquad (4')$$

If all the formulas 2', 3' and 4' are established simultaneously, the flow proceeds to a first judgement result setting step 106 to make a conclusion that the video cut exists immediately before the judged frame image In−1. Then, the video-cut detection step 4 is completed. Otherwise, the flow proceeds to a second video-cut judgement step 107 of FIG. 14.

In the second video-cut judgement step 107 of FIG. 14, another judgement is made as to whether the formulas 2', 3' and the following formula 5' corresponding to the formula 5 using the predetermined thresholds θcut and θhigh are simultaneously satisfied. The formula 5' is given as follows.

$$S(n-2) \geq \theta_{high} \qquad (5')$$

If all the formulas 2, 3 and 5' are established simultaneously, the flow proceeds to the first judgement result setting step 106 to make a conclusion that the video cut exists immediately before the judged frame image In−1. Then, the video-cut detection step 4 is completed. If not, the flow proceeds to a second judgement result setting step 108 to make a conclusion that no video cut exists immediately before the judged frame image In−1. Then, the video-cut detection step 4 is completed.

Although the present embodiment uses the formula 25 for obtaining the similarity between the corresponding partial regions, it is also possible to use other appropriate physical quantity for obtaining the above-described similarity as long as its value decreases in accordance with the area of newly appearing or disappearing color. For example, the following formula is adoptable.

$$Sp(j, In-1, In) = \left\{ \frac{AC(j,n,In-1)}{AV(j,In-1)} + \frac{AC(j,n,In)}{AV(j,In)} \right\} \times \frac{1}{2} \qquad (25')$$

In addition, although the present embodiment uses the formulas 4 or 5 in order to eliminate excessive detections of scene changes resulting from editing effects, it is also possible to use any formula which shows that the similarity between the frame images within the same scene becomes a large value and the similarity between the frame images across the video cut becomes a small value.

After the video-cut detection step 4 of FIG. 13, the flow proceeds to a branch step 5, wherein it is judged whether the video cut exists immediately before the judged frame image In−1 based on the results of the step 4. When the video cut is detected, the flow proceeds to an initialization step 6. When the video cut is not detected, the flow proceeds to a parameter update step 7.

By the way, in the flow chart of FIG. 13, if the flow proceeds from the branch step 5 to the video termination judgement step 2 without going to the parameter update step 7 after no video cut is detected in the video-cut detection step 4, this scene change point detecting method can be utilized as a video-cut detecting method. Furthermore, when a video including no cut is input, there is no necessity of executing the video-cut detection step 4, the branch step 5 and the initialization step 6.

In the initialization step 6 of FIG. 13, the frame image In−1 is considered as a frame image corresponding to the scene change point (hereinafter, referred to as scene-change-point image), and is displayed on the monitor 34 as a head frame image Inp of the concerned scene by a reduced size.

Figure 16:
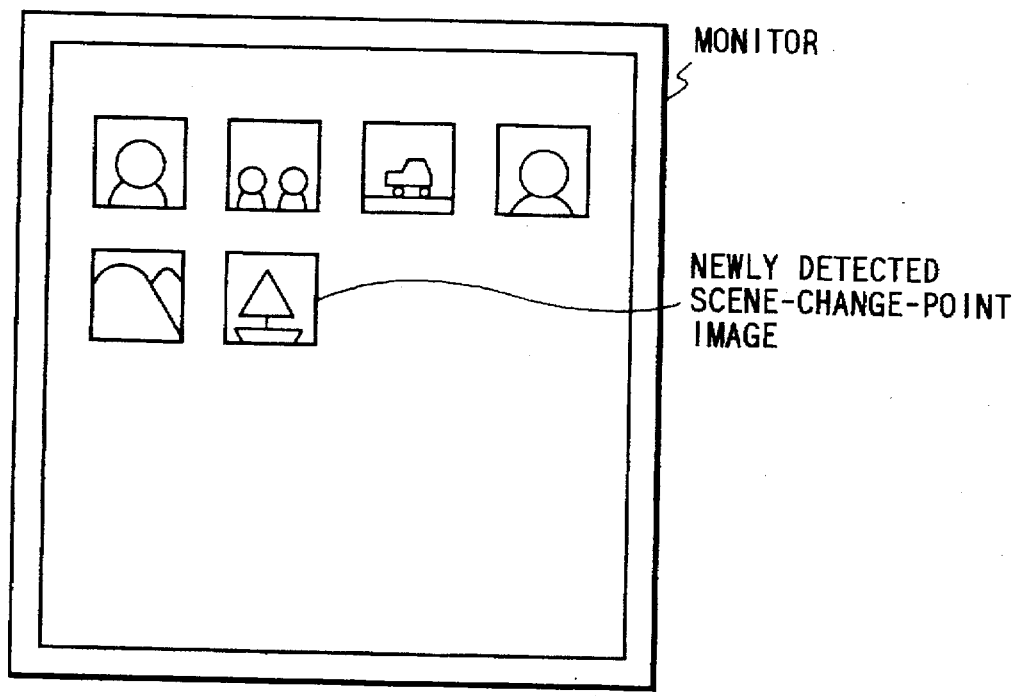
FIG. 16 is a conceptual view showing a list displaying scene-change-point images in accordance with the first embodiment of the present invention.

Thereafter, the flow returns to the video termination step 2 of FIG. 13. In this case, as shown in FIG. 16, a newly detected scene-change-point image is arrayed together with the previously detected scene-change-point images. Furthermore, to execute a processing corresponding to the parameter initialization in the initialization step 1 of FIG. 13, the frame number (n−1) of the above-described scene-change-point image is substituted for the dissolve-judgement-start point nd0. Meanwhile, the next frame number n of the above-described scene-change-point image is substituted for the wipe-start-candidate point nw1 and the page-translate-judgement-start point no1. The dissolve feature point nd1 and the edge-intensity-extreme point nd2 are both replaced by US.

In the parameter update step 7 of FIG. 13, the feature quantities in the frame image In are calculated to update the parameters used in the scene change point detection. Details of the parameter update step 7 will be explained with reference to the flow chart of FIG. 17.

Figure 17:
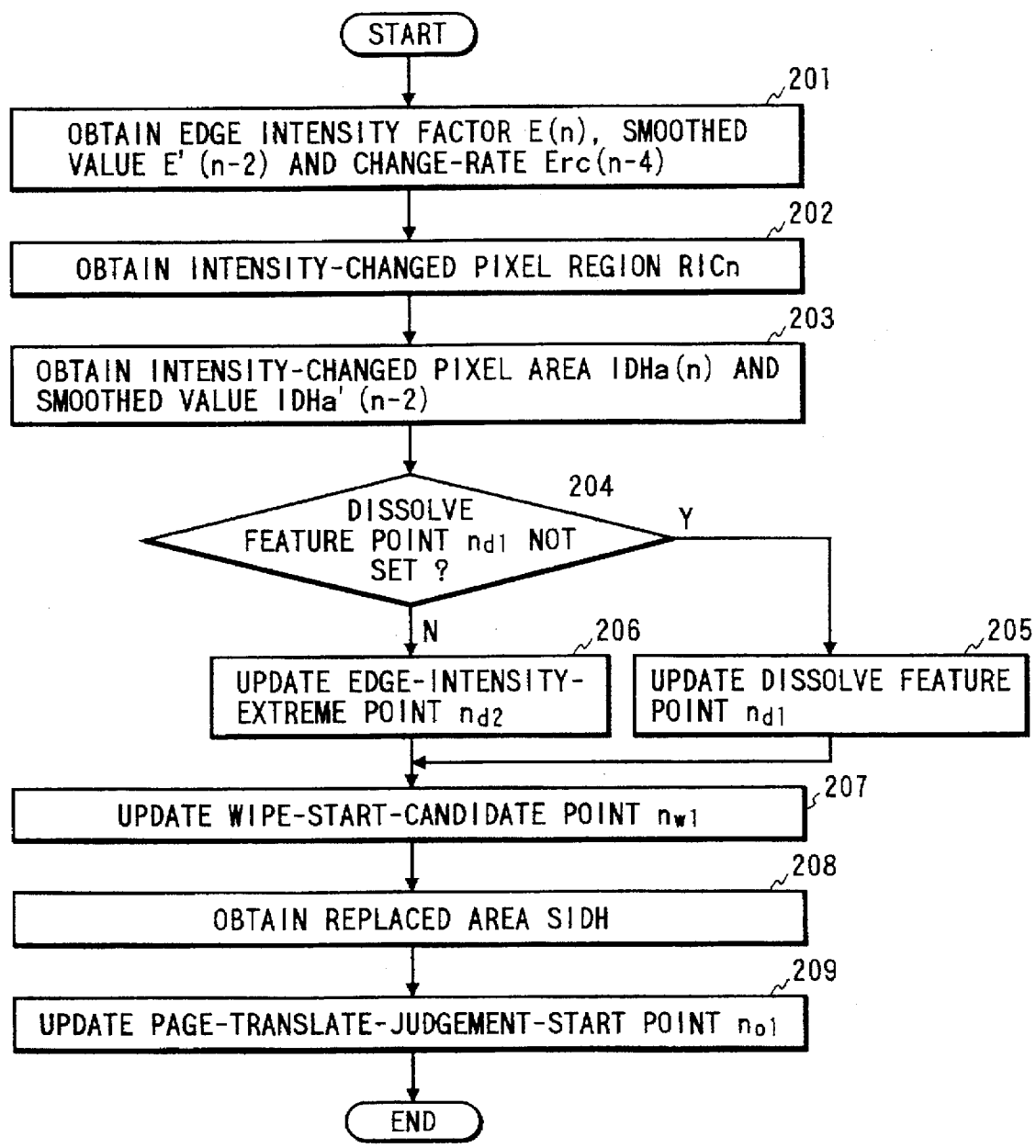
FIG. 17 is a flow chart showing a parameter update procedure in accordance with the first embodiment of the present invention.

In an edge intensity calculation step 201 of FIG. 17, the brightness $f(n,i,j)$ of each pixel is obtained using the formula 18. Subsequently, the horizontal component $Eh(n,i,j)$ and the vertical component $Ev(n,i,j)$ of the edge of each pixel are obtained using the formulas 19 and 20. Then, the edge intensity factor $E(n)$ is calculated using the formula 7. Thereafter, to remove noises, an edge intensity factor $E'(n-2)$ is obtained by a smoothing processing using the median filter. In this embodiment, the edge intensity factor $E'(n-2)$ is obtained by smoothing a total of five values; already smoothed edge intensity factors $E'(n-4)$ and $E'(n-3)$, a presently smoothed edge intensity factor $E(n-1)$, and later smoothed edge intensity factors $E(n-1)$ and $E(n)$. In the case that either the frame image In−3 or In−2 is a head frame image of the present scene, the above values $E'(n-4)$ and $E'(n-3)$ are not available. Thus, the smoothing operation is not executed. Instead, $E(n-2)$ is substituted for $E'(n-2)$.

Furthermore, a change-rate $Erc(n-4)$ of the edge intensity factor is calculated using the smoothed edge intensity factors $E'(n-4)$ to $E'(n-2)$.

$$Erc(n-4) = \{E'(n-2) - E'(n-4)\}/E'(n-3) \qquad (26)$$

The change-rate $Erc(n-4)$ is used for detecting the scene changes resulting from the editing effects similar to the dissolve.

In an intensity-changed pixel region calculation step 202 of FIG. 17, the brightness difference between two pixels located on the same position of the frame images In−1 and In is obtained. And then, the intensity-changed pixel region RICn is obtained as a set of pixels which meet the condition that an absolute value of the brightness difference between the frame images In−1 and In exceeds the predetermined threshold θw1.

In an intensity-changed pixel area calculation step 203 of FIG. 17, an intensity-changed pixel area IDHa(n) is obtained by dividing the intensity-changed pixel region RICn obtained in the intensity-changed pixel region calculation step 202 by the pixel number of the frame image In. Then, to remove noises, a smoothed intensity-changed pixel area IDHa'(n−2) is obtained by using the median filter. In the same manner as in the smoothing processing of the edge intensity factor, the smoothed intensity-changed pixel area IDHa'(n−2) is obtained as a median vale of a total of five values; already smoothed intensity-changed pixel areas IDHa'(n−4) and IDHa'(n−3), a presently smoothed intensity-changed pixel area IDHa(n−2), and later smoothed intensity-changed pixel area IDHa(n−1) and IDHa(n). In the case that either the frame image In−3 or In−2 is a head frame image of the present scene, the above values IDHa'(n−4) and IDHa'(n−3) are not available. Thus, the smoothing operation is not executed. Instead, IDHa(n−2) is substituted for IDHa'(n−2). The smoothed intensity-changed pixel area IDHa'(n−2) is used for detecting the scene changes resulting from editing effects similar to the page-translate or comparable camera movements.

Figure 6A:
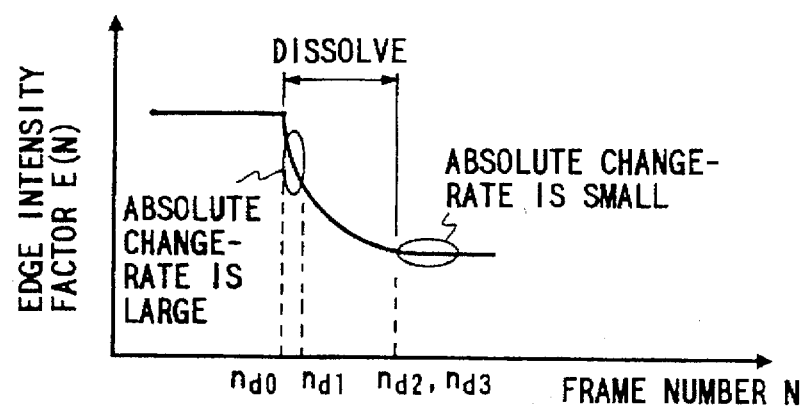
FIGS. 6A–6C are views showing fundamental variation patterns of edge intensity factor in the dissolve assumed in the first embodiment of the present invention.
Figure 6B:
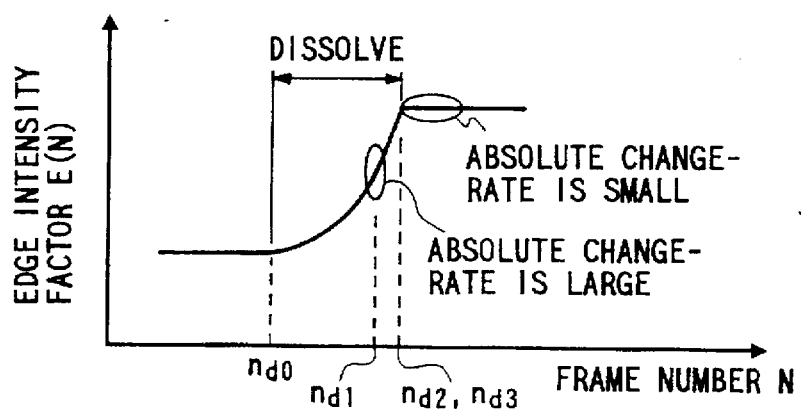
Figure 6C:
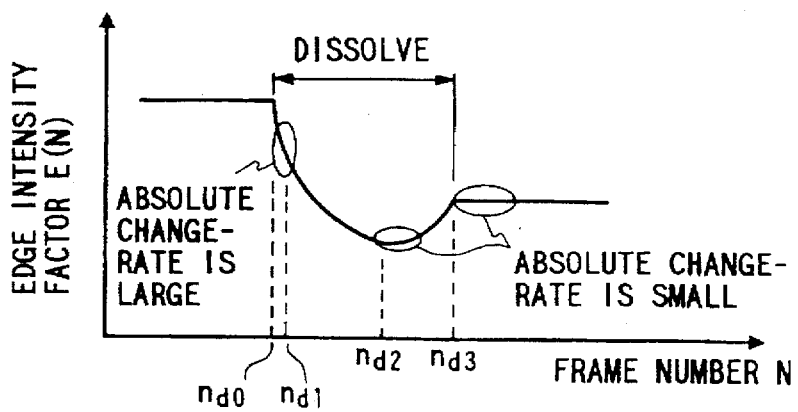

In a branch step 204 of FIG. 17, it is judged whether a value of the dissolve feature point nd1 has not yet been set (nd1=US). The dissolve feature point nd1 represents an transitional frame number of the portion having a large absolute value in the change-rate of the edge intensity factor E(N) as shown in FIGS. 6A–6C. When the relation nd1=US is established, the flow proceeds via a dissolve feature point update step 205 detecting the dissolve feature point nd1 to a wipe-start-candidate point update step 207. Otherwise, the flow proceeds via an edge-intensity-extreme point update step 206 detecting a portion having a small absolute value in the change-rate of the edge intensity factor to the wipe-start-candidate point update step 207.

In the dissolve feature point update step 205, a portion having a large absolute value in the change-rate of the edge intensity factor is detected, thereby updating the dissolve feature point nd1. The initialization step 1 of FIG. 13 already sets a minimum value nedge of a frame number whose edge intensity factor Erc is widely changed in the dissolve. Accordingly, detected here is a case where frames ranging from the frame number (n−4) through a frame number (n−nedge−3) are all contained in the same scene and have a large absolute value in the change-rate Erc. When such a case is detected, (n−4) is substituted for the above-described dissolve feature point nd1. In this case, the maximum frame number (n−4) is the maximum value among frame numbers used in the calculation of the change-rate Erc. The frame number (n−nedge−3) precedes the frame number (n−4) by (nedge−1) frames.

Hence, the present invention substitutes (n−4) for the dissolve feature point, when the following conditions are simultaneously satisfied.

$$|E_{rc}(n-4-i)|>\theta_{edge}, 0 \leq i < n_{edge}$$ (27a)

$$n-4-n_{edge} \geq nd0$$ (27b)

where nd0 is the dissolve-judgement-start point representing the head frame number of the concerned scene, and θedge is a predetermined threshold.

In the edge-intensity-extreme point update step 208, a portion having a small absolute value in the change-rate shown in FIG. 8 is detected, and the frame number corresponding to the head of the detected portion is identified as the edge-intensity-extreme point nd2. In the present invention, it is assumed that the edge-intensity-extreme point nd2 is a portion where the change-rate Erc of the edge intensity alters its sign or becomes zero. Hence, when the following condition is established, the edge-intensity-extreme point nd2 is set to (n−4).

$$E_{rc}(n-5) \times E_{rc}(n-4) \leq 0$$ (28)

In the wipe-start-candidate point update step 207, (n+1) is substituted for the wipe-start-candidate point nw1 when the inequality 12 is established.

When the inequality 12 is not established, it is checked if the following condition is satisfied.

$$nw1 \leq n - n_{wmax} - n_{const} + 1$$ (29)

where nwmax is a maximum value of the frame number required for the wipe, and nconst is the length of the steady-state section of the head on the next scene. When the condition 29 is met, it is believed that numerous frame images the total number of which exceeds the maximum value nwmax of the above-described frame image number exist in a region ranging from the wipe-start-candidate point nw1 to the head frame number (n−nconst+1) of the above-described steady-state section, i.e. in a section which is assumed the wipe. Thus, (n−nwmax−nconst+2) is substituted for the wipe-start-candidate point nw1.

In a replaced area calculating step 208 of FIG. 17, obtained is a sum-set SRIC of intensity-changed pixel regions RICnw1, - - - , RICn-nconst+1 of the frame images Inw1 through In-nconst+1. Next obtained is a share (or ratio) of the number of pixels involved in this sum-set SRIC to the total number of pixels constituting the frame image. The resultant share or ratio is specified as the replaced area SIDH.

In a page-translate-judgement-start point update step 209 of FIG. 17, the intensity-changed pixel area smoothed in the direction of time is used. Hence, a time delay equivalent to two frames is generated. Thus, a portion between the page-translate-judgement-start point n01 and the frame number (n−nconst−1) is considered as the portion immediately before the end of scene change, wherein the frame number (n−nconst−1) is the head frame number of the steady-state section of the head of the next scene when the time lag is taken into consideration. Then, a sectional maximum change area IDHmax (n−nconst−1) is obtained by finding a maximum value in the region from the smoothed intensity-changed pixel areas IDHa'(n01) through IDHa'(n−nconst−2). Subsequently, it is judged whether the following inequality is satisfied.

$$IDHa'(n-n_{const}-1) > IDHmax(n-n_{const}-1)$$ (30)

When the inequality 30 is met, it is considered that the intensity-changed pixel area has increased at the frame number (n−nconst−1). Then, to let the page-translate-judgement-start point n01 agree with the point where the intensity-changed pixel area starts decreasing, (n−nconst−1) is substituted for the page-translate-judgement-start point n01. After finishing the page-translate-judgement-start point update step 209, the parameter update step 7 of FIG. 13 is completed.

Although the present embodiment uses the inequality 12 for updating the wipe-start-candidate point nw1, it is also possible to use the following inequality instead of the inequality 12.

$$|IDHa(n)-IDHa(n-1)|>\theta_{gap}$$ (31)

Furthermore, as the present embodiment detects the video cut at the video-cut detection step 4 of FIG. 13, no video-cut image is input at the parameter update step 7 of FIG. 13. Accordingly, in cases where scene change such as FIG. 29 which includes discontinuous changes can be allowed to detect, there will be no necessity of executing the update processing using the inequality 12 or 31.

After finishing the parameter update step 7 of FIG. 13, the flow proceeds to a dissolve judgement step 8 of FIG. 13. The dissolve judgement step 8 detects the scene changes resulting from editing effects similar to the dissolve. Details of the dissolve judgement step 8 will be explained with reference to the flow chart of FIG. 18.

Figure 18:
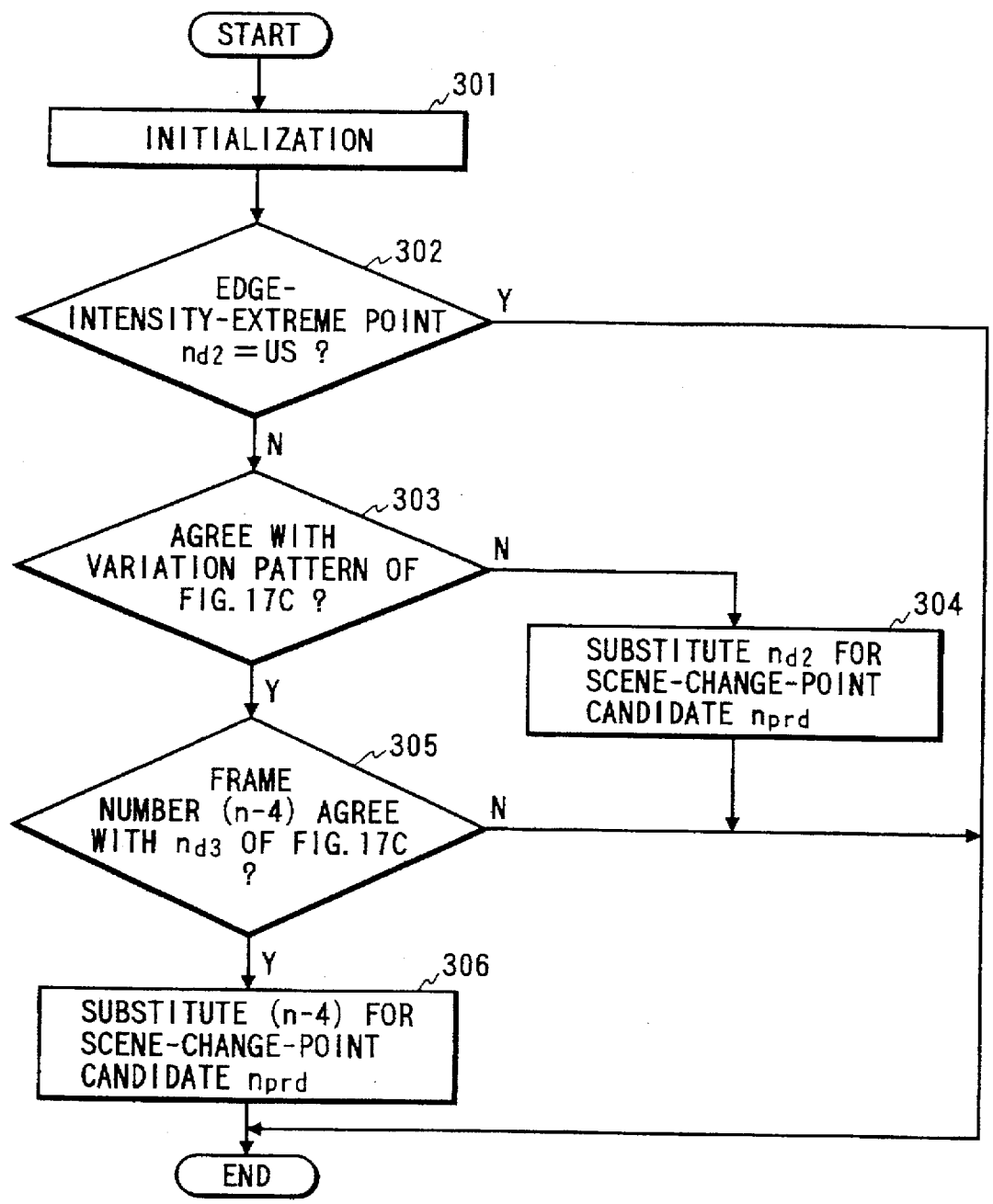
FIG. 18 is a flow chart showing a dissolve judgement procedure in accordance with the first embodiment of the present invention.

In an initialization step 301 of FIG. 18, the scene-change-point candidate (a head frame number candidate of the next scene) nprd is replaced temporally by US for use in the dissolve judgement step 8 of FIG. 13.

In a branch step 302 of FIG. 18, it is checked whether the edge-intensity-extreme point nd2 is not set yet (i.e. nd2=US).

The edge-intensity-extreme point nd2 represents the head frame number of the portion having a small absolute value in the change-rate of edge intensity factor E(N) as shown in FIG. 6.

When nd2=US (no value is set at this moment) is established, it is considered that the judged frame image In-4 is not a scene-change-point image, thus ending the dissolve judgement step 8. Otherwise, the flow proceeds to a local-minimum-point judgement step 303 of FIG. 18.

In the local-minimum-point judgement step 303, the variation pattern shown in FIG. 6C is referred to. Then, it is checked if the following conditions are established.

$$Erc(nd2-1)<0 \quad (32)$$

$$Erc(nd2+3)\geq 0 \quad (33)$$

When the above conditions are simultaneously established, it is considered that increase of Erc(nd2), Erc(nd2+1), - - - meets the variation pattern of FIG. 6C. Then, the flow proceeds to a stable point judgement step 305 of FIG. 18. If not, it is considered that the actual change meets the variation pattern of FIG. 6A or FIG. 63. Thus, the flow proceeds to a scene-change-point candidate setting step 304.

In the scene-change-point candidate setting step 304 of FIG. 18, nd2 is substituted for the scene-change-point candidate nprd. The dissolve feature point nd1 and the edge-intensity-extreme point nd2 are replaced temporarily by US. Next, it is considered that the judged frame image Ind2 is a scene-change-point image candidate. Then, the dissolve judgement step 8 is completed.

In the stable point judgement step 305 of FIG. 18, it is judged whether the frame number (n-4) agrees with the dissolve-end-candidate point nd3 shown in FIG. 6C. The frame number (n-4) is the maximum frame number of the frames used in the calculation of the change-rate Erc of the edge intensity factor. Considering the above formula 33, it is assumed that the frame number (nd2+3) exists between the edge-intensity-local-minimum point nd2 and the dissolve-end-candidate point nd3. Next, it is checked if the following requirements are established.

$$n-4>nd2+3 \quad (34)$$

$$Erc(n-4)\leq 0 \quad (35)$$

When the above requirements are simultaneously established, it is considered that the frame number (n-4) agrees with the dissolve-end-candidate point nd3. The flow then proceeds to a scene-change-point candidate setting step 306. Otherwise, it is judged that the judged frame image In-4 is not a scene-change-point image. Then, the dissolve judgement step 8 of FIG. 13 is completed.

In the scene-change-point candidate setting step 306 of FIG. 18, (n-4) is substituted for the scene-change-point candidate nprd and the dissolve feature point nd1 and the edge-intensity-extreme point nd2 are replaced temporarily by US. Next, it is judged that the judged frame image In-4 is a scene-change-point image candidate. Then, the dissolve judgement step 8 is completed.

Although the present embodiment the sobel filter expressed by the formulas 19 and 20 to calculate the edge, the similar effects will be obtained by using other calculation methods. Furthermore, although the formula 7 is used to calculate the edge intensity factor, another edge intensity factor can be used. For example, the following is the edge intensity of each pixel on the presently processed frame image In.

$$Ei(n,i,j) = \sqrt{\{Eh(n,i,j)^2 + Ev(n,i,j)^2\}}$$

Any physical quantity reflecting the time variation of such an edge intensity will be used as the edge intensity factor. In this case, the formula 11 is not always established during dissolve. However, the dissolve can be detected by detecting a large change of the edge intensity factor.

Furthermore, the present embodiment uses a value obtained by smoothing a row of edge intensity factors in a direction of time, in order to calculate the change-rate Erc(n-4) of the edge intensity factor as shown in the formula 26. The smoothing is not always necessary. For example, the formula 26 can be replaced by the following formula.

$$Erc(n-4)=\{E(n-2)-E(n-4)\}/E(n-3) \quad (26')$$

Other formula will be also used. Moreover, the smoothing of the edge intensity factor can be executed without using median values.

According to the present invention, it is assumed that the edge intensity factor Erc(N), N=1,2 - - - , smoothed in the direction of time, does not cause a steep change. Thus, by using the change-rate Erc(nd2+3) of the edge intensity factor in the frame image Ind2+3 as shown in the formula 33, the increase of the edge intensity factors E(nd2), E(nd2+1) - - - is checked. However, this judgement can be done by using the edge intensity factors E(nd2), E(nd2+1), - - - or the change-rates Erc(nd2), Erc(nd2+1) - - - .

After finishing the dissolve judgement step 8, the flow proceeds to a wipe judgement step 9 of FIG. 13. The wipe judgement step 9 detects scene changes resulting from editing effects similar to the wipe. Details of the wipe judgement step will be explained with reference to the flow chart of FIG. 19.

Figure 19:
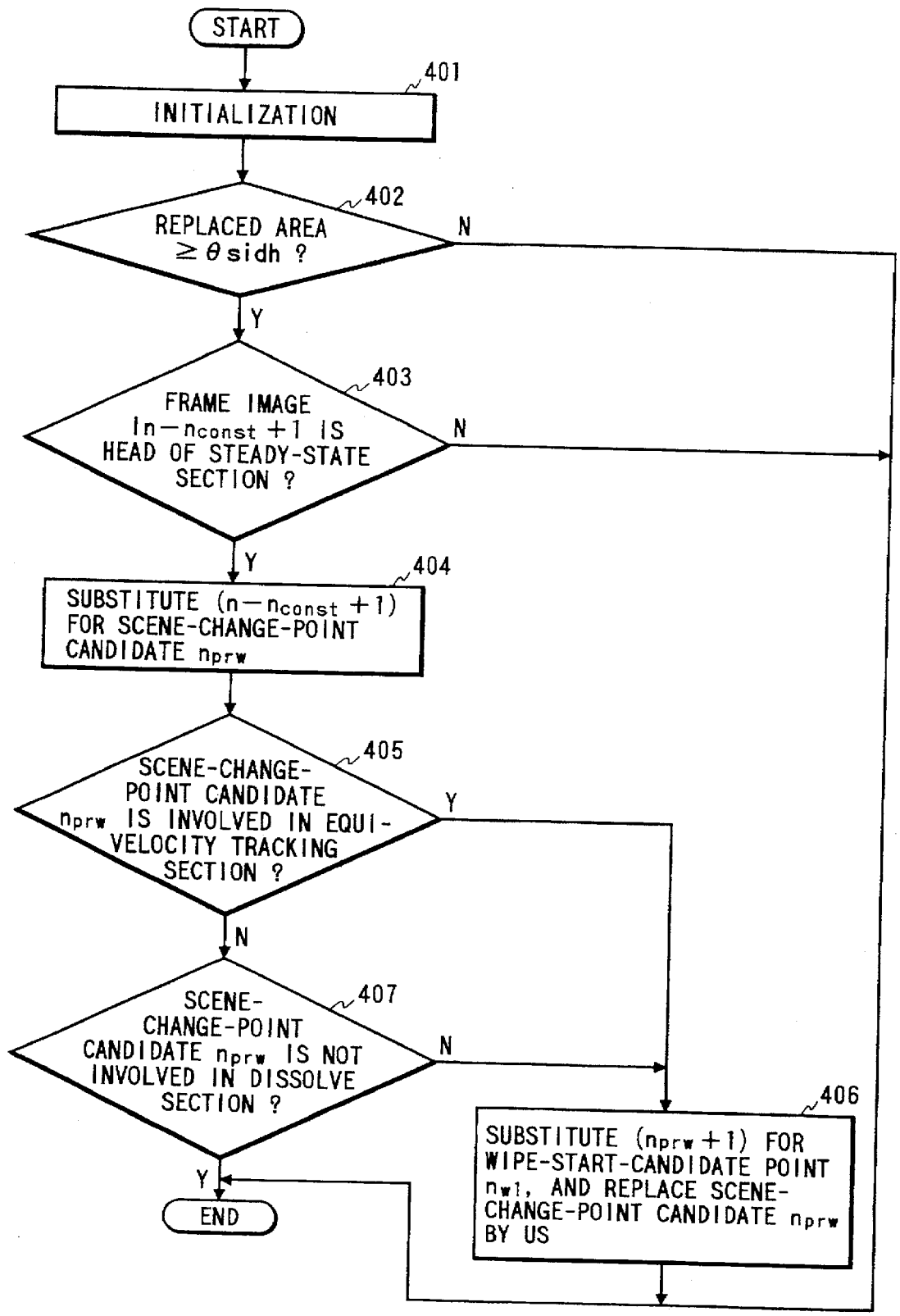
FIG. 19 is a flow chart showing a wipe judgement procedure in accordance with the first embodiment of the present invention.

In an initialization step 401 of FIG. 19, the scene-change-point candidate nprw is replaced by US for execution of the wipe judgement step 9.

In a replaced area judgement step 402 of FIG. 19, it is judged whether the replaced area SIDH obtained in the replaced area calculating step 208 of FIG. 17 is not smaller than a predetermined threshold θsidh. When the replaced area SIDH is not smaller than the threshold θsidh, the flow proceeds to a steady-state judgement step 403. Otherwise, it is considered that the judged frame image In-nconst+1 is not a scene-change-point image, then finishing the wipe judgement step 9 of FIG. 13.

In the steady-state judgement step 403 of FIG. 19, it is checked whether the following condition is established.

$$IDHa(n)-IDHa(n-i)<\theta_{up}, 1\leq i<n_{const} \quad (36)$$

where IDHa is the intensity-changed pixel area, θup is a predetermined threshold, and nconst is the length of the steady-state section of the head of the next scene.

When the formula 36 is satisfied, the judged frame image In-nconst+1 is considered as the head frame image of the steady-state section, and the flow proceeds to a scene-change-point candidate setting step 404. If not, it is considered that the judged frame image In-nconst+1 is not the scene-change-point image, and the wipe judgement step 9 of FIG. 13 is completed.

In the scene-change-point candidate setting step 404 of FIG. 19, (n-nconst+1) is substituted for the scene-change-point candidate nprw.

As described above, the scene-change-point candidate nprw is set when the replaced area SIDH is not smaller than θsidh and the change of the intensity-changed pixel area is small. The replaced area SIDH has a tendency that its value becomes large in the scenes where objects move fast or camera movements such as panning are used. In portions where objects are tracked at the same speed, or portions where both objects and camera movements are stationary, the change of the intensity-changed pixel area is small. The change of the intensity-changed pixel area reflects the total quantity of object and camera movements. Accordingly, the above equi-velocity tracking section is detected as the scene-change-point candidate. Similarly, when the scene including rapid object movements or camera movements is changed by dissolve into a stationary scene, the intensity-changed pixel area is stabilized at smaller values in the second half of the dissolve section. Such a stable portion is detected as the scene-change-point candidate. Thus, a judgement is made as to whether the scene-change-point candidate is involved in the equi-velocity tracking section or during the dissolve section.

In the equi-velocity tracking judgement step 405, as the intensity-changed pixel area reflects the total quantity of object and camera movements, it is checked whether the following conditions are simultaneously established.

$$IDHa(n_{w1}) > \theta_{still} \tag{37}$$

$$IDHa(n_{prw}) > \theta_{still} \tag{38}$$

$$|IDHa(n_{prw}) - IDHa(ni)| \leq \theta_{diff}, \, n_{w1} \leq ni < n_{prw} \tag{39}$$

where IDHa(nw1) through IDHa(nprw) are intensity-changed pixel areas from the wipe start candidate point nw1 to the scene-change-point candidate nprw, and θstill and θdiff are predetermined thresholds.

When the above formulas 37–39 are simultaneously satisfied, it is considered that the scene-change-point candidate nprw belongs to the equi-velocity tracking section rather than the wipe. Thus, the flow proceeds to a wipe detection initialization step 406 of FIG. 19. Otherwise, the flow proceeds to an edge intensity reference step 407 to make a judgement as to whether the scene-change-point candidate nprw is involved in the dissolve section.

In the wipe detection initialization step 406 of FIG. 19, (nprw+1) is substituted for the wipe-start-candidate point n1 and the scene-change-point candidate nprw is replaced by US. Then, it is considered that the judged frame image Inprw is not a scene-change-point image, thereafter finishing the wipe judgement step 9 of FIG. 13.

Meanwhile, in the edge intensity reference step 407 of FIG. 19, it is checked whether the edge-intensity-extreme point nd2 is US (i.e. no value is set at this moment). When nd2=US is satisfied, it is considered that the judged frame image Inprw is a scene-change-point image candidate. Then, the wipe judgement step 9 is completed. If not, it is considered that the judged frame image Inprw is part of scene change. Thereafter, the flow proceeds to the wipe detection initialization step 406.

Although the present embodiment utilizes the intensity-changed pixel area IDHa in the above formulas 36–39, it is needless to say that IDHa can be replaced by IDHa' which is the intensity-changed pixel area smoothed in the direction of time.

Furthermore, the present embodiment executes the edge intensity reference step 407 to eliminate false detection of the transitional part of the dissolve section. However, this edge intensity reference step can be omitted when the detection of the transitional part of a scene change is allowed or when the scene changes due to dissolve are removed beforehand.

Furthermore, according to the steady-state judgement step 403 of the present embodiment, it is considered when the formula 36 is satisfied that the judged frame image In-nconst+1 is a scene-change-point image candidate. And, the flow proceeds to the scene-change-point candidate setting step 404. However, the above judgement that the frame image In-nconst+1 is the scene-change-point image candidate can be made in a different way. For example, when a value width of intensity-changed pixel areas IDHa(n-nconst+1) through IDHa(n) between the frame image In-nconst+1 and the frame image In is less than (2×θup), it is possible to conclude that the frame image In-nconst+1 is a scene-change-point image candidate, then proceeding to the scene-change-point candidate setting step.

Furthermore, according to the equi-velocity tracking judgement step 405 of FIG. 19, the equi-velocity object tracking mode is recognized only when the formulas 37–39 are Simultaneously satisfied, and then, the flow proceeds to the wipe detection initialization step 406. However, when the above formulas 37 and 38 are simultaneously satisfied, it is possible to conduct the following judgement instead of the formula 39. That is, it is checked whether a value width of the intensity-changed pixel areas IDHa(nw1) through IDHa(nprw) between the wipe-start-candidate point nw1 and the frame number candidate nprw of the head of next scene is less than (2×θdiff). When this condition is satisfied as well as formulas 37 and 38, it is considered that the scene-change-point candidate belongs to the equi-velocity object tracking section. Then, the flow proceeds to the wipe detection initialization step. Furthermore, the equi-velocity tracking judgement step 405 can be executed using any other technology of tracking objects. If required to eliminate false detections, it is desirable to let the flow directly proceed to the edge intensity reference step 407 by skipping the equi-velocity tracking judgement step 405.

After finishing the wipe judgement step 9 of FIG. 13, the flow proceeds to a page-translate judgement step 10 of FIG. 13. The page-translate judgement step 10 detects scene changes resulting from editing effects similar to the page-translate and scene changes derived from comparable camera movements. Details of the page-translate judgement step 10 will be explained with reference to the flow chart of FIG. 20.

Figure 20:
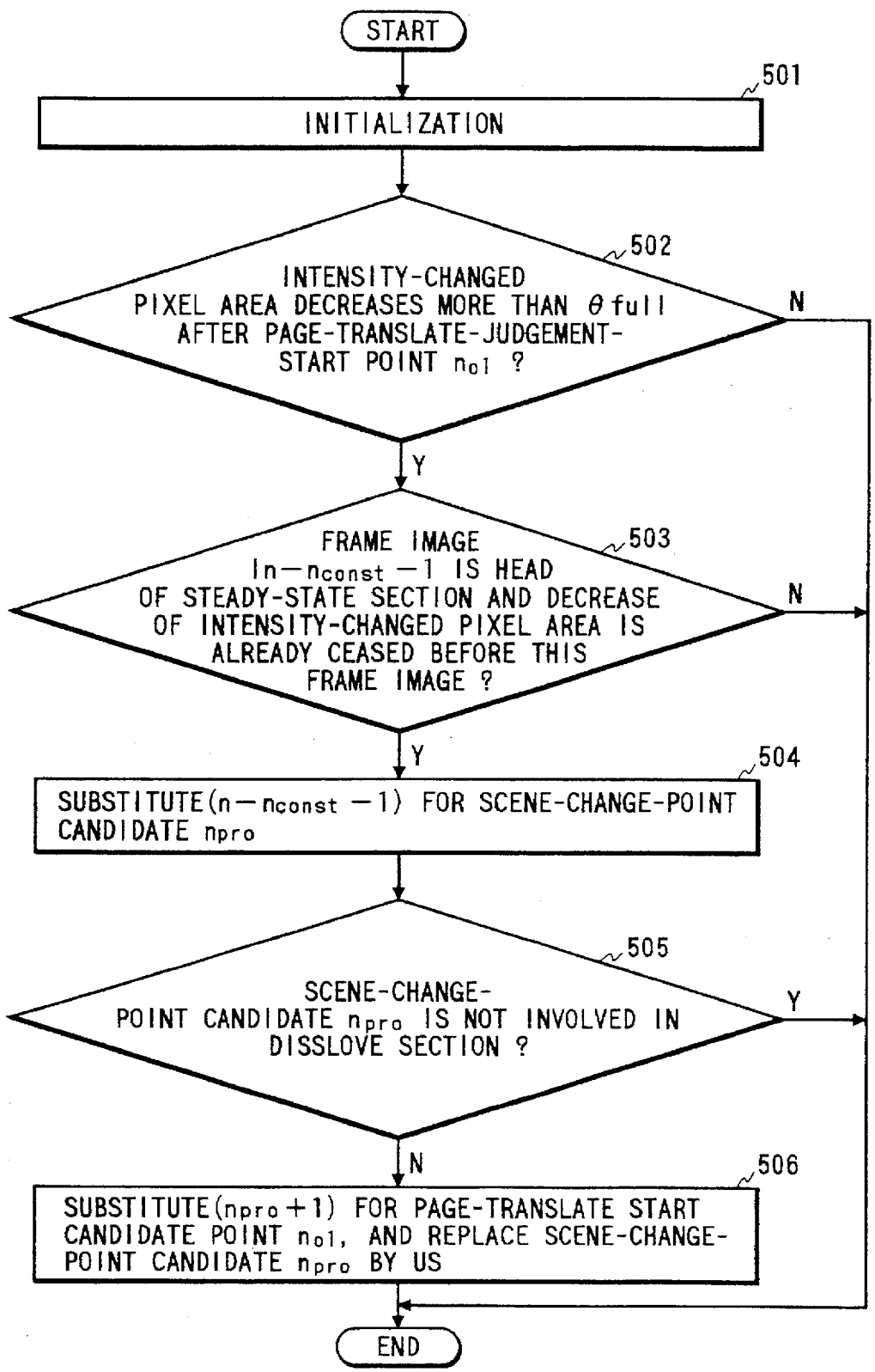
FIG. 20 is a flow chart showing a page-translate judgement procedure in accordance with the first embodiment of the present invention.

In an initialization step 501 of FIG. 20, the scene-change-point candidate npro is replaced by US for execution of the page-translate judgement step 10.

In a motion change judgement step 502, the image In-nconst-1 is designated as a frame image to be judged, so that the total pixel number between the frame image In-2 which is a processed object when smoothing processing is considered and the frame image to be judged is equalized to the length nconst of the steady-state section of the head of the scene. Then, it is judged whether the following condition is established.

$$IDHa'(n_{01}) - IDHa'(n-n_{const}-1) > \theta_{full} \tag{40}$$

where IDHa'(n01) and IDHa'(n-nconst-1) are smoothed intensity-changed pixel areas corresponding to the page-translate-judgement-start point n01 and the judged frame image In-nconst-1, respectively, and θfull is a predetermined threshold.

When the inequality 40 is established, it is considered that the intensity-changed pixel area decreases more than θfull in the region between the page-translate-judgement-start point n01 and the frame number (n-nconst-1) of the judged frame image. Then, the flow proceeds to a steady-state judgement step 503. If not, it is considered that the judged frame image In-nconst-1 is not the scene-change-point image. Then, the page-translate judgement step 10 is completed.

In the steady-state judgement step 503 of FIG. 20, it is judged if the following conditions are satisfied.

$$IDHa'(n-i) \geq IDHa'(n-nconst-1), \quad 2 \leq i < nconst+1 \quad (41)$$

$$IDHa'(n-i) \leq IDHa'(n-nconst-1) + \theta_{up}, \quad 2 \leq i < nconst+1 \quad (42)$$

where IDHa'(n-nconst-1) through IDHa'(n-2) are intensity-changed pixel areas ranging from the frame image In-nconst-1 to the frame image In-2, and $\theta_{up}$ is a predetermined threshold.

When the above formulas 41 and 42 are simultaneously satisfied, it is considered that the frame image In-nconst-1 is the head of the steady-state section of the next scene, and decrease of the intensity-changed pixel area is already ceased before the frame image In-ncost-1. Then, the flow proceeds to a scene-change-point candidate setting step 504. Otherwise, it is judged that the frame image In-nconst-1 is not the scene-change-point image. Then, the page-translate judgement step 10 is completed.

In the scene-change-point candidate setting step 504 of FIG. 20, (nconst-1) is substituted for the scene-change-point candidate npro.

The intensity-changed pixel area IDHa has a tendency that its value becomes larger in the scenes where objects move fast or camera movements such as panning are used. When the such scene including rapid object movements or comparable camera movements is changed by dissolve into a stationary scene, the intensity-changed pixel area is stabilized at smaller values in the second half of the dissolve section. Such a stable portion is detected as the scene-change-point candidate.

Thus, to eliminate false detection of the transitional part of the dissolve section, an edge intensity reference step 505 checks whether the edge-intensity-extreme point nd2 is US. When nd2=US (i.e. no value is set at this moment) is recognized, it is considered that the frame image Inpro is a scene-change-point image candidate. Then, the page-translate judgement 10 is completed. If not, it is considered that the frame image Inpro is part of scene change. Thus, the flow proceeds to a page-translate detection initialization step 506.

In the page-translate detection initialization step 506 of FIG. 20, (npro+1) is substituted for the page-translate-judgement-start point no1 and the scene-change-point candidate npro is replaced by US. It is then considered that the frame image Inpro is not the scene-change-point image. Then, the page-translate judgement step 10 of FIG. 13 is completed.

Although the present embodiment uses values obtained by smoothing a row of intensity-changed pixel areas in the direction of time to obtain the page-translate-judgement-start point no1 and the scene-change-point candidate npro, the smoothing processing is not always necessary. Furthermore, the smoothing processing, which is executed using median values in this embodiment, can be done by any other appropriate method.

Furthermore, the present embodiment uses the edge intensity reference step 505 for eliminating false detection of the transitional part of the dissolve section. However, this edge intensity reference step 505 can be omitted when the detection of such a transitional part of a scene change is allowed or when the scene changes due to dissolve are removed beforehand. According to the steady-state judgement step 503 of FIG. 20, it is judged, when the formulas 41 and 42 are simultaneously satisfied, that the frame image In-nconst-1 is a scene-change-point image candidate. And, the flow proceeds to the scene-change-point candidate setting step 504. However, there is an alternative judgement. For example, when a value width of intensity-changed pixel areas IDHa'(n-nconst-1) through IDHa'(n-2) between the frame image In-nconst-1 and the frame image In-2 which is a processed object when the smoothing processing is considered is less than $\theta_{up}$, it is possible to conclude that the frame image In-nconst-1 is a scene-change-point image candidate, then proceeding to the scene-change-point candidate setting step.

Furthermore, if required-to suppress detection errors, it is preferable to let nconst be 2 and $\theta_{up}$ 1.0 (i.e. nconst=2 and $\theta_{up}$=1.0)

In this case, it may happen that the smoothed intensity-changed pixel area IDHa'(no1) at the page-translate-judgement-start point and the smoothed intensity-changed pixel area DHa'(n-4) at the above judged frame image become maximum and minimum values of the smoothed intensity-changed pixel areas between the frame image Ino1 at the page-translate-judgement-start point and the above processed frame image In-3. If so, it is checked whether the following inequality equivalent to the inequality 40 is established.

$$IDHa'(no1) - IDHa'(n-4) > \theta_{full} \quad (40')$$

When the inequality 40' is established, it is judged that the judged frame image In-4 is a scene-change-point image candidate.

After finishing the page-translate judgement step 10 of FIG. 13, the flow proceeds to a scene-change-point candidate determination step 11, wherein it is checked whether the scene-change-point candidates nprd, nprw and npro used in the dissolve judgement step 8 through the page-translate judgement step 10 satisfies the following relation.

$$n_{prd} = n_{prw} = n_{pro} = US \quad (i.e. \text{ no value is set at this moment})$$

When the above relation is established, the scene-change-point candidate npr is replaced by US. If not, one of above three scene-change-point candidates nprd, nprw and npro is substituted for the above scene-change-point candidate npr.

When any scene-change-point candidate which has a value other than US exists, it is considered that the frame number of a transitional part of a scene change or a frame number advancing several frames from the head of the next scene is registered as the scene-change-point candidate. In the present embodiment, a list of all the frame images of the detected scene change points is displayed on the monitor 34 of FIG. 1. Therefore, it is preferable to detect the transitional part of the next scene rather than detecting the transitional part a scene change. Hence, the largest frame number among the above scene-change-point candidates nprd, nprw and npro is substituted for the above scene-change-point candidate npr. Then, the detection of the scene change point is started from this scene-change-point candidate npr.

In the dissolve judgement step 8 and the wipe judgement step 9 of FIG. 13, there is the possibility that the transitional parts of scenes resulting from the editing effects similar to the page-translate or comparable camera movements are detected as scene changes. In this case, scene changes, if excessively detected, have a tendency that the intensity-changed pixel area is reduced. Hence, in the scene-change-point candidate determination step 11 of FIG. 13, it is checked if the following conditions are satisfied.

$$n_{prd} = n_{pr} \quad (43a)$$

$$IDHa'(n_{pr}) - IDHa'(n_{pr}+1) < 0 \qquad (43b)$$

When these conditions are simultaneously satisfied, it is considered that the above scene-change-point candidate npr is identical with the scene-change-point candidate nprd detected by the dissolve judgement step 8 and is involved in the transitional part of a scene change. Then, the scene-change-point candidate npr is replaced by US. Subsequently, to find the frame number where decrease of the intensity-changed pixel area is ceased, a reference value nref is obtained by subtracting the frame number n of the presently processed frame image by the scene-change-point candidate npr. In turn, a dissolve detection waiting flag is turned ON.

In the same manner, when the relation nprw=npr and the inequality 43b are simultaneously established, it is considered that the scene-change-point candidate npr is identical with the scene-change-point candidate nprw detected by the wipe judgement step 9 and is involved in the transitional part of a scene change. Then, the scene-change-point candidate npr is replaced by US. The reference value nref is obtained by subtracting the frame number n of the presently processed frame image by the scene-change-point candidate npr. Then, a wipe detection waiting flag is turned ON.

Subsequently, under the condition that the dissolve detection waiting flag is ON, it is judged whether the following condition is established.

$$IDHa'(n-n_{ref}) - IDHa'(n-n_{ref}+1) \geq 0 \qquad (44)$$

where IDHa'(n-nref) is a smoothed intensity-changed pixel area of the judged frame image In-nref.

When the above condition 44 is established, it is considered that decrease of the intensity-changed pixel area is ceased at the frame number (n-nref) of the judged frame image. Then, (n-nref) is substituted for the scene-change-point nprd and npr. And, the dissolve detection waiting flag is turned OFF. In the same manner, when the above condition 44 is established under the condition that the wipe detection waiting flag is ON, (n-nref) is substituted for the scene-change-point nprw and npr. And, the wipe detection waiting flag is turned OFF.

The present embodiment detects the scene change by successively executing the dissolve judgement step 8, the wipe judgement step 9 and the page-translate judgement step 10 in this order. However, the processing order of the above steps can be flexibly changed. Furthermore, when the type of editing effect used in video is known beforehand, there is no necessity that all of the above three scene change detecting steps are always executed. Moreover, if required to detect any editing effects other than above three editing effects, it is possible to combine the above three scene-change-detecting steps with any other appropriate scene-change-detecting steps.

Although the present embodiment utilizes the judgement defined by inequality 43b to eliminate false detection of the transitional part of a scene change resulting from the editing effects similar to the page-translate or comparable camera movements, this judgement can be removed if the detection of such a transitional part of a scene change is allowed.

After finishing the scene-change-point candidate determination step 11 of FIG. 13, the flow proceeds to a branch step 12 wherein the value of the scene-change-point candidate npr is checked. If npr=US (i.e. no value is set at this moment) is recognized, it is considered that no scene change point is detected. Then, the flow returns to the video termination judgement step 2. Otherwise, it is assumed that, when the frame image of the scene-change-point candidate is a head frame image of the next scene, similarity between the head frame image of the present scene and the frame image of the scene-change-point candidate becomes a small value. To check if the detected scene-change-point candidate npr satisfies this assumption, the flow proceeds to a similarity calculation step 13.

In the similarity calculation step 13 of FIG. 13, the similarity S'(np, npr) is calculated between the head frame image Inp of the present scene and the frame image Inpr of the scene-change-point candidate npr.

Calculation method of the similarity between two frame images Ipr and Inpr is similar to the processing from the common color calculation step 102 through the image similarity calculation step 104. The above two frame images Inp and Inpr are frame images preceding the presently processed frame image In. Therefore constituent colors $CV_{j,np}$, $CV_{j,npr}$ of partial regions and constituent-color-region areas AV(j, Inp), AV(j, Inpr) are already calculated in the constituent color calculation step 101. Hence, the common colors $CC'_{j,np,npr}$, j=1 - - - 16, of the corresponding partial regions between the above two frame images Inp and Inpr are calculated by the following formula which is similar to the formula 22.

$$CC'_{j,np,npr} = \{C | C \in CV_{j,np} \cap CV_{j,npr}\} \qquad (45)$$

Next, an area AC'(j,np,npr,Im) of a common color region in each of the corresponding partial regions R(j,Im), m=np, npr, is calculated using the following formula which is similar to the formula 23.

$$AC'(j,np,npr,Im) = \sum_{C \in CC'j,np,npr} H(c,j,Im) \qquad (46)$$

where H(c,j,Im) is the histogram of the color c.

Subsequently, the similarity of the corresponding partial regions is calculated by the following formula which is similar to the formula 25.

$$Sp'(j,Inp,Inpr) = \min\left(\frac{AC'(j,np,npr,Inp)}{AV(j,Inp)}, \frac{AC'(j,np,npr,Inpr)}{AV(j,Inpr)}\right) \qquad (47)$$

Finally, the similarity S'(np, npr) between the two frame images Inp and Inpr is determined by obtaining an average value of the similarity Sp'(j, Inp, Inpr), j=1 - - - 16, of the partial regions calculated by the formula 46.

After finishing the similarity calculation step 13 of FIG. 13, the flow proceeds to a branch step 14 of FIG. 13. In the branch step 14, it is judged whether the similarity S'(np, npr) obtained in the similarity calculation step 13 is smaller than a predetermined threshold θchange. When the similarity S'(np, npr) is smaller than a predetermined threshold θchange, it is considered that the scene-change-point candidate npr is an actual scene change point. Then, the flow proceeds to a scene-change-point determination step 15. If not, it is considered that the scene-change-point candidate npr is part of the present scene. Then, the flow proceeds to a parameter initialization step 16 to newly start detecting an actual scene change point by checking the part succeeding this scene-change-point candidate.

In the scene-change-point determination step 15, it is considered that the frame image Inpr of the scene-change-point candidate npr is a scene-change-point image. Then, the frame image Inpr is displayed on the monitor 34 by a reduced size as a head frame image Inp of the scene, as shown in FIG. 16. Then, the flow proceeds to the parameter initialization step 16.

In the parameter initialization step 16 of FIG. 13, all the parameters used in the dissolve judgement step 8 through the page-translate judgement step 10 are initialized. The steps using these parameters are the parameter update step 7 through the page-translate judgement step 10. Details of the parameter initialization step 16 will be explained with reference to the flow chart of FIG. 21.

In the scene-change-point candidate determination step 11 of FIG. 13, the judgement using the in equality 43b is executed to avoid the detection of the transitional part of a scene change to be detected by the page-translate judgement step 10. Furthermore, in the wipe judgement step 9 and the page-translate judgement step 10 of FIG. 13, the edge intensity reference steps 407 and 505 are executed to avoid the detection of the transitional part of a scene change to be detected by the dissolve judgement step 8. Hence, the scene-change-point candidate npr is not involved in the transitional part of the scene change to be detected by the dissolve judgement step 8 or the page-translate judgement step 10.

Figure 21:
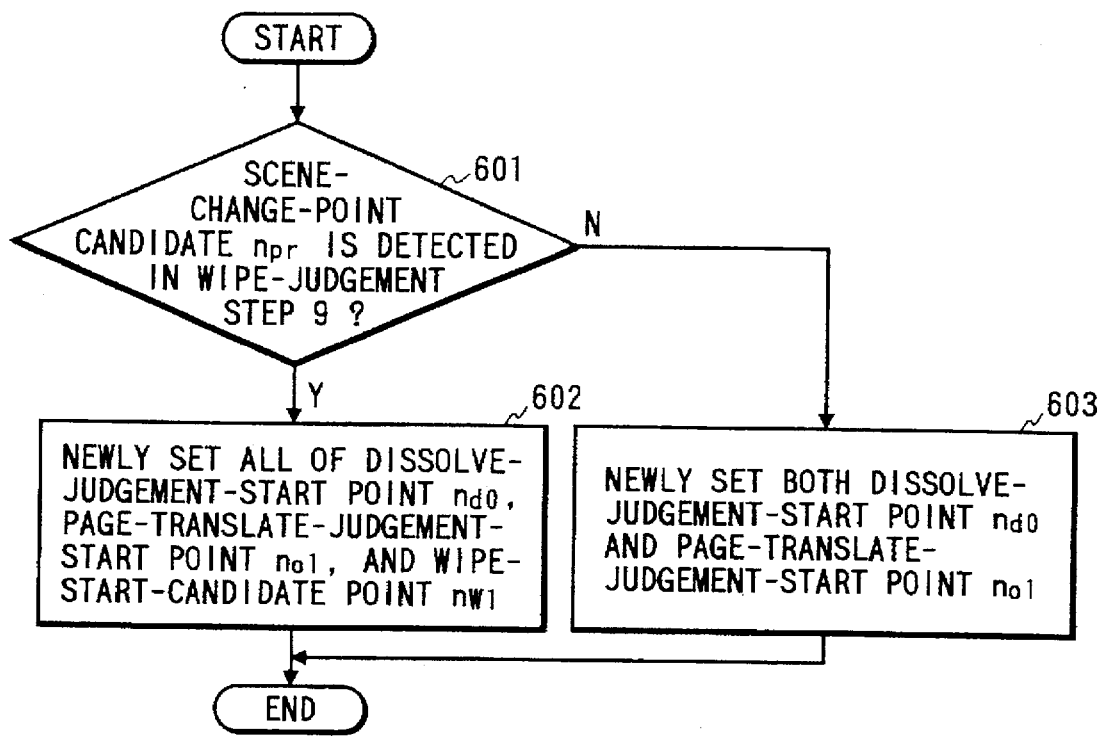
FIG. 21 is a flow chart showing a parameter initialization procedure in accordance with the first embodiment of the present invention.

In a wipe detection judgement step 601 of FIG. 21, it is judged whether the scene-change-point candidate npr is identical with the scene-change-point candidate nprw used in the wipe judgement step 9. If the scene-change-point candidate npr is identical with the scene-change-point candidate nprw, it is considered that the scene-change-point candidate npr is not the transitional part of a scene change to be detected in any of the dissolve judgement step 8, the wipe judgement step 9 and the page-translate judgement step 10 of FIG. 13. Then, the flow proceeds to an all processing initialization step 602 of FIG. 21. If not, it is considered there is the possibility that the scene-change-point candidate npr is the transitional part of a scene change to be detected in the wipe judgement step 9. Therefore, the flow proceeds to a dissolve & page-translate initialization step 603.

In the all processing initialization step 602 of FIG. 21, all of the dissolve-judgement-start point nd0, the page-translate-judgement-start point n01 and the wipe-start-candidate point nw1 are initialized. Like the initialization step 1, the dissolve-judgement-start point nd0 is replaced by the scene-change-point candidate npr serving as a new initial point. The wipe-start-candidate point nw1 and the page-translate-judgement-start point n01 are replaced by a frame number (npr+1) as a new initial point. The frame number (npr+1) represents a frame where the calculation of the intensity-changed pixel area becomes possible for the first time. Then, the images ranging from the frame image Inpr, which is a scene-change-point number candidate, to the processed frame image In are subjected to the parameter update step 7, the dissolve judgement step 8, the wipe judgement step 9 and the page-translate judgement step 10. Then, the parameter initialization step 16 is completed.

In the dissolve & page-translate initialization step 603 of FIG. 21, both the dissolve-judgement-start point nd0 and the page-translate-judgement-start point n01 are initialized. The dissolve-judgement-start point nd0 is replaced by the scene-change-point candidate npr serving as a new initial point. The page-translate-judgement-start point n01 is replaced by the frame number (npr+1) as a new initial point. The frame number (npr+1) represents a frame where the calculation of the intensity-changed pixel area become possible for the first time. Then, the images ranging from the frame image Inpr, which is a scene-change-point number candidate, to the processed frame image In are subjected to the parameter update step 7, the dissolve judgement step 8 and the page-translate judgement step 10.

Although the present embodiment chooses consecutive frame images as the frame images to be processed, similar effects will be obtained even if the frame images to be processed in the present invention are selected at intervals of $\alpha$ frames. In such a case, the suffix n, where n=1,2,3 - - -, is given to the corresponding frame images selected at intervals of $\alpha$ frames. Furthermore, the present embodiment can be carried out even if the video input/output devices 30 and 31 do not communicate with the computer 33 of FIG. 1. In such a case, in the image update step 3, a frame image reproduced by the video input/output devices 30 and 31 is read out of the frame memory 32 and specified as the presently processed frame image In for executing the image update step 3. Accordingly, the frame interval $\alpha$ of the processed frames corresponds to a time interval of the image update step 3. The frame image of each scene change point is not displayed on the monitor 34 when the video input/output devices 30 and 31 do not communicate with the computer 33. However, similar effect can be brought by displaying the presently processed frame image In when the scene change point is detected.

According to the present embodiment, in the scene-change-point candidate determination step 11, the scene-change-point candidate npr is selected among the scene-change-point candidates nprd, nprw and npro used in the dissolve judgement step 8 through the page-translate judgement step 10. However, there is no necessity of always selecting the scene-change-point candidate npr by executing the scene-change-point candidate determination step 11. For example, without executing the scene-change-point candidate determination step 11, the scene-change-point candidate npr can be obtained in the following manner.

In the similarity calculation step 13, it is possible to obtain similarities between the head frame image Inp of the present scene and each of the frame images Inprd, Inprw and Inpro of the three scene-change-point candidates. Then, the scene-change-point candidate npr can be determined by finding the scene-change-point candidate which shows a minimum value in the above similarities with respect to the head frame image Inp of the present scene.

In the parameter initialization step 16 of FIG. 13, if any scene-change-point candidate is not detected by the dissolve judgement step 8 or the page-translate judgement step 10, initialization of the wipe-start-candidate point nw1 is not executed. However, if allowed to detect the transitional part of a scene change resulting from to editing effects similar to the wipe, the initialization for the wipe-start-candidate point nw1 can be executed. Furthermore, if allowed to detect the transitional part of any scene, it is possible to remove the edge intensity reference steps 407 and 505 and the judgement using the inequality 43. Instead, when the scene change point is detected by a special judgement, both the special judgement step and judgement steps different from this special judgement can be initialized. If excessive detections are allowed, it is possible to execute initialization with respect to the above special judgement only in response to the detection of the scene change point by the above special judgement.

Furthermore, in a scene where the title appears, a change similar to dissolve may arise. The present embodiment always executes the similarity calculation step 13 and the branch step 14 when the scene-change-point candidate npr is given a value. Hence, if required to detect the scene where the title characters appears, it is possible to skip both the similarity calculation step 13 and the branch step 14 instead executing the scene-change-point determination step 15, only when the above scene-change-point candidate npr is identical with the scene-change-point candidate nprd detected by the dissolve judgement step 8.

Furthermore, it is reasonable to consider that an important image may include smaller relative movements in objects or camera movements. If required to detect such portions and display a list of such portions as well as scene changes, it is possible to skip both the similarity calculation step 13 and the branch step 14 instead executing the scene-change-point determination step 15, only when the above scene-change-point candidate npr is identical with the scene-change-point candidate npro detected by the page-translate judgement step 10.

According to the present embodiment, the intensity-changed pixel area is employed as a feature amount representing the total quantity of movements on the screen. However, similar effects will be brought by another feature amount, such as sum of intensities of motion vectors, which also reflect the total quantity of movement on the screen.

As explained above, the present embodiment takes account of the phenomenon that the similarity between time series frames, when arrayed across the video cut, falls at a relatively small value. That is, time series frame images are sampled from the presently processed video. Next, the similarity of each frame image with respect to the preceding frame image is obtained. Then, thus obtained similarities are compared with a predetermined threshold, thereby detecting the video cut. Therefore, it becomes possible to estimate actual scene change points. Meanwhile, when the similarity of the successive frame images is within a predetermined range even if the change of similarity is fairly steep, it is judged that it agrees with the scene change resulting from editing effects, not the video cut. Thus, it is checked whether the above similarity is out of the above predetermined range by comparing the above similarity with the thresholds. Thus, it becomes possible to eliminate erroneous or excessive detections of the scene changes other than video cuts.

Furthermore, according to the present embodiment, the edge intensity factor $E(n)$ is obtained as a feature quantity to be calculated by using the edge intensity of the frame image $I_n$ in the video. $E_{rc}(N)$ is obtained as the change-rate of the edge intensity factor $E(N)$ of the presently processed frame image $I_N$. Then, it is checked whether the absolute value of the change-rate $E_{rc}(N)$ of the above edge intensity factor continuously exceeds the predetermined first threshold $\theta_{edge}$ for a predetermined section ranging from the frame image preceding a predetermined number to the presently processed frame image. If the change-rate $E_{rc}(N)$ continuously exceeds the predetermined first threshold $\theta_{edge}$ for the predetermined section, the image number N of the frame image $I_N$ is specified as the dissolve feature point nd1. Next, in the part succeeding the dissolve feature point nd1, it is checked whether there is a section having a small absolute value in the change-rate of the above edge intensity factor. If such a section is detected, the frame number N of the above processed frame image $I_N$ is specified as the edge-intensity-extreme point nd2. Furthermore, when the edge intensity factors $E(nd2)$, $E(nd2+1)$, $E(nd2+2)$, - - - at the frame images on and succeeding the above edge-intensity-extreme point do not show the increase, the above edge-intensity-extreme point nd2 is registered as the scene-change-point candidate nprd. Otherwise, it is checked whether the edge intensity factor causes increase between the frame image $I_{nd2}$ of the above edge-intensity-extreme point nd2 and the processed frame image $I_N$, and also the frame image $I_N$ is involved in the section having a small absolute value in the change-rate of the above edge intensity factor. If so, the frame number N of the above processed frame image $I_N$ is registered as the scene-change-point candidate nprd. Then, the similarity is obtained between the head frame image $I_{np}$ of the present scene and the frame image $I_{nprd}$ of the above scene-change-point candidate nprd. When thus obtained similarity is smaller than the predetermined second threshold $\theta_{change}$, it is considered that the above scene-change-point candidate nprd is an actual scene change point. During the scene change due to the dissolve, the edge intensity of the overall screen is widely changed for a predetermined time. However, for a predetermined time after the dissolve is ended, the edge intensity of the overall screen does not cause substantial changes. Thus, it is preferable to detect the scene changes resulting from editing effects similar to the dissolve by using the above-described method, thereby enabling estimation of actual scene change points.

Furthermore, according to the present embodiment, it is judged whether the brightness of each pixel is changed by a value exceeding the third threshold $\theta_{w1}$ between the specific frame image $I_n$ and its preceding frame image $I_{n-1}$. The set of pixels exceeding this threshold $\theta_{w1}$ is specified as the intensity-changed pixel region $RIC_n$ of the above specific frame image. Then, the ratio (or share) of the number of pixels involved in this intensity-changed pixel region $RIC_n$ to the total number of pixels constituting the frame image is specified as the intensity-changed pixel area $IDHa(n)$ of the above specific frame image $I_n$. The wipe-start-candidate point nw1, the maximum value nwmax of the number of pixels required for the wipe, and the length nconst of the steady-state section of the head of the next scene are set. Then, the sum-set $SR_{IC}$ of the intensity-changed pixel regions $RIC_{nw1}$, - - - , $RIC_{n-nconst+1}$ of the frame images $I_{nw1}$ through $I_{n-nconst+1}$ is obtained by updating the wipe-start-candidate point nw1 in such a manner that the number of pixels between the frame image $I_{nw1}$ of the wipe-start-candidate point nw1 and the above specific frame image $I_n$ does not exceed the sum of the maximum value nwmax of the number of pixels required for wipe and the length nconst of the steady-state section of the head of the next scene. Then, a ratio (or share) of the number of pixels involved in this sum-set $SR_{IC}$ to the total number of pixels constituting the frame image is obtained. The resultant ratio or share is specified as the replaced area SIDH.

Next, it is checked whether the replaced area SIDH is not smaller than the fourth threshold $\theta_{sidh}$, and also, the values of the intensity-changed pixel areas $IDHa(n-nconst+1)$ through $IDHa(n)$ of the above specific frame image $I_n$ to the judged frame image $I_{n-nconst+1}$ are within a predetermined range. If so, it is considered that the frame number (n-nconst+1) is the head of the above steady-state section. And, the frame number (n-nconst+1) is registered as the scene-change-point candidate nprw. Still further, it is checked whether both the intensity-changed pixel area $IDHa(nw1)$ of the above wipe-start-candidate point and the intensity-changed pixel area $IDHa(npr)$ of the scene-change-point candidate are not smaller than the fifth threshold $\theta_{still}$, and also, the values of the intensity-changed pixel areas $IDHa(nw1)$ through $IDHa(nprw)$ of the above wipe-start-candidate point nw1 to the above scene-change-point candidate nprw are within a predetermined range. If so, it is considered that the above scene-change-point candidate nprw is involved in the equi-velocity tracking section. Then, (nprw+1) is substituted for the wipe-start-candidate point nw1. Otherwise, the similarity is obtained between the head frame image $I_{np}$ of the present scene and the frame image $I_{nprw}$ of the above scene-change-point candidate. Then, it is checked whether the obtained similarity is smaller than the second threshold $\theta_{change}$. If so, the above scene-change-point candidate is considered as an actual scene change point. With this method, it becomes possible to detect the scene changes resulting from editing effects similar to the wipe which basically consists of a region corresponding to part of the former scene and another region corresponding to part of the latter scene, the former scene being successively replaced by the latter scene, thereby enabling estimation of actual scene change points.

Furthermore, it is assumed that, in the equi-velocity tracking mode, the intensity-changed pixel area is not smaller than the above threshold θstill and is substantially constant. Under this assumption, change of the intensity-changed pixel area is checked in the estimated editing effect part. Thus, it becomes possible to suppress excessive detections of the equi-velocity tracking section.

Yet further, according to the present embodiment, the image $I_{N-nconst-1}$ is selected as the judged frame image, so that the number of images involved between the frame image $I_{N-2}$, which is a processing object when the smoothing of the row of the intensity-changed pixel areas in the direction of time is taken into consideration, and the judged frame image is equal to the length nconst of the steady-state section of the head of the next scene. Then, the sectional maximum change area IDHmax (N-nconst-1) is obtained by finding a maximum value among the above intensity-changed pixel areas IDHa(no1) through IDH(N-nconst-1) ranging from the frame image Ino1 of the page-translate-judgement-start point to the frame image $I_{N-nconst-1}$ immediately before the above judged frame image. Subsequently, it is checked whether the intensity-changed pixel area IDHa (N-nconst-1) of the above judged frame image $I_{N-nconst-1}$ exceeds the above sectional maximum change area IDHmax (N-nconst-1). If so, the frame number (N-nconst-1) of the above judged frame image is substituted for the above page-translate-judgement-start point no1 which is the starting point of decrease in the intensity-changed pixel area. If not, it is checked whether the value, obtained by subtracting the intensity-changed pixel area IDHa(no1) of the above page-translate-judgement-start point no1 by the intensity-changed pixel area IDHa(N-nconst-1) of the above judged frame image $I_{N-nconst-1}$, is not smaller than the sixth threshold θfull. And also checked is whether the values of the intensity-changed pixel areas IDHa(N-nconst-1) through IDHa(N) of the above judged frame image $I_{N-nconst-1}$ to the judged frame image $I_N$ are within a predetermined range. If both are satisfied, it is considered that the frame number (N-nconst+1) of the judged frame image is the head of the above steady-state section. And, this frame number (N-nconst+1) is registered as the scene-change-point candidate npro.

Finally, the similarity is obtained between the head frame image Inp of the present scene and the frame image candidate Ipro of the scene change candidate. When the obtained similarity is smaller than the second threshold θchange, the above scene-change-point candidate npro is considered as an actual scene change point. As the above method detects a section where the intensity-changed pixel area reflecting the total quantity of movements on the screen decreases by an increment of more than θfull, it becomes possible to detect the scene changes resulting from the editing effects similar to the page-translate, which is characterized in that a preceding scene disappears out of the screen by causing deformation or contraction during its shift movement or a next scene appears on the screen by causing deformation or expansion during its shift movement, or scene changes derived from comparable camera movement such as panning or zooming.

Furthermore, it is assumed that object and camera movements become steady at the head of the next scene except for immediately after the scene changes resulting from the editing effects similar to the dissolve and, therefore, variation of the intensity-changed pixel area is small. Thus, it is believed that there is a steady-state section at the head of the scene having such features. The portion where the value of the intensity-changed pixel area is within a constant region is identified as the head of scene. Hence, it becomes possible to suppress excessive or erroneous detections of the transitional part of scene changes where the intensity-changed pixel area widely varies.

Yet further, the similarity is obtained between the frame image of the scene-change-point candidate and the head frame image of the present scene. The frame image of the scene-change-point candidate is estimated by using the edge intensity factor, the intensity-changed pixel region and the intensity-changed pixel area. Accordingly, it becomes possible to suppress excessive or erroneous detections of scene changes similar to dissolve such as appearance of title characters, excessive detections of scene changes similar to the wipe such as panning, and excessive detections of discontinuous movements of objects in the scene.

Yet further, the present embodiment enables detection of video cut as well as detection of scene changes similar to the page-translate which is characterized in that a preceding scene disappears out of the-screen by causing deformation or contraction during its shift movement or a succeeding scene appears on the screen by causing deformation or expansion during its shift movement. Regarding the scene changes similar to dissolve which dose not include deformation, shift, expansion and contraction, it is possible to detect such changes by monitoring the change of edge intensity of the overall screen since it shows a significant change during scene changes. Furthermore, regarding the scene changes similar to the wipe which successively replaces the presently displayed scene by the succeeding scene, it becomes possible to detect such changes regardless of difference of the edge intensity of the overall screen between the former and latter scenes. Consequently, the present embodiment can detect any scene changes including video cuts, editing effects and camera movements, thereby enabling us to accurately estimate actual scene change points.

Second Embodiment

Next, a scene-change-point detecting procedure for detecting scene changes resulting from editing effects similar to the page-translate or comparable camera movements such as panning or zooming will be explained as a second embodiment which includes modifications from the first embodiment and realizes the previously described fourth scene-change point detecting method.

Figure 22:
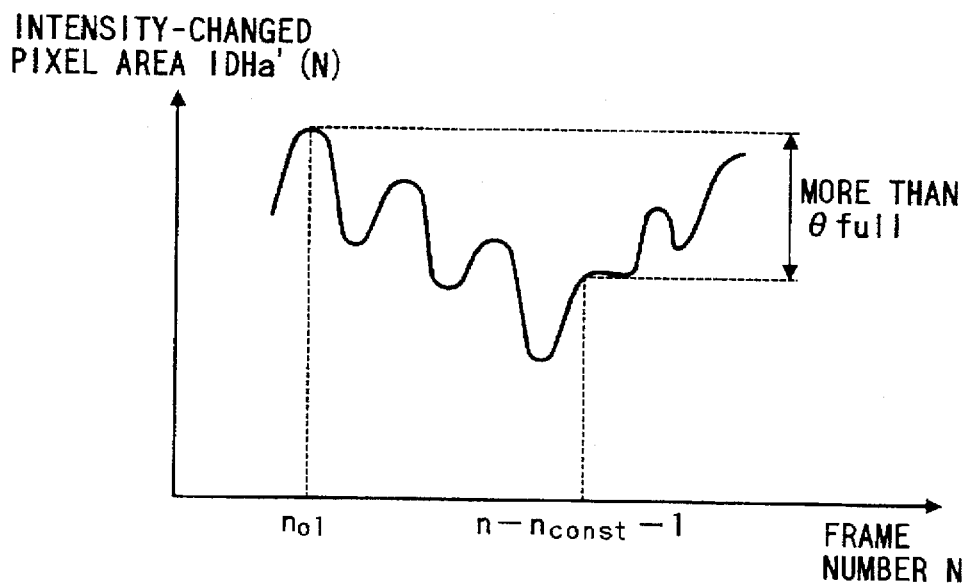
FIG. 22 is a graph illustrating excessive detections in accordance with the first embodiment of the present invention.

According to the above-described first embodiment, it is checked whether the smoothed intensity-changed pixel areas difference IDHa'(no1)-IDHa'(n-nconst-1) between the page-translate-judgement-start point no1 and the judged frame image In-nconst-1 is within the predetermined threshold θfull, and whether variation of the intensity-changed pixel area is small between the judged frame image and the processed frame image In-2. If both are satisfied, the above judged frame image In-nconst-1 is detected as a scene change point. Accordingly, if the objects cause discontinuous movements, the smoothed intensity-changed pixel area IDHa'(N) will cause fluctuation as shown in FIG. 22. For this reason, excessive detections will arise, for example, at the judged frame image In-nconst-1.

To suppress such excessive detections, the present embodiments assumes that the intensity-changed pixel area reflecting the total quantity of movements of camera and objects gradually decreases in the region immediately before the end of scene change as shown in FIG. 12. Although the above-described first embodiment describes the scenechange-point detecting method including the video-cut detection step 4, the dissolve judgement step 8 and the wipe judgement step 9 as well as the page-translate judgement step 10 as shown in FIG. 13, the present embodiment provides a scene-change-point detecting method handling the page-translate judgement step only.

Figure 23:
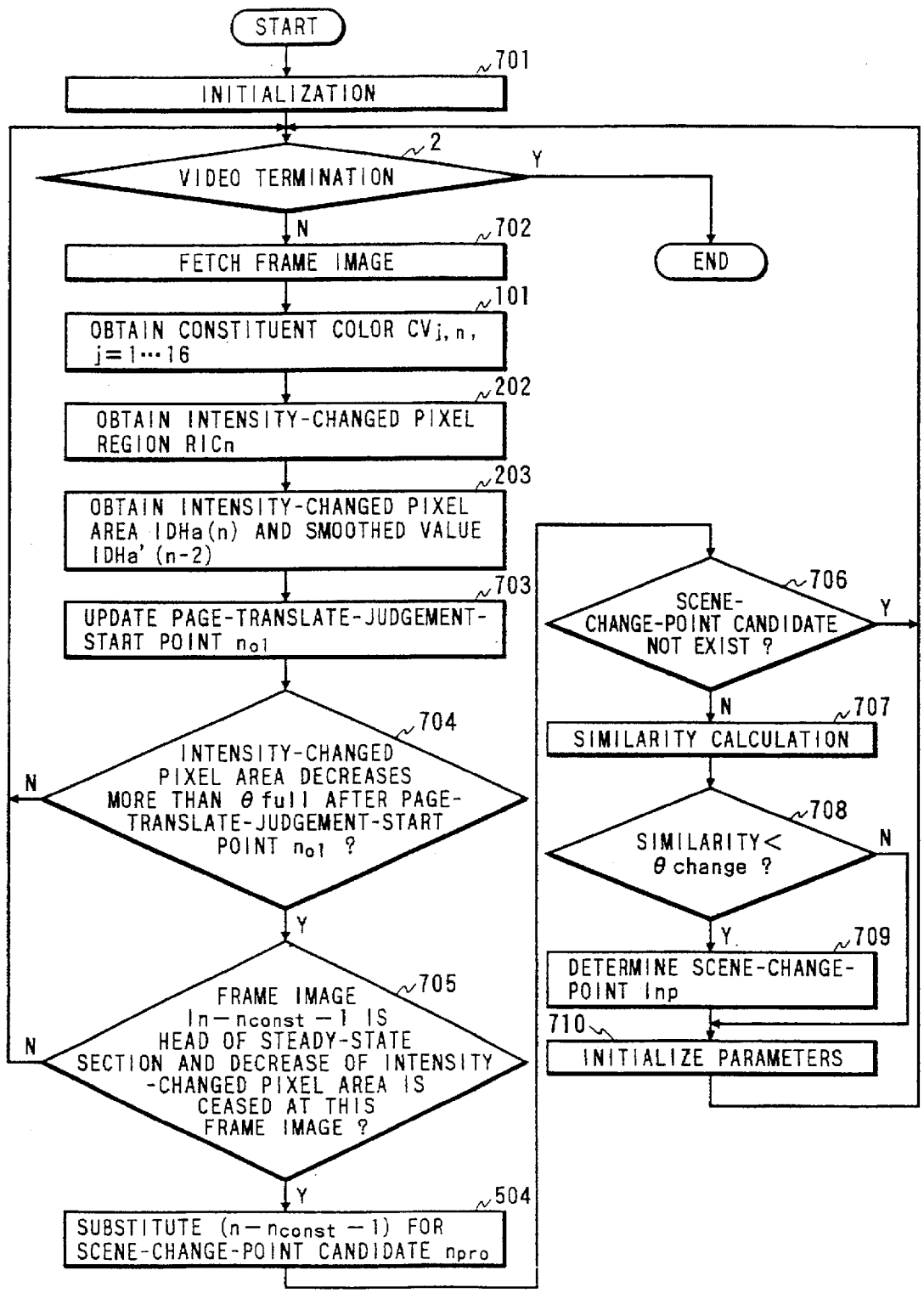
FIG. 23 is a flow chart showing a scene change point detecting procedure in accordance with a second embodiment of the present invention.

Hereinafter, the second embodiment of the present invention will be explained with reference to the drawings. FIG. 23 is a flow chart showing one embodiment of scene-change-point detecting processing executed by the computer 33 in FIG. 1.

An initialization step 701 of FIG. 23 is a step corresponding to the initialization step 1 of the first embodiment. In this step, the presently processed frame image In is fetched from the frame memory 32 of FIG. 1. The fetched frame image In is displayed on the monitor 34 by a reduced size as a head frame image Inp of the first scene. The page-translate-judgement-start point point no1, representing a search start point for checking time change of intensity-changed pixel area, is replaced by the frame number (np+1) where the calculation of intensity-changed pixel area is first feasible. Furthermore, the length nconst representing the steady-state section of the head of scene is set. Then, constituent colors $CV_{j,n}$, j=1 - - - 16, of 16 partial regions are obtained using the formula 21, for the use of video-cut detection. Hereinafter, the frame number of the image fetched from the frame memory 32 is specified as the suffix n for the processed frame image.

Next, the video termination step 2 explained in the first embodiment is executed. If the video to be processed is already terminated, the flow chart ends the procedure. Otherwise, the flow proceeds to an image update step 702 of FIG. 23.

The image update step 702 of FIG. 23 is a step corresponding to the image update step 3 of the first embodiment. In this step, the next frame image In-1 succeeding the presently processed frame image is designated as a newly processed frame image In. Then, the newly processed frame image In is reproduced and fetched, and further the scene-change-point candidate npro is replaced by US.

As explained in the flow chart of FIG. 14, the constituent color calculation step 101 obtains the constituent color $CV_{j,n}$, where j=1 - - - 16 of each partial region of the frame image In using the formula 21.

As explained in FIG. 17, the intensity-changed pixel region calculation step 202 obtains the intensity-changed pixel region RICn of the presently processed frame image In.

Thereafter, as shown in FIG. 17, the intensity-changed pixel area calculation step 203 obtains the intensity-changed pixel area IDHa(n) and the smoothed value IDHa'(n−2) which is smoothed in the direction of time.

The present embodiment detects a case where the maximum value (n−2) among frame numbers used in the calculation for obtaining the above smoothed intensity-changed pixel area becomes the last frame number in the steady-state section of the head of next scene. As the length nconst of the steady-state section is already set in the initialization step 701 of FIG. 23, the frame image In-nconst-1 is specified as judged frame image. The frame image In-nconst-1 precedes the frame image having the above maximum value (n−2) by (nconst−1) frames. Then, it is judged whether the frame image In-nconst-1 is the head frame image of the above steady-state section.

A page-translate-judgement-start point update step 703 of FIG. 23 is similar to the page-translate-judgement-start point update step 209 of the first embodiment except for the assumption that the intensity-changed pixel area gradually decreases in the region immediately before the end of scene change. Then, maximum and minimum values are obtained in the range from the above smoothed intensity-changed pixel areas IDHa'(no1) through IDHa'(n-nconst−2). Obtained maximum and minimum values are specified as sectional maximum change area IDHmax(n-nconst−1) and sectional minimum change area IDHmin(n-nconst−1), respectively. Next, if the formula 30 is established, it is considered that the intensity-changed pixel area increases at the above judged frame image In-nconst-1. To let a point where the intensity-changed pixel area starts decreasing be a page-translate-judgement-start point no1, (n-nconst−1) is substituted for the page-translate-judgement-start point no1. Then, it is checked whether the following condition is satisfied.

$$IDHa'(n-nconst-1) \geq IDHmin(n-nconst-1) + \theta_{ups} \quad (48)$$

where $\theta_{ups}$ is a predetermined threshold. If the above formula is established, it is considered that the judged frame image In-nconst-1 is not included in the portion immediately before the end of scene change which is characterized by the gradual decrease of the intensity-changed pixel area. Then, to let the point where the intensity-changed pixel area starts decreasing be the above page-translate-judgement-start point, (n-nconst−1) is substituted for the page-translate-judgement-start point no1.

A motion change judgement step 704 of FIG. 23 corresponds to the motion change judgement step 502 of the first embodiment. That is, when the formula 40 is established, it is considered that the intensity-changed pixel area decreases more than $\theta_{full}$ in the region between the page-translate-judgement-start point no1 and the frame number (n-nconst−1) of the judged frame image. Then, the flow proceeds to a steady-state judgement step 705. If not, it is considered that the judged frame image In-nconst-1 is not the scene-change-point image. Then, the flow returns to the video termination judgement step 2.

The steady-state judgement step 705 of FIG. 23 corresponds to the steady-state judgement step 503 of the first embodiment. That is, when the formulas 41 and 42 are simultaneously established, it is considered that the judged frame image In-nconst-1 is the head of the steady-state section of the next scene and that decrease of the intensity-changed pixel area is ceased at this judged frame image. Then, the flow proceeds to the scene-change-point candidate setting step 504. If not, it is judged that the frame image In-nconst-1 is not the scene-change-point image. Then, the flow returns to the video termination judgement step 2.

In the scene-change-point candidate setting step 504 of FIG. 23, (n-nconst−1) is substituted for the scene-change-point candidate npro as described in the first embodiment.

A branch step 706 of FIG. 23 corresponds to the branch step 12 of the first embodiment. That is, the value of the scene-change-point candidate npr is checked. If npro=US (i.e. no value is set at this moment) is recognized, it is considered that no scene change point is detected. Then, the flow returns to the video termination judgement step 2. Otherwise, it is assumed that, when the frame image of the scene-change-point candidate is a head frame image of the next scene, similarity between the head frame image of the present scene and the frame image of the scene-change-point candidate becomes a small value. To check if the detected scene-change-point candidate npr satisfies this assumption, the flow proceeds to a similarity calculation step 707.

In the similarity calculation step 707 of FIG. 23, the similarity S'(np, npro) is calculated between the head frame image Inp of the present scene and the frame image Ipro of the scene-change-point candidate npro, in the same manner as the similarity calculation step 13 (FIG. 13) of the first embodiment.

After finishing the similarity calculation step 707 of FIG. 23, the flow proceeds to a branch step 708. This branch step 708 corresponds to the branch step 14 of the first embodiment. In this branch step 708, it is judged whether the similarity S'(np, npro) obtained in the similarity calculation step 707 is smaller than the predetermined threshold θchange. When the similarity S'(np, npro) is smaller than the predetermined threshold θchange, it is considered that the scene-change-point candidate npro is an actual scene change point. Then, the flow proceeds to a scene-change-point determination step 709. If not, it is considered that the above scene-change-point candidate npro is part of the present scene. Then, the flow proceeds to a parameter initialization step 710 to newly start detecting an actual scene change point by checking the part succeeding this scene-change-point candidate.

The scene-change-point determination step 709 of FIG. 23 is a step corresponding to the scene-change-point determination step 15 of the first embodiment. That is, it is considered that the frame image Ipro of the scene-change-point candidate npro is a scene-change-point image. Then, the frame image Inpro is displayed on the monitor 34 of FIG. 1 by a reduced size as a head frame image Inp of the scene, as shown in FIG. 16. Then, the flow proceeds to the parameter initialization step 710 to detect the next scene change point succeeding the above scene-change-point image.

In the parameter initialization step 710 of FIG. 23, initialization of the page-translate-judgement-start point no1 is executed. In the same manner as the initialization step 701, the page-translate-judgement-start point no1 is replaced, as a new initial point, by the frame number (npro+1) succeeding the above scene-change-point number candidate npro where the calculation of the intensity-changed pixel area is first feasible. Then, the frame images from the frame image Ino1 of the page-translate-judgement-start point to the presently processed frame image In are subjected to the previously described constituent color calculation step 101, the intensity-changed pixel region calculation step 202, the intensity-changed pixel area calculation step 203, and the page-translate-judgement-start point update step 703.

If required to incorporate the scene-change-point detection processing of the present embodiment into the first embodiment, it will be necessary to replace the page-translate-judgement-start point update step 209 by the page-translate-judgement-start point update step 703 of the present invention, and also necessary to replace the steady-state condition judgement step 503 by the steady-state condition judgement step 705 of the present invention. If the formula 41 is not established in the steady-state judgement step 705, the page-translate judgement step 10 is terminated without returning to the video termination judgement step 2.

As explained in the foregoing description, the embodiments of the present invention have introduced the assumption that, in the scene-change-point detecting method for detecting scene changes resulting from the scene changes similar to page-translate or comparable camera movements, the intensity-changed pixel area reflecting the total quantity of movements of objects and camera gradually decreases at the portion immediately before the end of scene change as shown in FIG. 12. More specifically, when the judged frame image $I_{N-nconst-1}$ is included in the portion immediately before the end of the scene change, it is assumed that the intensity-changed pixel area IDHa'(N-nconst-1) of the judged frame image does not exceed the sum of the sectional minimum change area IDHmin(N-nconst-1) and the threshold θups. Then, the scene satisfying this assumption is detected. This assumption is not established in the portion where the intensity-changed pixel area causes fluctuation, such as a section where the object movement is discontinuous. Thus, the present embodiment can suppress excessive or erroneous detections of the transitional part of the discontinuous movement of the object.

Third Embodiment

According to the first embodiment, in the wipe judgement step 9 and the page-translate judgement step 10 of FIG. 13, it is assumed that the movements of objects and camera become steady at the head of next scene, and variation of the intensity-changed pixel area is small. And, the steady-state judgement steps 403 and 503 are executed, thereby suppressing excessive detections of the transitional part of scene changes where the intensity-changed pixel area widely changes. Furthermore, in the above wipe judgement step 9, it is checked whether the scene-change-point candidate nprw is involved in the equi-velocity tracking section, by executing the equi-velocity tracking judgement step 405 of FIG. 19, thereby suppressing excessive detections in the equi-velocity tracking section.

Thus, as a third embodiment of the present invention, the present embodiment explains a scene-change-point detecting procedure for detecting scene changes resulting from editing effects similar to the dissolve. Furthermore, to suppress excessive detections, the present embodiment employs both the above-described steady-state judgement step and equi-velocity tracking judgement step. Moreover, like the second embodiment, this embodiment is not combined with other scene-change-point detection methods. However, the present embodiment does not execute the step of obtaining the similarity between the frame image of the estimated scene-change-point candidate and the head frame image of the present scene.

Figure 24:
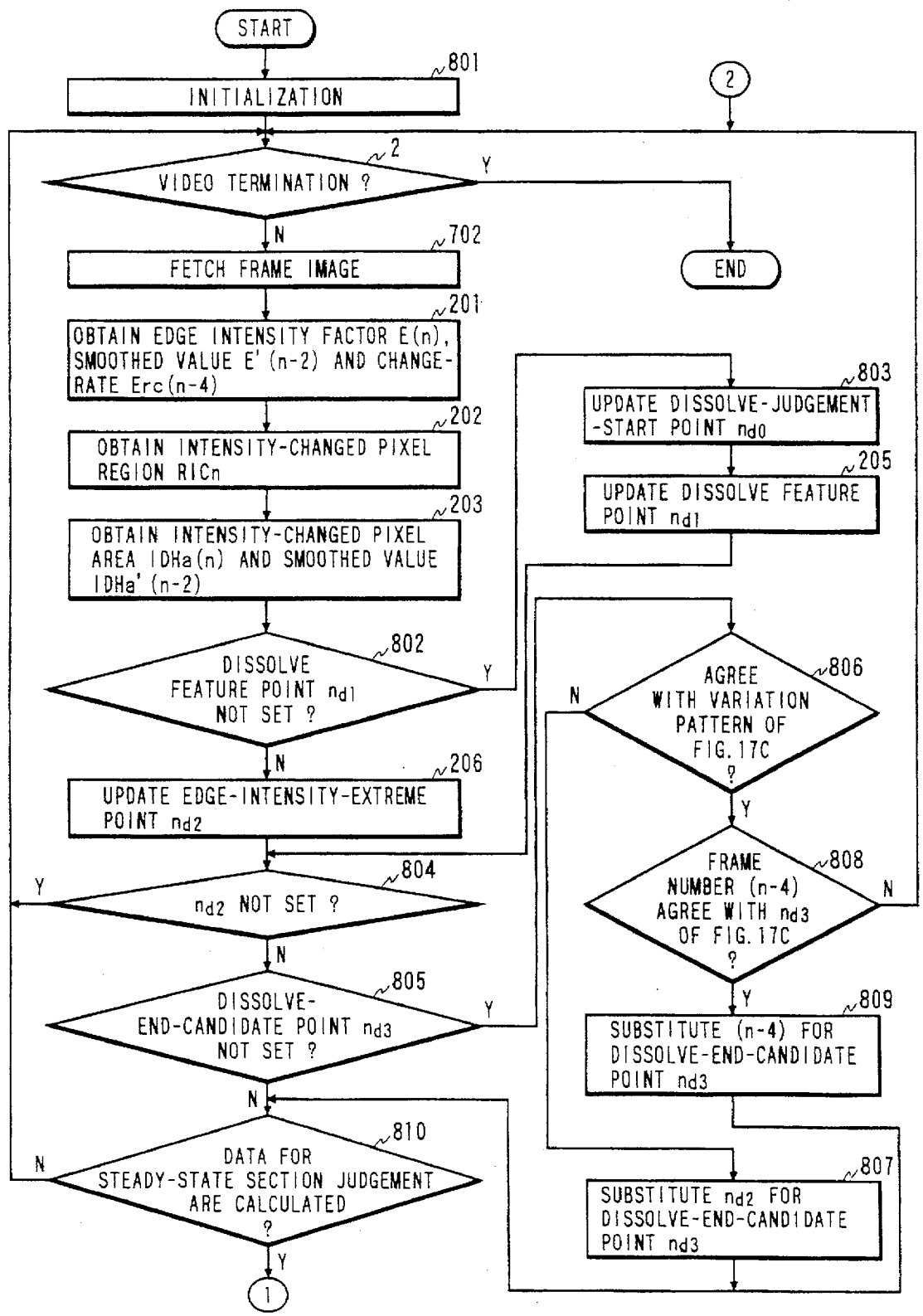
FIGS. 24 and 25 are flow charts showing a scene change point detecting procedure in accordance with a third embodiment of the present invention.
Figure 25:
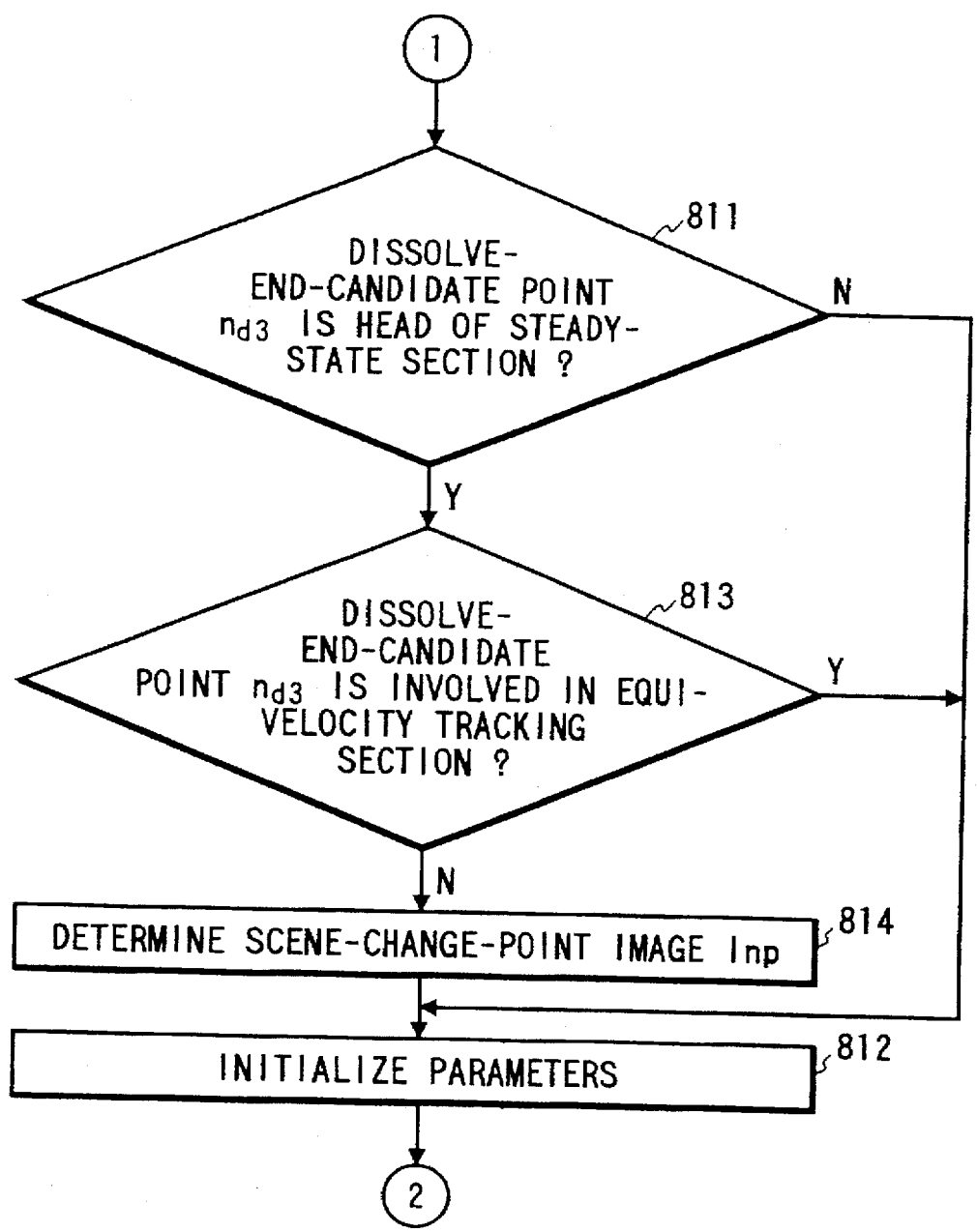

Hereinafter, the third embodiment of the present invention will be explained with reference to the drawings. FIGS. 24 and 25 are flow charts showing one embodiment of the scene-change-point detecting processing executed in the computer 33 of FIG. 1.

First, an initialization step 801 of FIG. 24 is a step corresponding to the initialization step of the first embodiment. In this step, the presently processed image In is fetched from the frame memory 32 of FIG. 1, and is displayed on the monitor 34 by a reduced size. Then, the dissolve-judgement-start point ndo, which is a search start point for detecting time variation of the edge intensity factor, is replaced by the frame number np of the above head frame image. The dissolve feature point nd1, the edge-intensity-extreme point nd2 and the dissolve-end-candidate point nd3 are parameters whose values are determined based on time variation of the edge intensity factor. Thus, initial values of these parameters are US (i.e. a condition no value is set). Hereinafter, the frame number of the image fetched from the frame memory 32 is specified as the suffix n for the processed frame image.

Next, the video termination step 2 explained in the first embodiment is executed. If the video to be processed is already terminated, the flow chart ends the procedure. Otherwise, the flow proceeds to the image update step 702.

The image update step 702 of FIG. 24 is a step corresponding to the image update step 3 of the first embodiment. In this step, the next frame image In+1 succeeding the presently processed frame image is designated as a newly processed frame image In. Then, the newly processed frame image In is reproduced and fetched, and further the scene-change-point candidate npro is replaced by US.

The edge intensity calculation step 201, as explained in the first embodiment, obtains the values E'(n−2) and Erc(n−

4), E'(n–2) being a value smoothed in the direction of time with respect to the edge intensity factor E(n) of the above processed frame image In while Erc(n–4) representing a change-rate of the edge intensity factor.

The intensity-changed pixel region calculating step 202, as described in the first embodiment, obtains the intensity-changed pixel region RICn of the above processed frame image In.

The intensity-changed pixel area calculation step 203, as described in the first embodiment, obtains the intensity-changed pixel area IDHa(n) and the value IDHa'(n–2) which is a value smoothed in the direction of time.

A branch step 802 is a step corresponding to the branch step 204 of the first embodiment. In this step, it is judged whether a value of the dissolve feature point nd1 has not yet been set (nd1=US). The dissolve feature point nd1 represents an transitional frame number of the portion having a large absolute value in the change-rate of the edge intensity factor E(N) as shown in FIGS. 6A–6C. When the relation nd1=US is recognized, the flow proceeds to a branch step 804 via a dissolve-judgement-start point update step 803 detecting a start point of scene change and the dissolve feature point update step 205 detecting the dissolve feature point nd1. Otherwise, the flow proceeds to the branch step 804 via the edge-intensity-extreme point update step 206 detecting a portion having a small absolute value in the change-rate of the edge intensity factor.

In the dissolve-judgement-start point update step 803, a frame number corresponding to the start of dissolve is detected and thus detected frame number is substituted for the dissolve-judgement-start point nd0. As radical change of video content does not occur in the same scene, the change-rate Erc of the edge intensity in the same scene approximates zero. On the other hand, as shown in FIGS. 6A–6C, the absolute value of the above change-rate Erc becomes large in the dissolve section. When the sign of the above change-rate Erc is inverted or value of the same approximates zero in the frame number (n–4) which is maximum among frame numbers used in the calculation of the above change-rate Erc, it is assumed that the above frame number (n–4) agrees with the above dissolve-judgement-start point nd0. Furthermore, when the formula 28 is established, the present embodiment substitutes (n–4) for the dissolve-judgement-start point nd0.

In the dissolve feature point update step 205, as described in the first embodiment, (n–4) is substituted for the dissolve feature point nd1 when both the formulas 27a and 27b are simultaneously established. In this embodiment, the dissolve-judgement-start point nd0 in the formula 27b represents the frame number agreeing with the start of scene change.

The edge-intensity-extreme point update step 206, as described in the first embodiment, (n–4) is substituted for the edge-intensity-extreme point nd2.

A branch step 804 is a step corresponding to the branch step 302 of the embodiment 1. In this step, it is judged whether a value of the edge-intensity-extreme point nd2 has not yet been set (nd2=US). The edge-intensity-extreme point nd2 represents a head frame number of the portion having a small absolute value in the change-rate of the edge intensity factor E(N) as shown in FIGS. 8A–8C. When the relation nd2=US is established, it is judged that the frame image In–4 is not the scene-change-point image and the flow returns to the video termination judgement step 2. If not, the flow proceeds to an end-candidate-non-detection judgement step 805.

In the end-candidate-not-detection judgement step 805, it is judged whether a value of the dissolve-end-candidate point nd3 has not yet been set (nd3=US). The dissolve-end-candidate point nd3 represents the frame number agreeing with the end of dissolve. When the relation nd3=US (i.e. no value is set) is established, the flow proceeds to a local-minimum-point judgement step 806 to detect a dissolve-end-candidate point nd3. If not, the flow proceeds to a branch step 810 to check whether the dissolve-end-candidate point nd3 is involved in the steady-state section of the head of the next scene.

The local-minimum-point judgement step 806 is a step corresponding to the local-minimum-point judgement step 303 of the first embodiment. When the formulas 32 and 33 are simultaneously established, it is considered that increase of Erc(nd2), Erc(nd2+1), - - - meets the variation pattern of FIG. 6C. Then, the flow proceeds to a stable point judgement step 808. If not, it is considered that the actual change meets the variation pattern of FIG. 6A or FIG. 6B. Thus, the flow proceeds to a dissolve-end-candidate point setting step 807.

In the dissolve-end-candidate point setting step 807, it is considered that the edge-intensity-extreme point nd2 agrees with the last frame number of the dissolve section belonging to the variation pattern FIG. 6A or 6B. The edge-intensity-extreme point nd2 represents the head frame number of the portion having a small absolute value in the change-rate of the edge intensity factor E(N). Then, the edge-intensity-extreme point nd2 is substituted for the dissolve-end-candidate point nd3, and the flow proceeds to a branch step 810.

The stable point judgement step 808 is a step corresponding to the stable point judgement step 305 of the first embodiment. In this step, when the formulas 34 and 35 are simultaneously established, it is considered that the frame number (n–4) agrees with the dissolve-end-candidate point nd3. The flow then proceeds to a dissolve-end-candidate point setting step 809. If not, it is considered that the judged frame image In–4 is not the scene-change-point image. The flow then returns to the video termination judgement step 2.

In the dissolve-end-candidate point setting step 809, (n–4) is substituted for the dissolve-end-candidate point nd3. Then, the flow proceeds to the branch step 810.

In the branch step 810, as the length nconst representing the steady-state section of the head of the next scene is set beforehand, it is checked whether a total of nconst frames of Ind3 through Ind3+nconst–1 starting from the dissolve-end-candidate point nd3 are calculated the intensity-changed pixel areas IDHa' smoothed in the direction time. The maximum value of the frame numbers used in the calculation for obtaining the intensity-changed pixel areas smoothed in the direction of time is (n–2). It is checked whether the following formula is established.

$$nd3+nconst-1=n-2 \qquad (49)$$

When the above formula 49 is established, it is considered that the above smoothed intensity-changed pixel area IDHa' of the frame images involved in the steady-state section is already calculated. The flow thus proceeds to a steady-state judgement step 811 of FIG. 25. If not, the flow returns to the video termination judgement step 2 to update the frame image to be presently processed.

The steady-state judgement step 811 of FIG. 25 is a step corresponding to the steady-state judgement step 403. In this step, the formula 36 is modified by replacing the intensity-changed pixel area IDHa by the smoothed intensity-changed pixel area IDHa', using the formula 49 for erasing nconst as follows.

$$|IDHa'(n-2)-IDHa'(ni)|<\theta_{sp}, \ nd3 \leq ni < n-2 \qquad (50)$$

When the above formula 50 is established, it is considered that the judged frame image In$d3$ is the head frame of the above steady-state section. Then, the flow proceeds to an equi-velocity tracking judgement step 813. Otherwise, it is judged that the judged frame image In$d3$ is not the scene-change-point. It is then considered that the above dissolve-end-candidate point n$d3$ is part of the present scene. Subsequently, the flow proceeds to a parameter initialization step 812 to detect the scene-change-point in the region following this dissolve-end-candidate point.

The parameter initialization step 812, like the initialization step 801, substitutes the dissolve-end-candidate point n$d3$ for the dissolve-judgement-start point n$d0$ as a new initial point. Then, the dissolve feature point n$d1$, the edge-intensity-extreme point n$d2$ and the dissolve-end-candidate point n$d3$ are replaced by US. Thereafter, the frame image In$d0$ of the dissolve-judgement-start point to the presently processed frame image In are subjected to a series of processing from the above edge intensity calculation step 201 through the edge-intensity-extreme point update step 206.

The equi-velocity tracking judgement step 813 is a step corresponding to the equi-velocity tracking judgement step 405 of the first embodiment. In this step, it is judged whether the dissolve-end-candidate point n$d3$ is involved in the equi-velocity tracking section, by using modified formulas 37 through 39. More specifically, the formulas 37 through 39 are modified by replacing the intensity-changed pixel area IDHa by the above smoothed intensity-changed pixel area IDHa'. The wipe-start-candidate point nw$1$, which represents the frame number corresponding to the start of scene change, is replaced by the dissolve-judgement-start point n$d0$. The scene-change-point candidate n$prw$, which represents the frame number corresponds to the end of the scene change, is replaced by the dissolve-end-candidate point n$d3$. That is:

$$IDHa'(n_{d0}) > \theta_{still} \tag{51}$$

$$IDHa'(n_{d3}) > \theta_{still} \tag{52}$$

$$|IDHa'(n_{d3}) - IDHa'(ni)| \leq \theta_{diff}, \quad n_{d0} \leq ni < n_{d3} \tag{53}$$

When the above formulas 51–53 are simultaneously satisfied, it is judged that the section between the dissolve-judgement-start point n$d0$ and the dissolve-end-candidate point n$d3$, which is estimated as a scene change section, is involved in the equi-velocity tracking section. The flow then proceeds to the parameter initialization step 812. If not, it is considered that the above dissolve-end-candidate point n$d3$ meets with the end of the scene change. Then, the flow proceeds to a scene-change-point determination step 814.

The scene-change-point determination step 814 is a step corresponding to the scene-change-point determination step 15 of the first embodiment. In this step, it is considered that the frame image In$d3$ of the dissolve-end-candidate point n$d3$ is a scene-change-point image. Then, the frame image In$d3$ is displayed on the monitor 34 by a reduced size as a head frame image of the scene, as shown in FIG. 16. Then, the flow proceeds to the parameter initialization step 812 to detect the next scene change point succeeding the above scene-change-point image.

If required to incorporate the scene-change-point detection processing of the present embodiment into the first embodiment, it will be necessary to interpose the dissolve-judgement-start point update step 803 of the present embodiment between the branch step 204 and the dissolve-feature-point update step 205. Furthermore, after finishing the scene-change-point determination steps 304 and 306, the scene-change-point number candidate n$prd$ is substituted for the dissolve-end-candidate point n$d3$. Subsequently, the judgement using the formulas 49–53 is executed. When the formulas 49 and 50 are simultaneously established and at least one of the formulas 51–53 is established, it is judged that the frame In$d3$ is a scene-change-point image candidate. Otherwise, the scene-change-point candidate n$prd$ is replaced by US.

As explained in the foregoing description, the present embodiment, in the scene-change-point detecting method for detecting scene changes resulting from the editing effects similar to dissolve, assumes that movements of objects and camera becomes steady at the head of scene and variation of the intensity-changed pixel area is small, and specifies the portion where the value of intensity-changed pixel area is within a predetermined range as the head of scene. Accordingly, it becomes possible to suppress excessive detections of the transitional part of a scene where the intensity-changed pixel area widely varies. Furthermore, the present embodiment examines whether the dissolve-end-candidate point n$d3$, which is one of candidates for scene change points, is involved in the equi-velocity tracking section. Hence, it becomes possible to suppress excessive detections of the equi-velocity tracking section.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A scene change point detecting method comprising steps of:

sampling time series frame images I$1$, I$2$, I$3$, - - - I$n-1$, I$n$, I$n+1$, from a processed video;

obtaining similarity $S(n)$ between two consecutive frame images I$n$ and I$n-1$ among said frame images sampled;

obtaining a first similarity difference $\Delta S(n)$ representing a variation between similarities $S(n)$ and $S(n-1)$ and a second similarity difference $\Delta S(n+1)$ representing a variation between similarities $S(n+1)$ and $S(n)$;

performing a first comparison by comparing said first similarity difference $\Delta S(n)$ with a predetermined cut threshold $\theta_{cut}$;

performing a second comparison by comparing said second similarity difference $\Delta S(n+1)$ with said predetermined cut threshold $\theta_{cut}$;

performing a third comparison by comparing said similarity $S(n)$ itself with a predetermined limit threshold; and judging that there is a video cut between said two consecutive images I$n-1$ and I$n$ when both of said first and second similarity differences $\Delta S(n)$ and $\Delta S(n+1)$ are larger than said predetermined threshold $\theta_{cut}$ while said similarity $S(n)$ is within a predetermined zone defined by said limit threshold.

2. The scene change point detecting method defined by claim 1, when $S(n-1)-S(n)$ and $S(n+1)-S(n)$ are simultaneously larger than a predetermined threshold $\theta_{cut}$, said method comprising steps of:

checking whether or not the following formulas are established, $$S(n) < \theta_{low}$$

$S(n-1) \geq \theta_{high}$ where $S(n)$ is similarity between a specific frame image $I_n$ and an immediately preceding frame image $I_{n-1}$, while $\theta_{low}$ and $\theta_{high}$ are predetermined thresholds; and identifying said specific frame image $I_n$ as a scene-change-point frame image, when at least one of said two formulas is established wherein said limit threshold is selected from the group consisting of an upper limit threshold $\theta_{high}$ and a lower limit threshold $\theta_{low}$.

3. The scene change point detecting method defined by claim 1, further comprising steps of:

dissecting each of said frame images into a plurality of partial regions;

obtaining a histogram of colors in each partial region;

finding a constituent color representing each partial region by checking whether frequency of each color exceeds a predetermined threshold $\theta h$;

finding common colors which are common part of constituent colors between corresponding partial regions of a specific frame image $I_n$ and an immediately preceding frame image $I_{n-1}$;

calculating similarity between said corresponding partial regions using said common colors and constituent colors; and calculating similarity between said specific frame image $I_n$ and said immediately preceding frame image $I_{n-1}$ using the similarity between said corresponding partial regions.

4. The scene change point detecting method defined by claim 3, further comprising steps of:

normalizing an area of pixels including said common colors by an area of pixels including constituent colors in each of said corresponding partial regions, thereby obtaining two normalized values; and specifying a smaller one of said two normalized values as said similarity of said corresponding partial regions.

5. A scene change point detecting method comprising steps of:

sampling time series frame images $I_1, I_2, I_3, - - -$ from a processed video;

obtaining an edge intensity factor $E(n)$ which is a feature quantity to be calculated by using edge intensity of each frame image $I_n$; and finding a section where said edge intensity factor $E(n)$ shows a predetermined large variation for a duration equivalent to a plurality of consecutive frame images and also a section where said edge intensity factor $E(n)$ shows a predetermined small variation for a duration equivalent to a plurality of consecutive frame images, thereby detecting a dissolve-like scene change point representing a head frame number of a next scene.

6. The scene change point detecting method defined by claim 5, wherein the scene change point detected is not recognized as an actual scene change point, when similarity between a head frame image $I_{np}$ of a present scene and a frame image $I_{npr}$ corresponding to said scene change point detected is less than a predetermined threshold $\theta_{change}$.

7. The scene change point detecting method defined by claim 6, further comprising:

dissecting each of the frame images $I_{np}$ and $I_{npr}$ into a plurality of partial regions;

obtaining a histogram of colors in each partial region;

finding constituent colors representing each partial region by checking whether frequency of each color exceeds a predetermined threshold $\theta h$;

finding common colors which are common part of constituent colors between corresponding partial regions of said two frame images $I_{np}$ and $I_{npr}$;

calculating similarity between said corresponding partial regions using said common colors and constituent colors; and calculating similarity between said frame images $I_{np}$ and $I_{npr}$ using the similarity between said corresponding partial regions.

8. The scene change point detecting method defined by claim 7, further comprising steps of:

normalizing an area of pixels including said common colors by an area of pixels including constituent colors in each of said corresponding partial regions, thereby obtaining two normalized values; and specifying a smaller one of said two normalized values as said similarity of said corresponding partial regions.

9. The scene change point detecting method defined by claim 5, wherein the edge intensity factor is determined by obtaining a sum of edge intensities of respective pixels constituting each frame image.

10. The scene change point detecting method defined by claim 5, wherein an equi-velocity tracking portion where an object is tracked at substantially the same speed is excluded from detection of the scene change point.

11. The scene change point detecting method defined by claim 5, further comprising steps of:

obtaining an intensity-changed pixel region representing a set of pixels whose brightness changes more than a predetermined threshold $\theta_{w1}$ between a specific frame image and an immediately preceding frame image;

obtaining an intensity-changed pixel area representing a ratio of the number of pixels involved in said intensity-changed pixel region to the total number of pixels constituting a corresponding frame image, and executing detection of the scene change point except for cases where the intensity-changed pixel area exceeds a predetermined threshold $\theta_{still}$ and substantially constant between an estimated scene-change-start point and an estimated scene-change-end point.

12. The scene change point detecting method defined by claim 5, wherein the scene change point detected is recognized as an actual scene change point when variation of an intensity-changed pixel area is smaller than a predetermined value for a predetermined time after detection of said scene change point, otherwise the scene change point detected is not recognized as an actual scene change point.

13. The scene change point detecting method defined by claim 12, wherein said intensity-changed pixel area is replaced by a smoothed intensity-changed pixel area which is smoothed in a direction of time.

14. The scene change point detecting method defined by claim 12, wherein said intensity-changed pixel area is replaced by a feature quantity representing the total amount of movements on a screen.

15. A scene change point detecting method which detects a scene change point by successively processing time series frame images $I_1, I_2, I_3, - - - I_n, I_{n+1} - - -$ sampled in this order from a processed video, said method comprising steps of:

obtaining an edge intensity factor $E(n)$ which is a feature quantity to be calculated using edge intensity;

obtaining a change-rate Erc(N) of said edge intensity factor E(N) of a presently processed frame image $I_N$;

specifying an image number N of said frame image $I_N$ as a dissolve feature point nd1, when an absolute value of said change-rate Erc(N) continuously exceeds a predetermined threshold $\theta_{edge}$ for a duration equivalent to a plurality of frame images;

specifying the image number N of said frame image $I_N$ as an edge-intensity-extreme nd2, when the frame image $I_N$ is involved in a section succeeding said dissolve feature point nd1 and said change-rate Erc(N) of the edge intensity factor E(N) has a small absolute value;

considering a frame image Ind2 of said edge-intensity-extreme point nd2 as a head frame image of a next scene which is specified as a scene-change-point frame image, when the edge intensity factors E(nd2), E(nd2+1), E(nd2+2), - - - of frame images succeeding said edge-intensity-extreme point nd2 do not increase; and specifying said frame image $I_N$ as a scene-change-point frame image, when the edge intensity factor E(N) increases between the frame image Ind2 of said edge-intensity-extreme point nd2 and said frame image $I_N$, and said frame image $I_N$ is included in the section where said change-rate of the edge intensity factor E(N) has a small absolute value.

16. The scene change point detecting method defined by claim 15, wherein a change-rate of a smoothed edge intensity factor E'(N) of said frame image $I_N$ is used as the change-rate Erc(N) of the edge intensity factor E(N), when E'(1), E'(2), - - - represent a row of smoothed values of edge intensity factors E(1), E(2), - - - smoothed in a direction of time.

17. The scene change point detecting method defined by claim 15, wherein the image number N of the frame image $I_N$ is substituted for a dissolve-judgement-start point nd0 which represents a start point of scene change, when a product of Erc(N-1)×Erc(N) is not larger than zero in a region succeeding said dissolve feature point nd1.

18. The scene change point detecting method defined by claim 15, wherein the edge intensity factor E(N) is determined by obtaining a sum of edge intensities of respective pixels constituting each frame image.

19. The scene change point detecting method defined by claim 15, wherein the scene change point detected is not recognized as an actual scene change point, when similarity between a head frame image Inp of a present scene and a frame image Inpr corresponding to said scene change point detected is less than a predetermined threshold $\theta_{change}$.

20. The scene change point detecting method defined by claim 19, further comprising:

dissecting each of the frame images Inp and Inpr into a plurality of partial regions;

obtaining a histogram of colors in each partial region;

finding constituent colors representing each partial region by checking whether frequency of each color exceeds a predetermined threshold $\theta_h$;

finding common colors which are common part of constituent colors between corresponding partial regions of said two frame images Inp and Inpr;

calculating similarity between said corresponding partial regions using said common colors and constituent colors; and calculating similarity between said frame images Inp and Inpr using the similarity between said corresponding partial regions.

21. The scene change point detecting method defined by claim 20, further comprising steps of:

normalizing an area of pixels including said common colors by an area of pixels including constituent colors in each of said corresponding partial regions, thereby obtaining two normalized values; and specifying a smaller one of said two normalized values as said similarity of said corresponding partial regions.

22. The scene change point detecting method defined by claim 15, wherein an equi-velocity tracking portion where an object is tracked at substantially the same speed is excluded from detection of the scene change point.

23. The scene change point detecting method defined by claim 15, further comprising steps of:

obtaining an intensity-changed pixel region representing a set of pixels whose brightness changes more than a predetermined threshold $\theta_{w1}$ between a specific frame image and an immediately preceding frame image;

obtaining an intensity-changed pixel area representing a ratio of the number of pixels involved in said intensity-changed pixel region to the total number of pixels constituting a corresponding frame image, and executing detection of the scene change point except for cases where the intensity-changed pixel area exceeds a predetermined threshold $\theta_{still}$ and substantially constant between an estimated scene-change-start point and an estimated scene-change-end point.

24. The scene change point detecting method defined by claim 15, wherein the scene change point detected is recognized as an actual scene change point when variation of an intensity-changed pixel area is smaller than a predetermined value for a predetermined time after detection of said scene change point, otherwise the scene change point detected is not recognized as an actual scene change point.

25. The scene change point detecting method defined by claim 24, wherein said intensity-changed pixel area is replaced by a smoothed intensity-changed pixel area which is smoothed in a direction of time.

26. The scene change point detecting method defined by claim 24, wherein said intensity-changed pixel area is replaced by a feature quantity representing the total amount of movements on a screen.

27. A scene change point detecting method comprising steps of:

sampling time series frame images I1, I2, I3, - - - In-1, In, - - - from a processed video;

obtaining a set of pixels causing a brightness change exceeding a predetermined threshold $\theta_{w1}$ between two consecutive frame images In-1 and In for a duration equivalent to a plurality of consecutive frame images;

specifying said set of pixels as an intensity-changed pixel region; and comparing an area of a sum-set of intensity-changed pixel regions of consecutive frame images corresponding to said duration with a threshold, thereby detecting a wipe-like scene change point representing a head frame number of a next scene.

28. The scene change point detecting method defined by claim 27, further comprising steps of:

obtaining a sum-set SRIC of intensity-changed pixel regions RICnw1, - - -, RICn of frame images Inw1 through $I_N$, by updating a wipe-start-candidate point nw1 which represents a starting point of scene change in such a manner that the number of pixels between the frame image $I_{nw1}$ of the wipe-start-candidate point $n_{w1}$ and the frame image $I_N$ does not exceed the maximum value $n_{wmax}$ of the number of pixels required for wipe;

obtaining a replaced area SIDH which is a ratio of the number of pixels involved in said sum-set $SR_{IC}$ to the total number of pixels constituting a corresponding frame image; and considering the frame image $I_N$ as a head frame image of the next scene, when the replaced area SIDH exceeds a predetermined threshold $\theta_{sidh}$, thereby obtaining a scene-change-point frame image.

29. The scene change point detecting method defined by claim 28, further comprising steps of:

obtaining a variation by subtracting an intensity-changed pixel area IDHa(N) of the frame image $I_N$ by an intensity-changed pixel area IDHa(N−1) of an immediately preceding frame image $I_{N-1}$, where the intensity-changed pixel area represents a ratio of the number of pixels involved in said intensity-changed pixel region to the total number of pixels constituting a corresponding frame image; and specifying an image number (N+1) of a frame image succeeding the frame image $I_N$ as said wipe-start-candidate point $n_{w1}$, when an absolute value of said variation is not smaller than a predetermined threshold $\theta_{gap}$.

30. The scene change point detecting method defined by claim 27, wherein an equi-velocity tracking portion where an object is tracked at substantially the same speed is excluded from detection of the scene change point.

31. The scene change point detecting method defined by claim 27, further comprising steps of:

obtaining an intensity-changed pixel area representing a ratio of the number of pixels involved in said intensity-changed pixel region to the total number of pixels constituting a corresponding frame image, and executing detection of the scene change point except for cases where the intensity-changed pixel area exceeds a predetermined threshold $\theta_{still}$ and substantially constant between an estimated scene-change-start point and an estimated scene-change-end point.

32. The scene change point detecting method defined by claim 27, wherein the scene change point detected is not recognized as an actual scene change point, when similarity between a head frame image $I_{np}$ of a present scene and a frame image $I_{npr}$ corresponding to said scene change point detected is less than a predetermined threshold $\theta_{change}$.

33. The scene change point detecting method defined by claim 32, further comprising:

dissecting each of the frame images $I_{np}$ and $I_{npr}$ into a plurality of partial regions;

obtaining a histogram of colors in each partial region;

finding constituent colors representing each partial region by checking whether frequency of each color exceeds a predetermined threshold $\theta_h$;

finding common colors which are common part of constituent colors between corresponding partial regions of said two frame images $I_{np}$ and $I_{npr}$;

calculating similarity between said corresponding partial regions using said common colors and constituent colors; and calculating similarity between said frame images $I_{np}$ and $I_{npr}$ using the similarity between said corresponding partial regions.

34. The scene change point detecting method defined by claim 33, further comprising steps of:

normalizing an area of pixels including said common colors by an area of pixels including constituent colors in each of said corresponding partial regions, thereby obtaining two normalized values; and specifying a smaller one of said two normalized values as said similarity of said corresponding partial regions.

35. The scene change point detecting method defined by claim 27, wherein the scene change point detected is recognized as an actual scene change point when variation of an intensity-changed pixel area is smaller than a predetermined value for a predetermined time after detection of said scene change point, otherwise the scene change point detected is not recognized as an actual scene change point.

36. A scene change point detecting method comprising steps of:

sampling time series frame images $I_1, I_2, I_3, ---$ from a processed video;

obtaining an intensity-changed pixel region which represents a set of pixels causing a brightness change exceeding a predetermined threshold $\theta_{w1}$ between two consecutive frame images for a duration equivalent to a plurality of consecutive frame images;

obtaining an intensity-changed pixel area which represents a ratio of the number of pixels involved in said intensity-changed pixel region to the total number of pixels constituting a corresponding frame image, and finding a section succeeding a page-translate-judgement-start point $n_{o1}$ where the intensity-changed pixel area decreases by an amount exceeding a predetermined threshold $\theta_{full}$, thereby detecting a page-translate-like scene change point representing a head frame number of a next scene.

37. The scene change point detecting method defined by claim 36, wherein it is considered that a frame image $I_{N-1}$ is a head frame image of the next scene when the following three judgements are simultaneously established:

a first judgement being whether an intensity-changed pixel area IDHa($n_{o1}$) of a frame image $I_{no1}$ representing the page-translate-judgement-start point $n_{o1}$ becomes a maximum value of intensity-changed pixel areas IDHa($n_{o1}$) through IDHa(N) between the frame image $I_{no1}$ and a frame image $I_N$;

a second judgement being whether an intensity-changed pixel area IDHa(N−1) of a frame image $I_{N-1}$ immediately preceding said frame image $I_N$ becomes a minimum value of intensity-changed pixel areas IDHa($n_{o1}$) through IDHa(N) between the frame image $I_{no1}$ and the frame image $I_N$; and a third judgement being whether a value obtained by subtracting the intensity-changed pixel areas IDHa($n_{o1}$) by the intensity-changed pixel area IDHa(N−1) exceeds a predetermined threshold $\theta_{full}$.

38. The scene change point detecting method defined by claim 36, wherein a sectional maximum change area IDHmax (N) and a sectional minimum change area IDHmin (N) are obtained as maximum and minimum values of intensity-changed pixel areas IDHa($n_{o1}$) through IDHa (N−1) between a frame image $I_{o1}$ of the page-translate-judgement-start point $n_{o1}$ and a frame image $I_{N-1}$ immediately preceding a frame image $I_N$, respectively, and an image number N of the frame image $I_N$ is substituted for the page-translate-judgement-start point no1, when an intensity-changed pixel area IDHa(N) of the frame image $I_N$ exceeds said sectional maximum change area IDHmax (N) or when a value obtained by subtracting said sectional minimum change area IDHmin (N) from said intensity-changed pixel area IDHa(N) of the frame image $I_N$ exceeds a predetermined threshold $\theta_{ups}$.

39. The scene change point detecting method defined by claim 36, wherein the scene change point detected is not recognized as an actual scene change point, when similarity between a head frame image $I_{np}$ of a present scene and a frame image $I_{npr}$ corresponding to said scene change point detected is less than a predetermined threshold $\theta_{change}$.

40. The scene change point detecting method defined by claim 39, further comprising:

dissecting each of the frame images $I_{np}$ and $I_{npr}$ into a plurality of partial regions;

obtaining a histogram of colors in each partial region;

finding constituent colors representing each partial region by checking whether frequency of each color exceeds a predetermined threshold $\theta_h$;

finding common colors which are common part of constituent colors between corresponding partial regions of said two frame images $I_{np}$ and $I_{npr}$;

calculating similarity between said corresponding partial regions using said common colors and constituent colors; and calculating similarity between said frame images $I_{np}$ and $I_{npr}$ using the similarity between said corresponding partial regions.

41. The scene change point detecting method defined by claim 40, further comprising steps of:

normalizing an area of pixels including said common colors by an area of pixels including constituent colors in each of said corresponding partial regions, thereby obtaining two normalized values; and specifying a smaller one of said two normalized values as said similarity of said corresponding partial regions.

42. The scene change point detecting method defined by claim 36, wherein the scene change point detected is recognized as an actual scene change point when variation of the intensity-changed pixel area is smaller than a predetermined value for a predetermined time after detection of said scene change point, otherwise the scene change point detected is not recognized as an actual scene change point.

43. The scene change point detecting method defined by claim 42, wherein said intensity-changed pixel area is replaced by a smoothed intensity-changed pixel area which is smoothed in a direction of time.

44. The scene change point detecting method defined by claim 42, wherein said intensity-changed pixel area is replaced by a feature quantity representing the total amount of movements on a screen.

45. A scene change point detecting method which detects a scene change point by successively processing time series frame images $I_1$, $I_2$, $I_3$, - - - sampled in this order from a processed video, said method combining at least two of the following four scene-change-point detecting methods:

a first scene-change-point detecting method which detects a video cut;

a second scene-change-point detecting method which detects a dissolve-like scene change by using an edge intensity factor E(n) representing a feature quantity to be calculated using edge intensity of each frame image;

a third scene-change-point detecting method which detects a wipe-like scene change by using an intensity-changed pixel region $RIC_n$ representing a set of pixels whose brightness changes more than a predetermined threshold $\theta_{w1}$ between a specific frame image $I_n$ and an immediately preceding frame image $I_{n-1}$; and a fourth scene-change-point detecting method which detects a page-translate-like scene change by using an intensity-changed pixel area IDHa(n) representing a ratio of the number of pixels involved in said intensity-changed pixel region $RIC_n$ to the total number of pixels constituting a corresponding frame image.

46. The scene change point detecting method defined by claim 45, wherein a scene change point ns is obtained by executing said first scene-change-point detecting method; and processing time series frame images $I_{ns}$, $I_{ns+1}$, $I_{ns+2}$, - - - starting from said scene change point ns for obtaining a scene change point other than the video cut using at least one of said second, third and fourth scene-change-point detecting methods.

47. The scene change point detecting method defined by claim 45, wherein similarity is obtained between two consecutive frame images among said frame images sampled; and both said similarity and a difference between similarities of said frame images are compared with predetermined thresholds, thereby detecting video cut.

48. The scene change point detecting method defined by claim 45, further comprising steps of:

identifying a video cut as a scene change point when any video cut is detected by said first scene-change-point method after processing a frame image $I_N$;

selecting a scene-change-point candidate npr by executing at least one of said second, third and fourth scene-change-point methods, when no video cut is detected by said first scene-change-point method;

obtaining similarity between a head frame image $I_{np}$ of a present scene and a scene-change-point image candidate $I_{npr}$ of said scene-change-point candidate npr;

considering said scene-change-point image candidate $I_{npr}$ as a head frame image of the next scene which is a frame image of the scene change point, when the similarity obtained is less than a predetermined threshold $\theta_{change}$.

49. The scene change point detecting method defined by claim 48, wherein said scene-change-point candidate npr is a scene change point having a largest frame number among a plurality of scene change points detected by executing at least one of said second, third and fourth scene-change-point methods.

50. The scene change point detecting method defined by claim 45, wherein at least two of said second, third and fourth scene-change-point detecting methods are executed; and it is checked whether a scene change point detected by a specific scene-change-point detecting method is involved in a transitional part of a scene change occurring immediately before another scene change point to be detected by another method other than said specific scene-change-point detecting method, thereby identifying said scene change point detected by said specific scene-change-point detecting method as a false scene change point.

51. The scene change point detecting method defined by claim 45, wherein said second scene-change-point detecting method comprises steps of:

finding a section where said edge intensity factor $E(n)$ shows a predetermined large variation for a duration exceeding a predetermined time; and finding a section where said edge intensity factor $E(n)$ shows a predetermined small variation for a duration exceeding a predetermined time, thereby detecting a scene change point representing a head frame number of a next scene.

52. The scene change point detecting method defined by claim 41, further comprising steps of:

specifying a dissolve feature point $n_{d1}$ as a transitional point of a section where said edge intensity factor $E(n)$ shows a large variation for a duration more than a predetermined time;

specifying a dissolve end point as a point where a scene change involving said dissolve feature point $n_{d1}$ is terminated;

checking whether a scene change point $n_{prw}$ detected by said third scene-change-point detecting method or a scene change point $n_{pro}$ detected by said fourth scene-change-point detecting method is located between said dissolve feature point $n_{d1}$ and said dissolve end point;

considering that said scene change point $n_{prw}$ or $n_{pro}$ belongs to a transitional part of a scene change occurring immediately before a scene change point to be detected by said second scene-change-point detecting method; and identifying said scene change point $n_{prw}$ or $n_{pro}$ as a false scene change point.

53. The scene change point detecting method defined by claim 45, wherein said fourth scene-change-point detecting method comprises a step of finding a section where the intensity-changed pixel area decreases by an amount exceeding a predetermined threshold $\theta_{full}$, thereby detecting a scene change point representing a head frame number of a next scene.

54. The scene change point detecting method defined by claim 53, further comprising steps of:

considering that the scene change point $n_{pr}$ belongs to a transitional part of a scene change occurring immediately before a video change point to be detected by said fourth scene-change-point detecting method, when an intensity-changed pixel area $IDHa(n_{pr})$ of the scene change point $n_{pr}$ exceeds an intensity-changed pixel area $IDHa(n_{pr}+1)$ of an immediately succeeding image frame;

identifying said scene change point $n_{pr}$ as a false scene change point; and replacing said scene change point $n_{pr}$ by a first local extreme point of said intensity-changed pixel area appearing after said scene change point $n_{pr}$.

55. The scene change point detecting method defined by claim 45, wherein the edge intensity factor $E(N)$ is determined by obtaining a sum of edge intensities of respective pixels constituting each frame image.

56. The scene change point detecting method defined by claim 45, wherein said third scene-change-point detecting method comprises a step of comparing a sum-set of the intensity-changed pixel regions of consecutive frame images with a predetermined threshold.

57. The scene change point detecting method defined by claim 45, wherein an equi-velocity tracking portion where an object is tracked at substantially the same speed is excluded from detection of the scene change point.

58. The scene change point detecting method defined by claim 45, further comprising steps of:

obtaining an intensity-changed pixel region representing a set of pixels whose brightness changes more than a predetermined threshold $\theta_{w1}$ between a specific frame image and an immediately preceding frame image;

obtaining an intensity-changed pixel area representing a ratio of the number of pixels involved in said intensity-changed pixel region to the total number of pixels constituting a corresponding frame image, and executing detection of the scene change point except for cases where the intensity-changed pixel area exceeds a predetermined threshold $\theta_{still}$ and substantially constant between an estimated scene-change-start point and an estimated scene-change-end point.

59. The scene change point detecting method defined by claim 45, wherein the scene change point detected is recognized as an actual scene change point when variation of the intensity-changed pixel area is smaller than a predetermined value for a predetermined time after detection of said scene change point, otherwise the scene change point detected is not recognized as an actual scene change point.

60. A scene change point detecting method which detects a scene change point by successively processing time series frame images $I_1, I_2, I_3 ---, I_{n-1}, I_n, ---$ sampled in this order from a processed video, said method combining at least two of the following four scene-change-point detecting methods:

a first scene-change-point detecting method which detects a video cut based on a similarity $S(n)$ between two consecutive frame images $I_{n-1}$, $I_n$ and a similarity difference $\Delta S(n)$;

a second scene-change-point detecting method which uses an edge intensity factor $E(n)$ representing a feature quantity to be calculated using edge intensity of each frame image, to detect a dissolve-like scene change by finding a section where said edge intensity factor $E(n)$ shows a predetermined large variation for a duration equivalent to a plurality of consecutive frame images;

a third scene-change-point detecting method which detects a wipe-like scene change by using an intensity-changed pixel region $R_{ICn}$ representing a set of pixels causing a brightness change exceeding a predetermined threshold $\theta_{w1}$ between two consecutive frame images $I_{n-1}$ and $I_n$ for a duration equivalent to a plurality of consecutive frame images; and a fourth scene-change-point detecting method which detects a page-translate-like scene change by using an intensity-changed pixel area $IDHa(n)$ representing a ratio of the number of pixels involved in said intensity-changed pixel region $R_{ICn}$ to the total number of pixels constituting a corresponding frame image.

\* \* \* \* \*